(12) United States Patent
Gibson et al.

(10) Patent No.: US 7,229,943 B2
(45) Date of Patent: Jun. 12, 2007

(54) POLYMERISATION AND OLIGOMERISATION CATALYSTS

(75) Inventors: Vernon Charles Gibson, London (GB); Atanas Kostadinov Tomov, Surrey (GB)

(73) Assignee: Innovene Europe Limited, Middlesex (GB)

( * ) Notice: Subject to any disclaimer, the term of this patent is extended or adjusted under 35 U.S.C. 154(b) by 0 days.

(21) Appl. No.: 10/549,314

(22) PCT Filed: Mar. 18, 2004

(86) PCT No.: PCT/GB2004/001184

§ 371 (c)(1), (2), (4) Date: Sep. 16, 2005

(87) PCT Pub. No.: WO2004/083263

PCT Pub. Date: Sep. 30, 2004

(65) Prior Publication Data

US 2006/0094588 A1    May 4, 2006

(30) Foreign Application Priority Data

Mar. 20, 2003   (GB) ................. 0306430.0

(51) Int. Cl.
  C08F 4/60    (2006.01)
  C08F 4/606   (2006.01)
  C08F 4/602   (2006.01)
  C08F 4/603   (2006.01)

(52) U.S. Cl. .............. 502/167; 502/103; 502/113; 526/134; 526/161; 526/165; 526/164; 526/172; 526/115; 526/116

(58) Field of Classification Search ............. 502/103, 502/167, 113; 526/134, 161, 165, 164, 172, 526/115, 116
See application file for complete search history.

(56) References Cited

U.S. PATENT DOCUMENTS 6,281,303 B1    8/2001   Lavoie et al.

2004/0082464 A1*  4/2004   Romano et al. ............ 502/162

FOREIGN PATENT DOCUMENTS

| JP | 2000-219704 | 8/2000 |
| WO | WO 00/69923 | 11/2000 |
| WO | WO 01/74831 A1 | 10/2001 |

OTHER PUBLICATIONS

Ceniceros-Gomez et al., "Synthesis, X-ray and apectroscopic characterisation of chromium(III) coordination compounds with benzimidazolic ligands", Polyhedron, vol. 19, pp. 1821-1872, 2000).*
Patent Abstracts of Japan, vol. 2000, No. 11, Jan. 3, 2001.

* cited by examiner

Primary Examiner—Caixia Lu
(74) Attorney, Agent, or Firm—Nixon & Vanderhye

(57) ABSTRACT

A polymerisation catalyst comprising (1) a transition metal compound of Formula A,

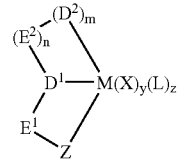

Formula A and optionally (2) an activating quantity of a Lewis acid activator. Z is a five-membered heterocyclic group containing at least one carbon atom, at least one nitrogen atom and at least one other hetero atom selected from nitrogen, sulphur and oxygen, the remaining atoms in the ring being nitrogen or carbon; M is a metal from Group 3 to 11 of the Periodic Table or a lanthanide metal; $E^1$ and $E^2$ are divalent groups from (i) aliphatic hydrocarbon, (ii) alicyclic hydrocarbon, (iii) aromatic hydrocarbon, (iv) alkyl substituted aromatic hydrocarbon (v) heterocyclic groups and (vi) heterosubstituted derivatives of groups (i) to (v); $D^1$ and $D^2$ are donor groups; X is an anionic group, L is a neutral donor group; n=m=zero or 1; y and z are zero or integers. The catalysts are useful for polymerising or oligomerising 1-olefins.

34 Claims, 15 Drawing Sheets

Fig.1 (Example 3)

Fig.2 (Example 7)

Fig. 3 (Example 8)

Fig. 4 (Example 9)

Figure 1:
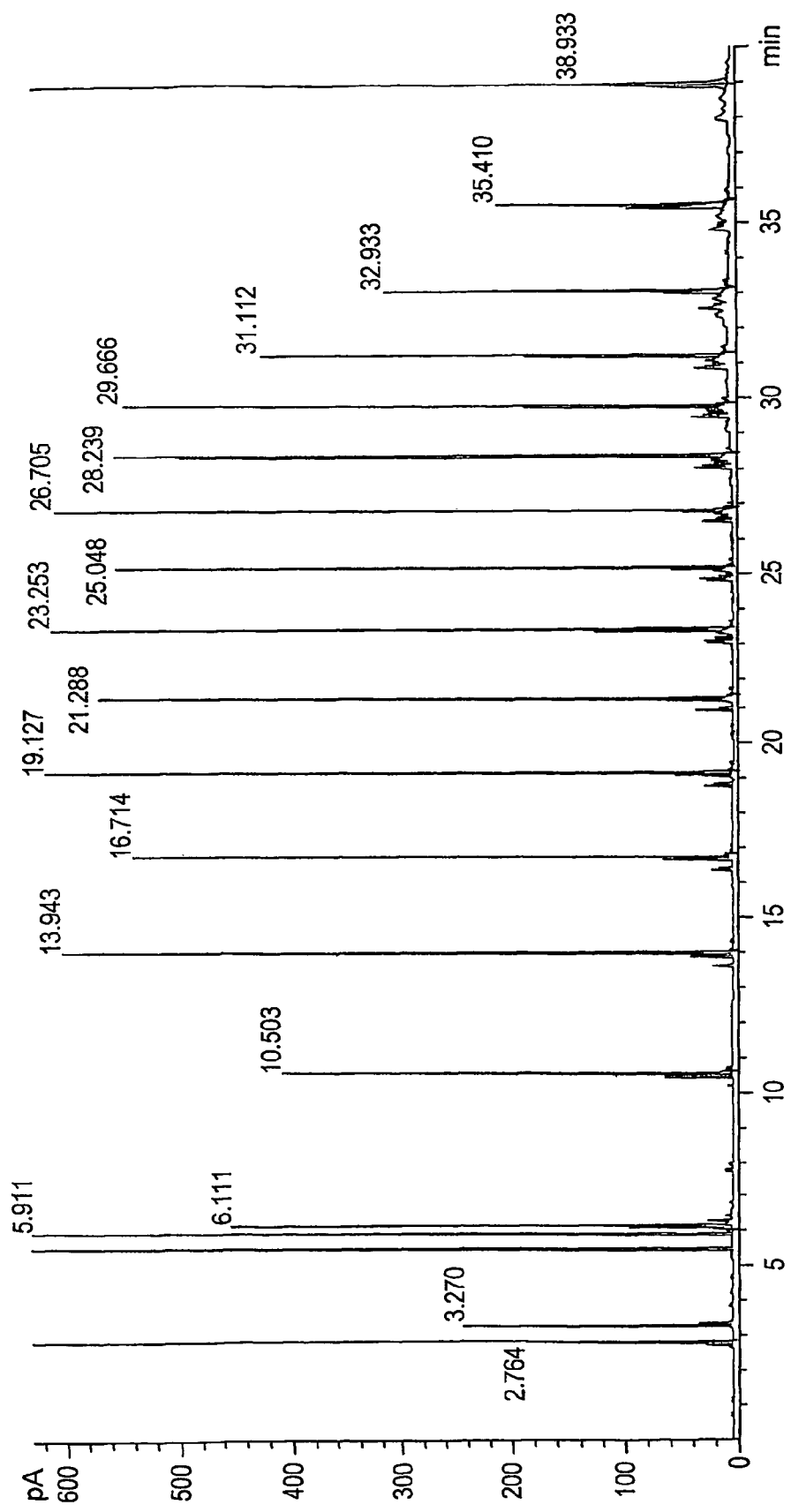
Figure 2:
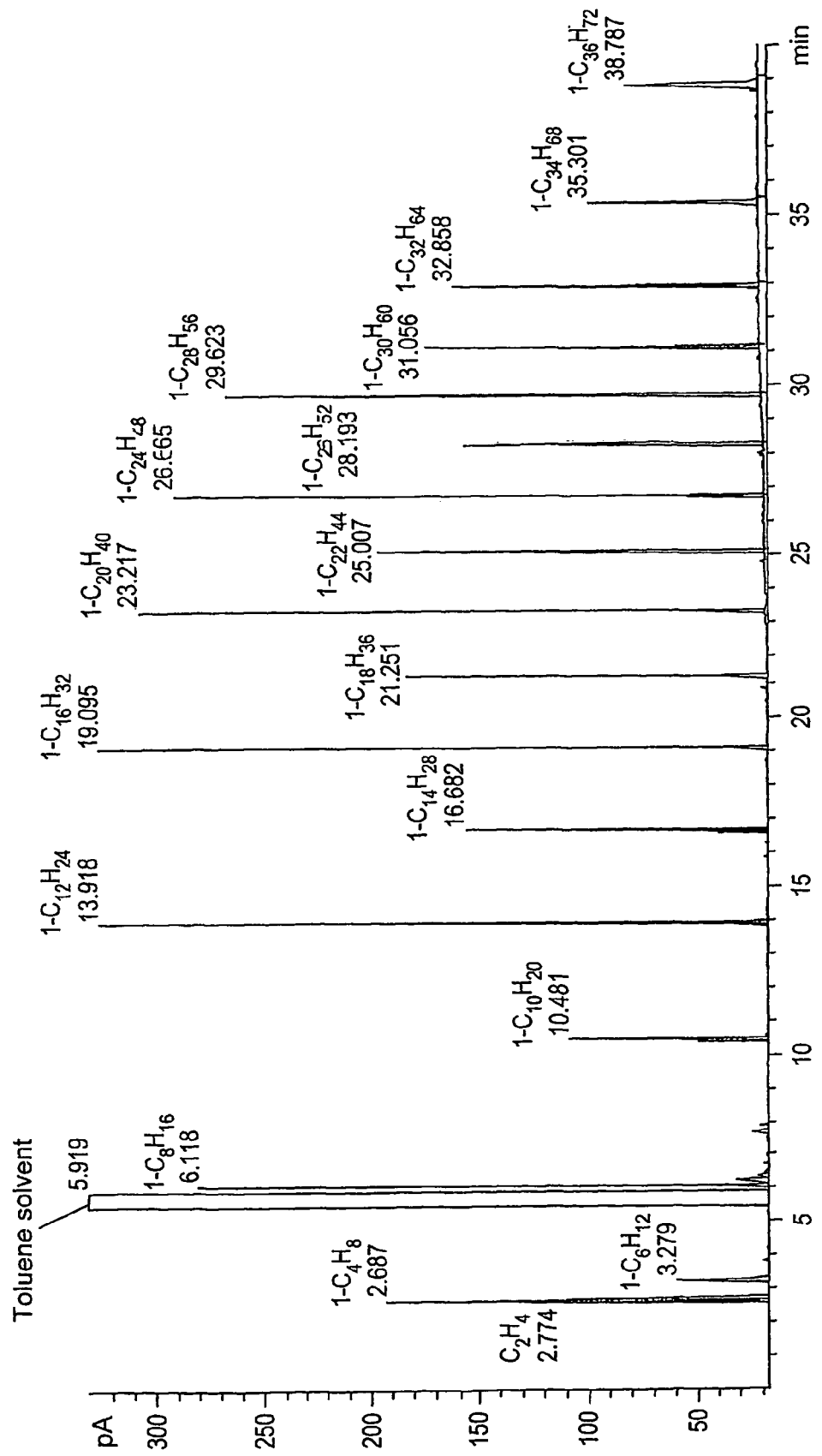
Figure 3:
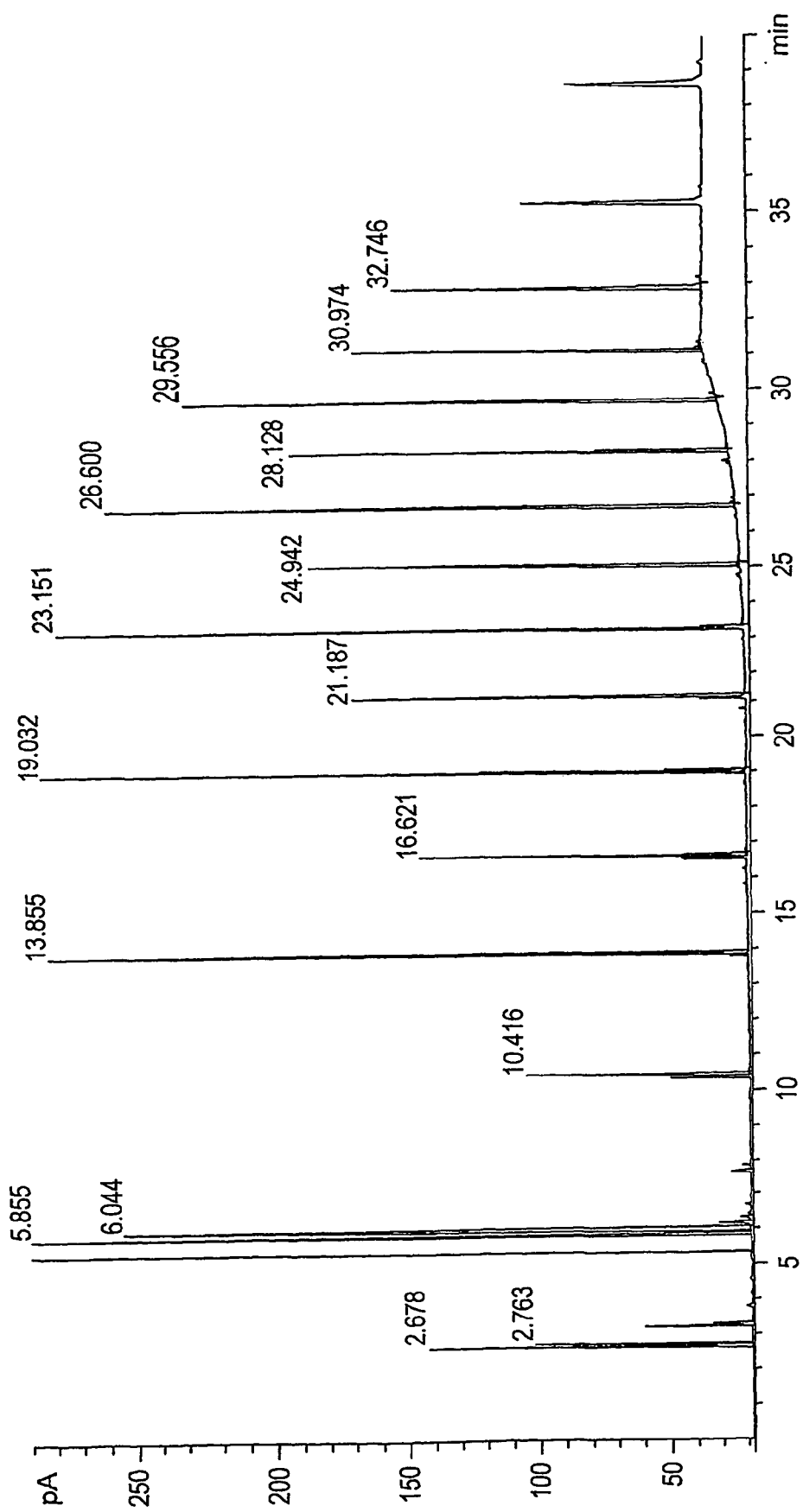
Figure 4:
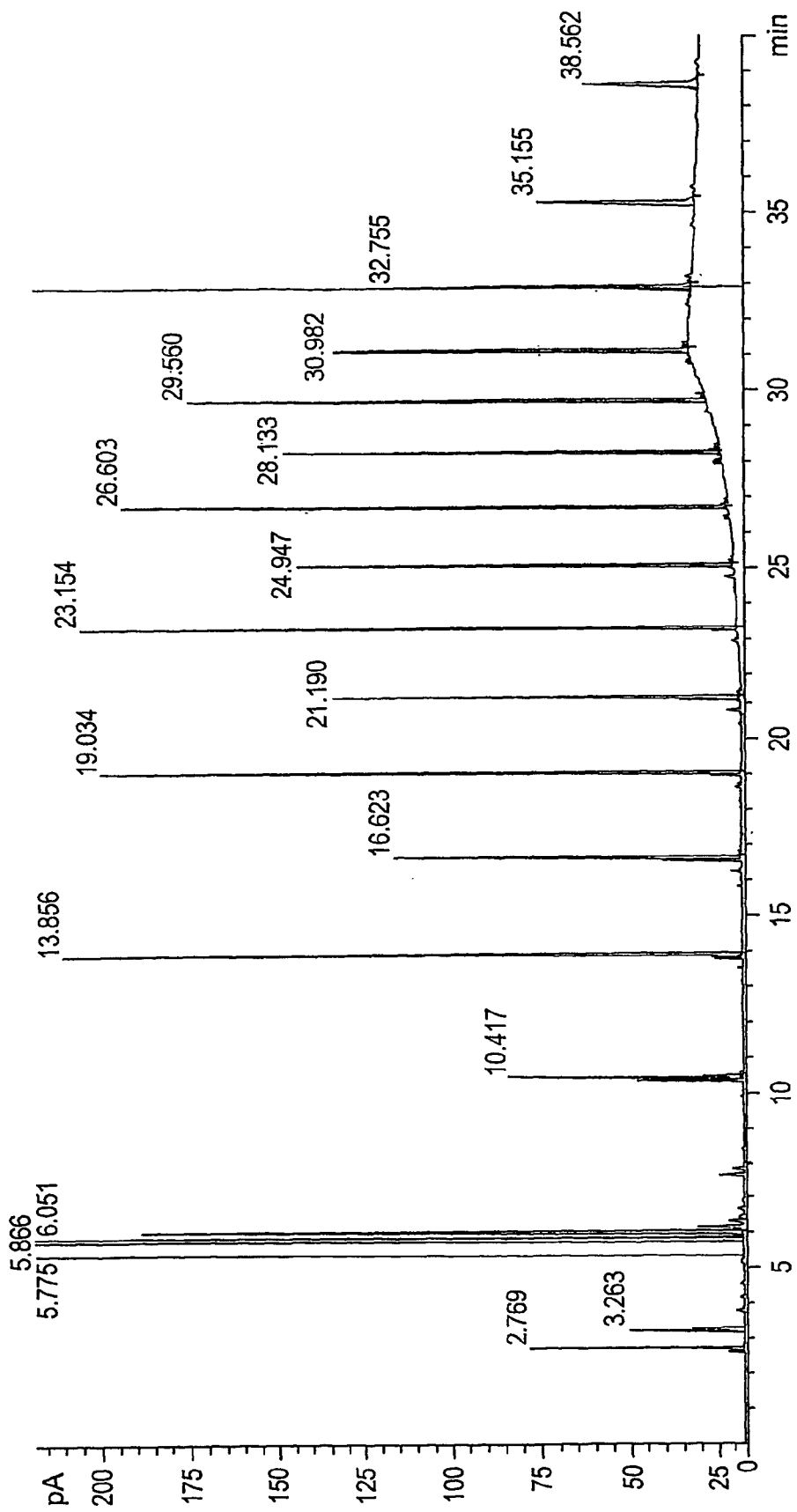
Figure 5:
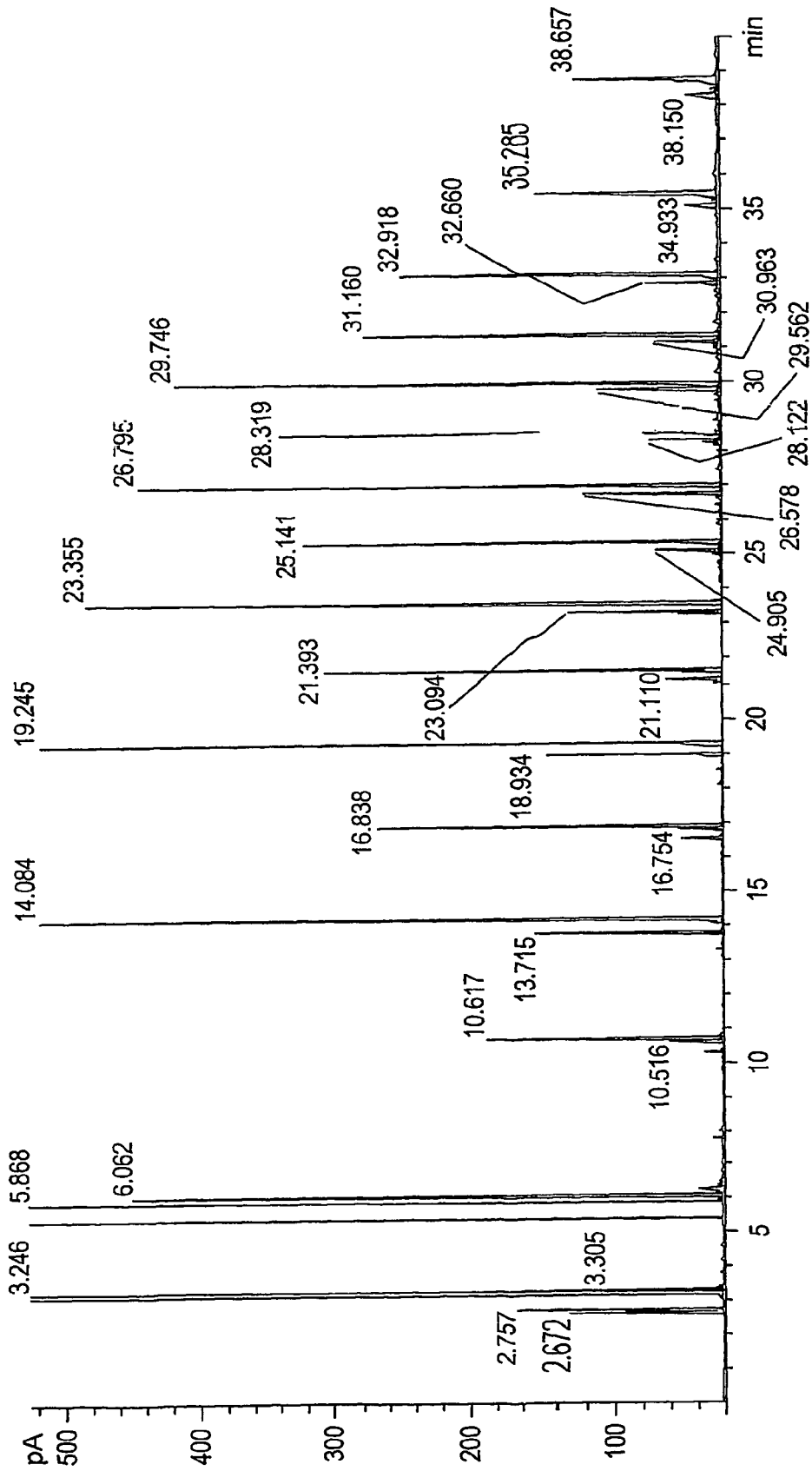

Fig.5 (Example 11)

Figure 6:
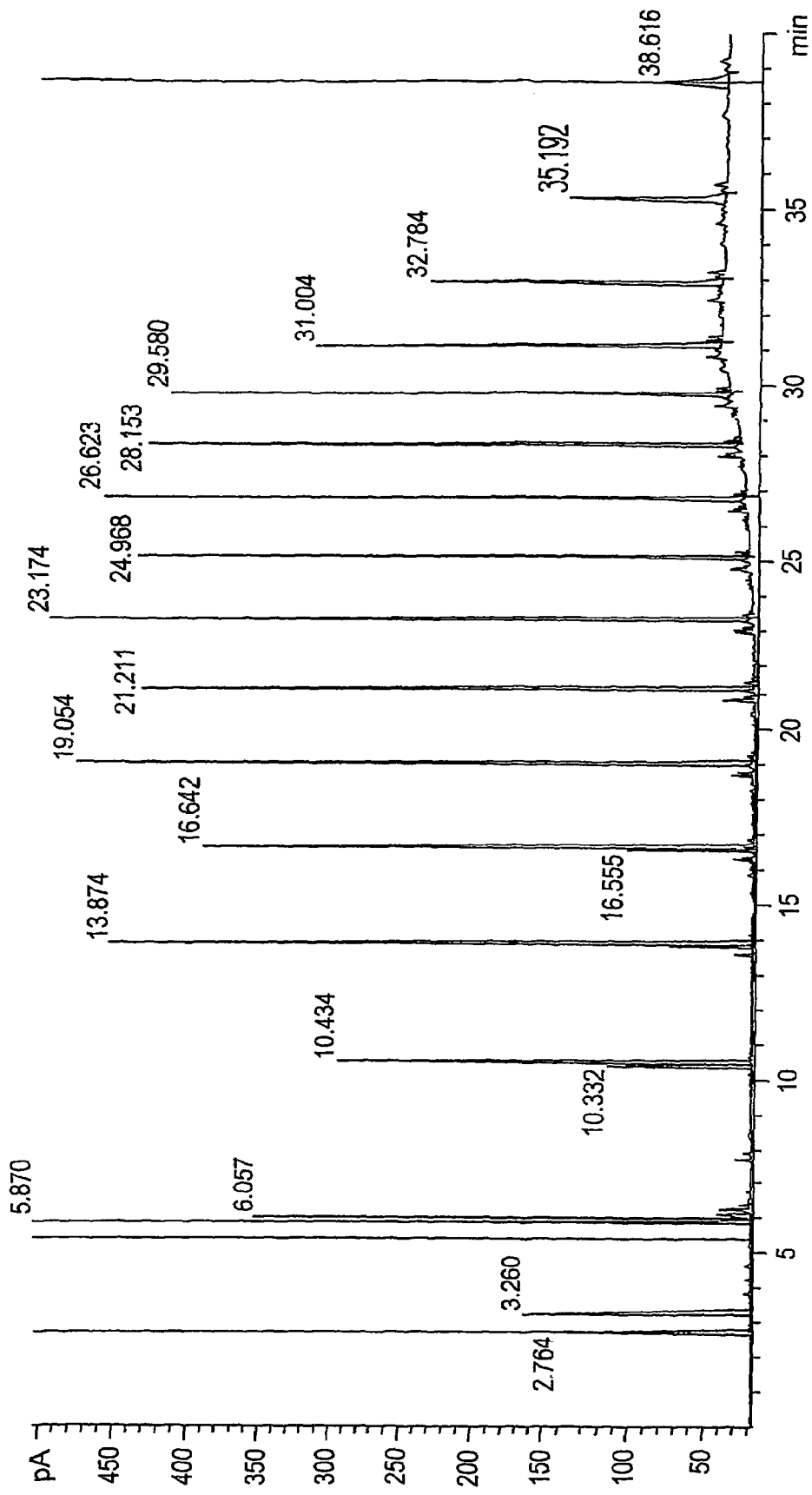

Fig.6 The GC trace for the soluble fraction from Example 14 is shown below

Figure 7:
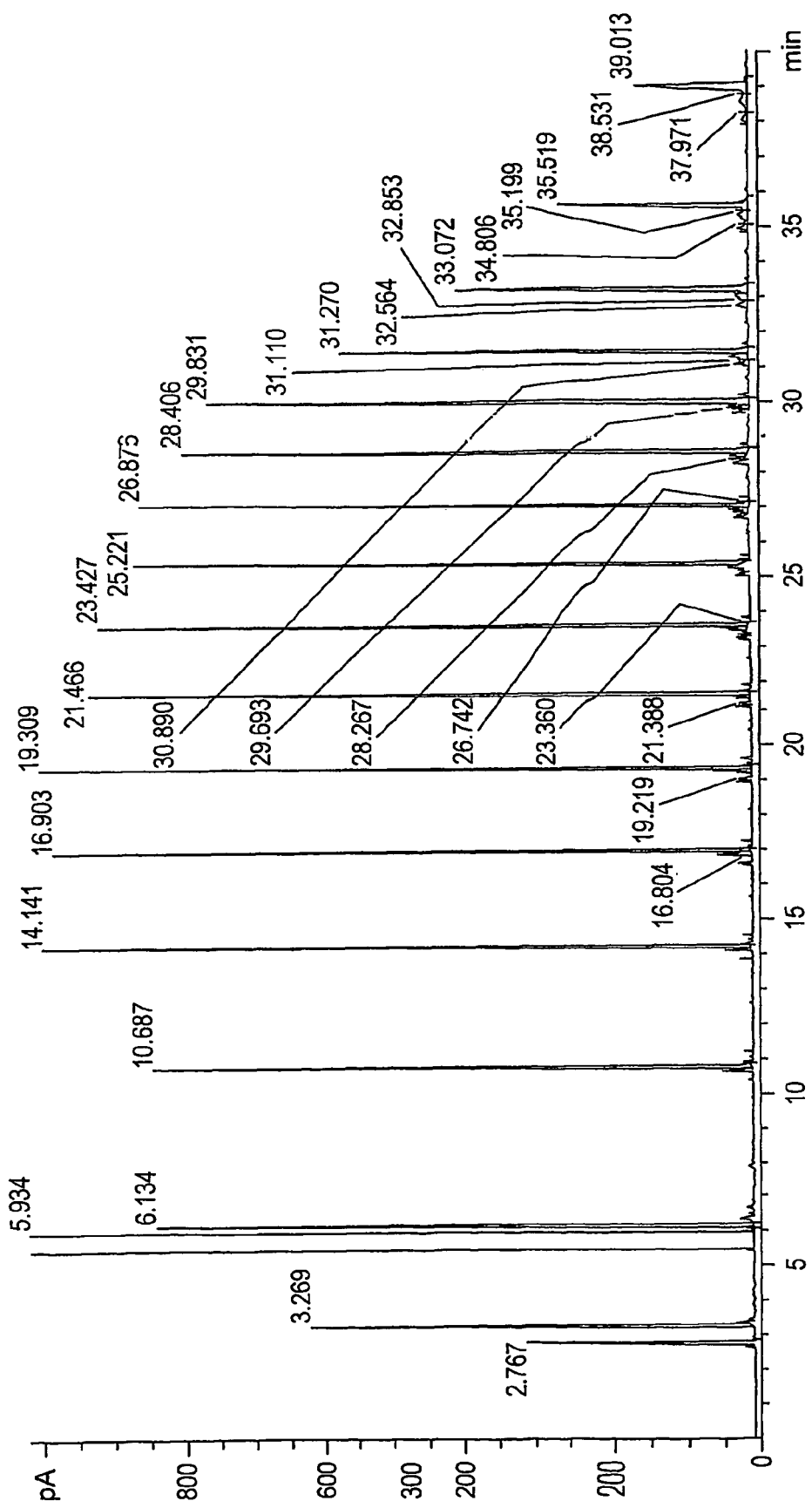

Fig. 7 The GC trace for the soluble fraction from Example 16 is shown below

Figure 8:
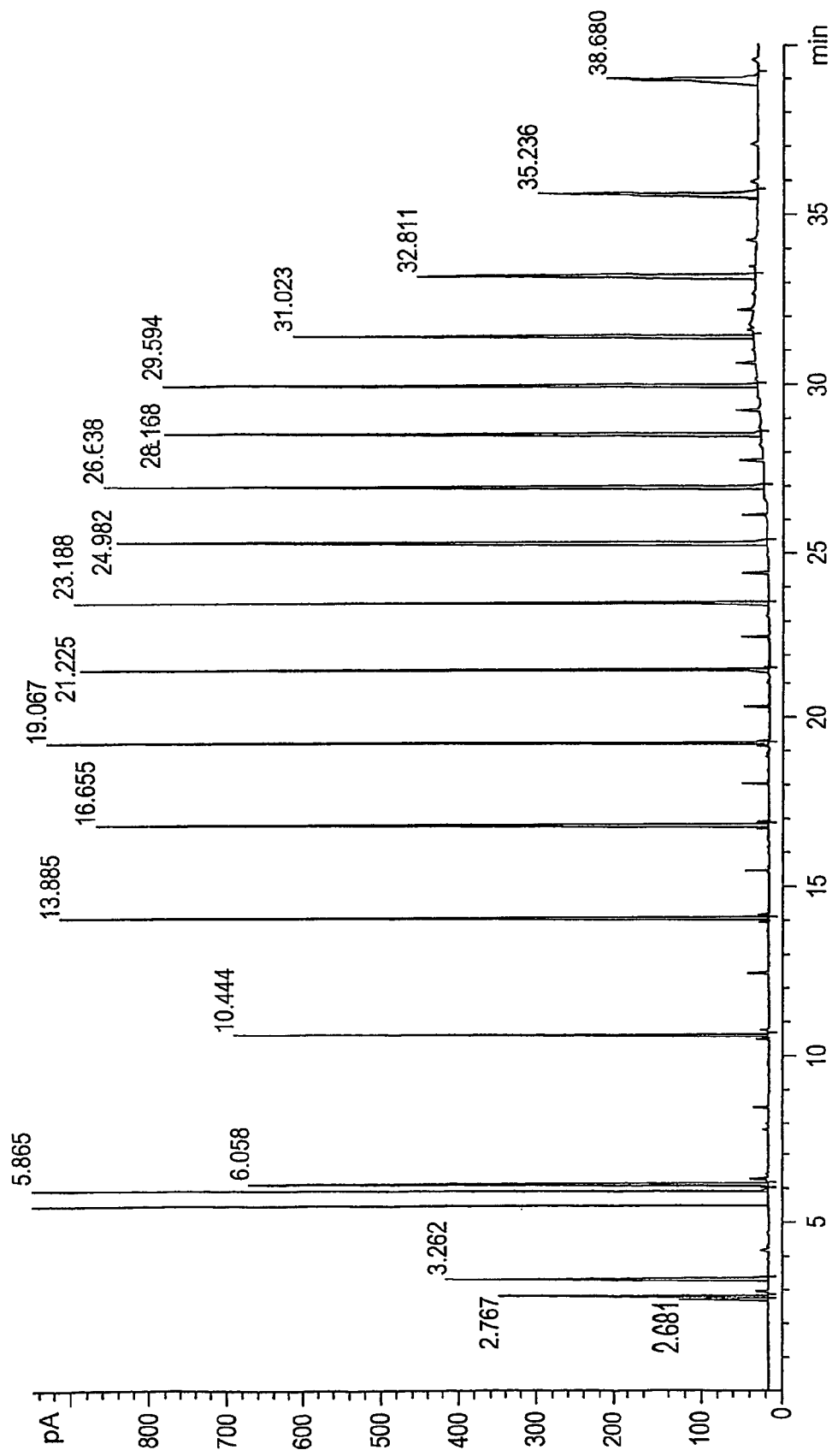

Fig.8 The GC trace for the soluble fraction from Example 19 is shown below

Figure 9:
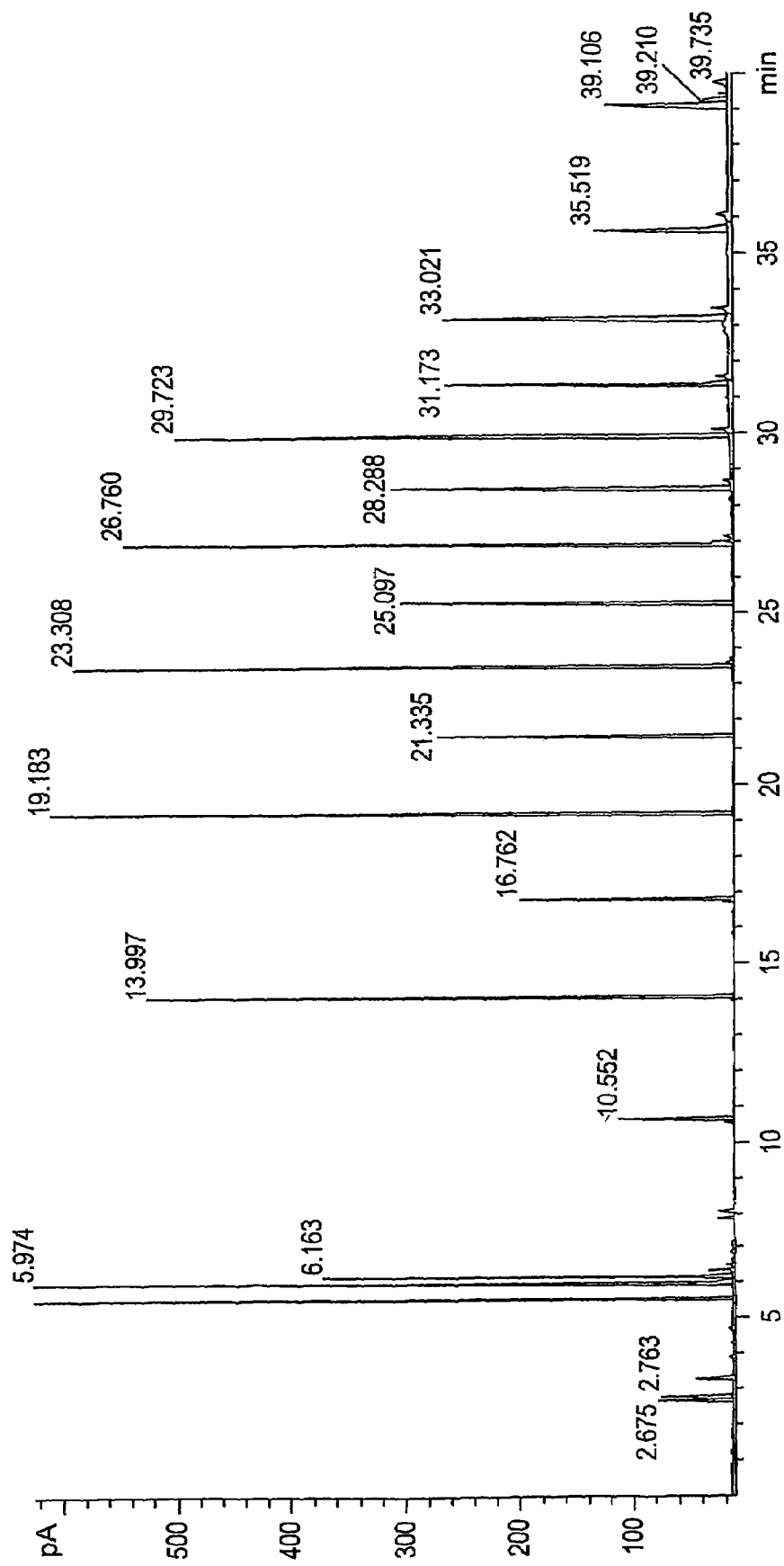

Fig.9  The GC trace for the soluble fraction from Example 20 is shown below

Figure 10:
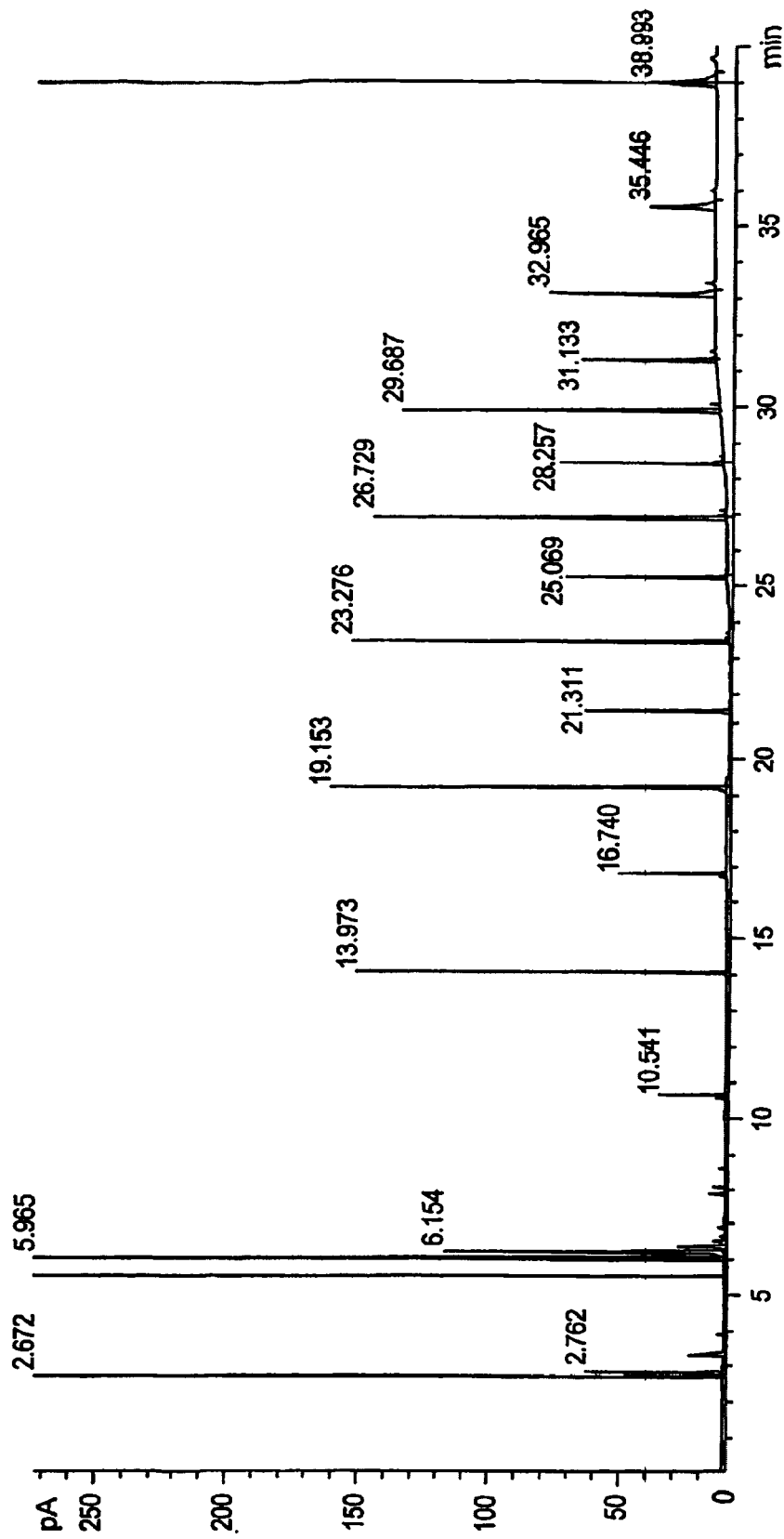

Fig. 10  GC curves for the soluble fraction of Example 21

Figure 11:
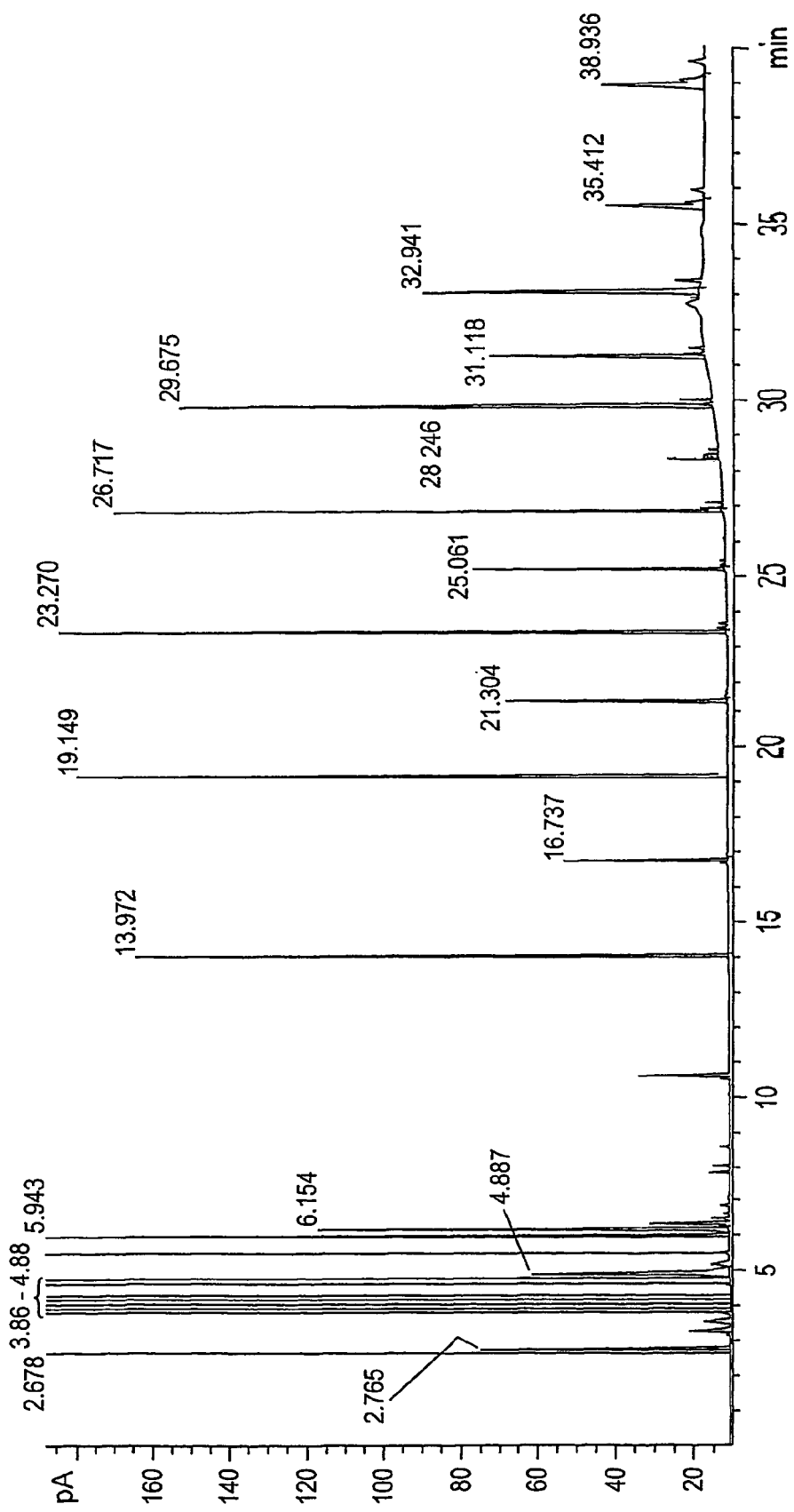

Fig.11  Example 22 (presence of hexanes due to the co-catalyst solution; retention times 3.86 – 4.88 min).

Figure 12:
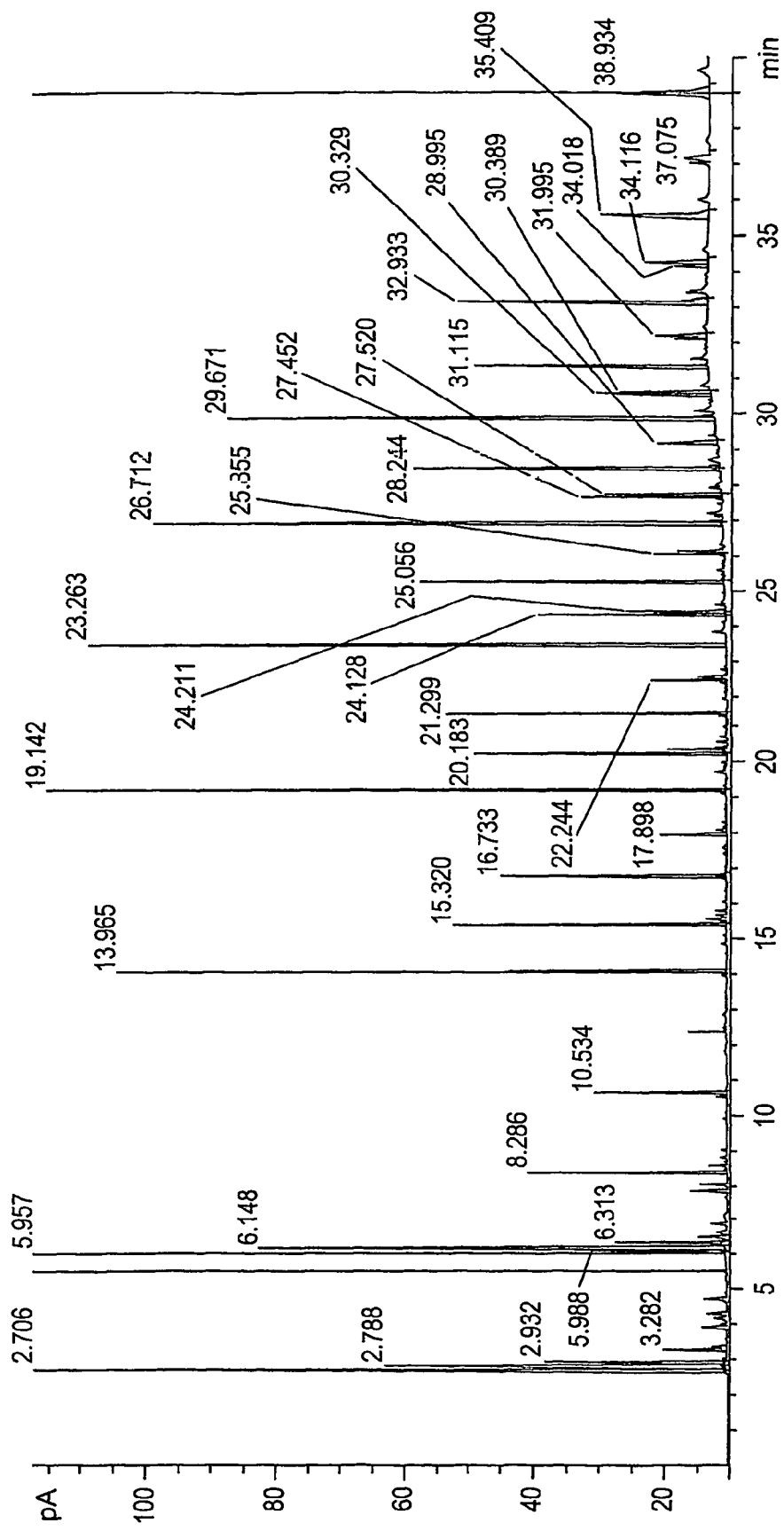

Fig. 12  GC trace of solubles from Example 23

Molecular structure of complex Cr-7 (Example 26)

Structure of the Ni1 complex (Example 34)

Crystal structure of V-2
(Example 70)

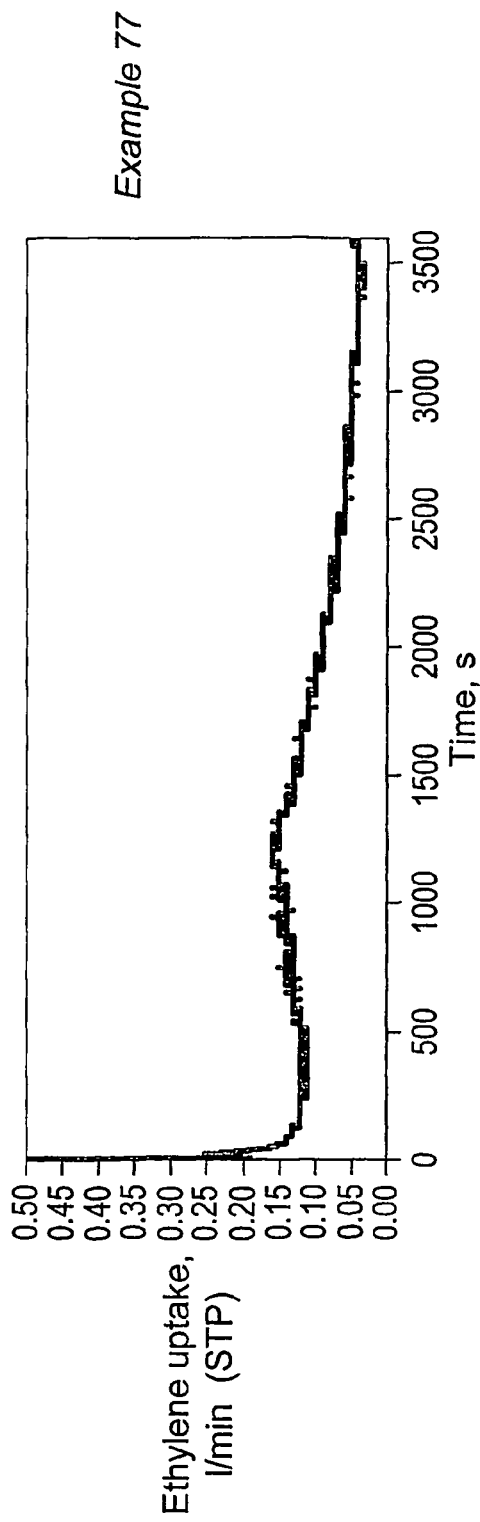
Fig. 16 Ethylene uptake as a function of time for Example 77
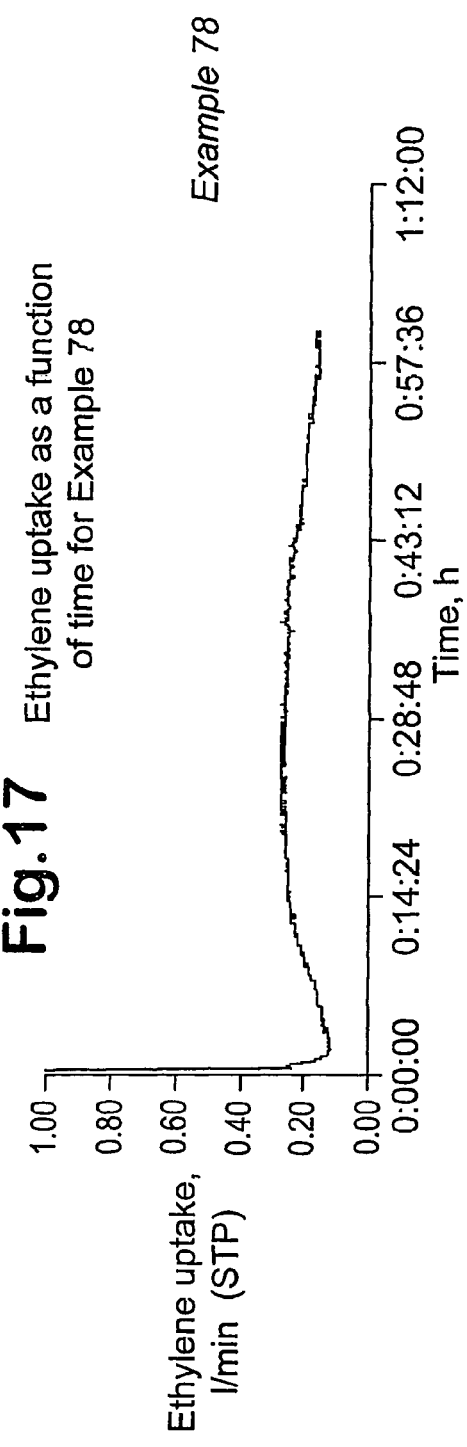
Fig. 17 Ethylene uptake as a function of time for Example 78

POLYMERISATION AND OLIGOMERISATION CATALYSTS

This application is the U.S. National Phase of International Application PCT/GB2004/001184, filed 18 Mar. 2004, which designated the U.S. PCT/GB2004/001184 claims priority to British Application No. 0306430.0 filed 20 Mar. 2003. The entire content of these applications are incorporated herein by reference.

The present invention relates to transition metal-based polymerisation and oligomerisation catalysts and to their use in the polymerisation, copolymerisation and oligomerisation of olefins.

The use of certain transition metal compounds to polymerise 1-olefins, for example, ethylene or propylene, is well established in the prior art. The use of Ziegler-Natta catalysts, for example, those catalysts produced by activating titanium halides with organometallic compounds such as triethylaluminium, is fundamental to many commercial processes for manufacturing polyolefins. Over the last three decades, advances in the technology have led to the development of Ziegler-Natta catalysts which have such high activities that olefin polymers and copolymers containing very low concentrations of residual catalyst can be produced directly in commercial polymerisation processes. The quantities of residual catalyst remaining in the produced polymer are so small as to render unnecessary their separation and removal for most commercial applications. Such processes can be operated by polymerising the monomers in the gas phase, or in solution or in suspension in a liquid hydrocarbon diluent, or, in the case of propylene in bulk.

Commodity polyethylenes are commercially produced in a variety of different types and grades. Homopolymerisation of ethylene with transition metal based catalysts leads to the production of so-called "high density" grades of polyethylene. These polymers have relatively high stiffness and are useful for malting articles where inherent rigidity is required. Copolymerisation of ethylene with higher 1-olefins (e.g. butene, hexene or octene) is employed commercially to provide a wide variety of copolymers differing in density and in other important physical properties. Particularly important copolymers made by copolymerising ethylene with higher 1-olefins using transition metal based catalysts are the copolymers having a density in the range of 0.91 to 0.93. These copolymers which are generally referred to in the art as "linear low density polyethylene" are in many respects similar to the so-called "low density" polyethylene produced by the high pressure free radical catalysed polymerisation of ethylene. Such polymers and copolymers are used extensively in the manufacture of flexible blown film.

Polypropylenes are also commercially produced in a variety of different types and grades. Homopolymerisation of propylene with transition metal based catalysts leads to the production of grades with a wide variety of applications. Copolymers of propylene with ethylene or terpolymers with ethylene and higher 1-olefins are also useful materials, often used in film applications.

In recent years the use of certain metallocene catalysts (for example biscyclopentadienylzirconiumdichloride activated with alumoxane) has provided catalysts with potentially high activity. Other derivatives of metallocenes have been shown to be potentially useful for producing polypropylene with good activity, molecular weight and tacticity control. However, metallocene catalysts of this type suffer from a number of disadvantages, for example, high sensitivity to impurities when used with commercially available monomers, diluents and process gas streams, the need to use large quantities of expensive alumoxanes to achieve high activity, difficulties in putting the catalyst on to a suitable support and synthetic difficulties in the production of more complex catalyst structures suitable for polymerising propene in a tactic manner.

Olefin oligomerisation is also a commercially important process, leading to the production of 1-olefins (1-hexene, 1-octene, 1-decene, etc) that find utility in a wide range of applications, for example as comonomers for linear low density polyethylene, monomers for poly(1-olefins) and starting materials for surfactants. Catalysts based on a wide range of metal complexes may be used for this process and typically produce a so-called "Schulz-Flory" distribution of 1-olefins. More recently catalysts have emerged that selectively produce only 1-hexene by a distinctive trimerisation mechanism. Typically the final distribution of 1-olefins produced is of importance commercially.

An object of the present invention is to provide a catalyst suitable for polymerising or oligomerising monomers, for example, olefins, cycloolefins or diolefins, and especially for polymerising or oligomerising ethylene alone or propylene alone, or for copolymerising ethylene with higher 1-olefins with high activity. A further object of the invention is to provide an improved process for the polymerisation of olefins. Yet another object of the present invention is to provide novel complexes based on certain transition metals. The catalysts described here show extremely high activity for polymerisation and oligomerisation which leads to many benefits including lower catalyst loadings in a commercial process and lower catalyst residues in the final product.

The present invention provides a novel polymerisation catalyst comprising
(1) a transition metal compound having the following Formula A, and optionally
(2) an activating quantity of a suitable activator,

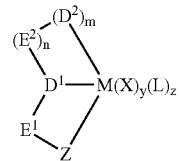

Formula A wherein Z comprises a five-membered heterocyclic group, the five membered heterocyclic group containing at least one carbon atom, at least one nitrogen atom and at least one other hetero atom selected from nitrogen, sulphur and oxygen, the remaining atoms in said ring being selected from nitrogen and carbon; M is a metal from Group 3 to 11 of the Periodic Table or a lanthanide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon (v) heterocyclic groups and (vi) heterosubstituted derivatives of said groups (i) to (v); $D^1$ and $D^2$ are donor atoms or groups; X is an anionic group, L is a neutral donor group; n=m=zero or 1; y and z are independently zero or integers such that the number of X and L groups satisfy the valency and oxidation state of the metal M.

Preferably the divalent groups $E^1$ and $E^2$ are not linked other than through the donor atom or group $D^1$.

At least one of the atoms present in the ring of the five-membered heterocyclic group Z is preferably bonded directly to $E^1$ and preferably a second atom in the ring is bonded directly to M. Most preferably the atom in the five-membered ring bonded directly to $E^1$ is adjacent to a second atom in said ring, said second atom being bonded directly to M.

The five-membered heterocyclic group Z preferably contains at least 2 carbon atoms in its ring and more preferably at least 3 carbon atoms in its ring. Examples of suitable 5-membered heterocyclic groups are (but are not restricted to):

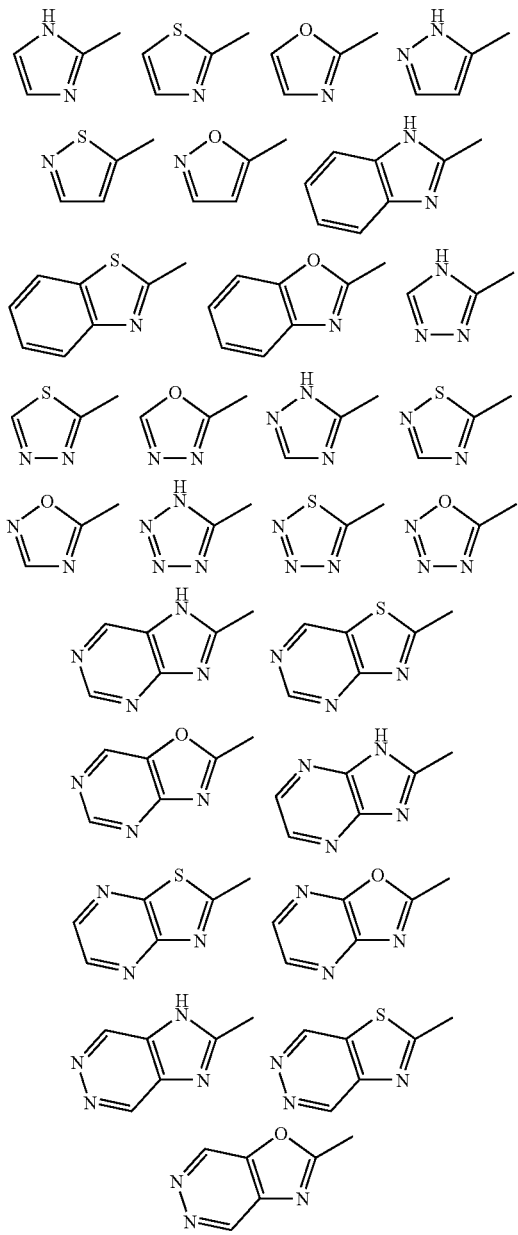

In a preferred embodiment of the present invention Z, in Formula A, is specifically an imidazole-containing group Thus, the present invention further provides a novel polymerisation catalyst comprising (1) a transition metal compound having the following Formula A, and optionally (2) an activating quantity of a suitable activator,

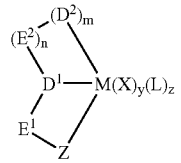

Formula A wherein Z is specifically an imidazole-containing group; M is a metal from Group 3 to 11 of the Periodic Table or a lanthanide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon (v) heterocyclic groups and (vi) heterosubstituted derivatives of said groups (i) to (v); $D^1$ and $D^2$ are donor groups; X is an anionic group, L is a neutral donor group; n=m=zero or 1; y and z are independently zero or integers such that the number of X and L groups satisfy the valency and oxidation state of the metal M.

$D^1$ and/or $D^2$ are donor atoms of groups containing at least one donor atom. $D^1$ and/or $D^2$ can be, for example, groups having the same formula as recited for group Z. For example $D^1$ and/or $D^2$ can be groups comprising a five-membered heterocyclic group containing at least 2 carbon atoms in its ring and more preferably at least 3 carbon atoms in its ring. $D^1$ and/or $D^2$ can be imidazole-containing groups if desired. When $D^1$ and/or $D^2$ are an imidazole-containing group this or these can be identical with Z. In a preferred embodiment $D^2$ and Z are identical imidazole containing groups.

The imidazole-containing group Z is preferably a group of formula I, II or III

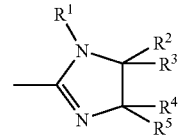

Formula I

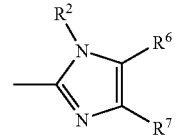

Formula II

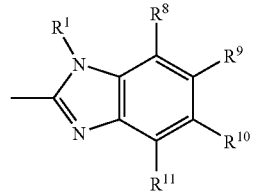

Formula III $R^1$ to $R^{11}$ are independently hydrogen or a monovalent (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), and (vii) hydrocarbyl-substituted heteroatom groups. The "free" valence bond on the left of Formulae I, II and m provides at least one of the links of E into the rest of Formula A. The other link or links are preferably provided by at least one of the nitrogen atoms in the imidazole-containing group. These defined groups $R^1$ to $R^{11}$ preferably contain 1 to 30, more preferably 2 to 20, most preferably 2 to 12 carbon atoms. Examples of suitable aliphatic hydrocarbon groups are methyl, ethyl, ethylenyl, butyl, hexyl, isopropyl and tert-butyl. Examples of suitable alicyclic hydrocarbon groups are adamantyl, norbornyl, cyclopentyl and cyclohexyl. Examples of suitable aromatic hydrocarbon groups are phenyl, biphenyl, naphthyl, phenanthryl and anthryl. Examples of suitable alkyl substituted aromatic hydrocarbon groups are benzyl, tolyl, mesityl, 2,6-diisopropylphenyl and 2,4,6-triisopropyl. Examples of suitable heterocyclic groups are 2-pyridinyl, 3-pyridinyl, 2-thiophenyl, 2-furanyl, 2-pyrrolyl, 2-quinolinyl. Suitable substituents for forming heterosubstituted derivatives of said groups $R^1$ to $R^{11}$ are, for example, chloro, bromo, fluoro, iodo, nitro, amino, cyano, ether, hydroxyl and silyl, methoxy, ethoxy, phenoxy (i.e. $-OC_6H_5$), tolyloxy (i.e. $-OC_6H_4(CH_3)$), xylyloxy, mesityloxy, dimethylamino, diethylamino, methylethylamino, thiomethyl, thiophenyl and trimethylsilyl. Examples of suitable heterosubstituted derivatives of said groups (i) to (v) are 2-chloroethyl, 2-bromocyclohexyl, 2-nitrophenyl, 4-ethoxyphenyl, 4-chloro-2-pyridinyl, 4-dimethylaminophenyl and 4-methylaminophenyl. Examples of suitable hydrocarbyl-substituted heteroatom groups are chloro, bromo, fluoro, iodo, nitro, amino, cyano, ether, hydroxyl and silyl, methoxy, ethoxy, phenoxy (i.e. $-OC_6H_5$), tolyloxy (i.e. $-OC_6H_4(CH_3)$), xylyloxy, mesityloxy, dimethylamino, diethylamino, methylethylamino, thiomethyl, thiophenyl and trimethylsilyl. Any of the substituents $R^1$ to $R^{11}$ may be linked to form cyclic structures. Substituents $R^2$ to $R^{11}$ may also suitably be inorganic groups such as fluoro, chloro, bromo, iodo, nitro, amino, cyano and hydroxyl.

Further suitable imidazole-containing groups may be obtained by removal of substituent $R_1$, for example by deprotonation when $R^1$ is hydrogen, to give formally monoanionic imidazole-containing groups.

It is preferred that the imidazole-containing group has a structure described in formula III (a "benzimidazole"). $R^1$ is preferably hydrogen, an aliphatic hydrocarbon group, an aromatic hydrocarbon group or is removed to give a formally monoanionic benzimidazole group. $R^8$ to $R^{11}$ are preferably hydrogen, an aliphatic hydrocarbon group or an aromatic hydrocarbon group.

$E^1$ and $E^2$ (hereinafter referred to as "E") can be the same or different. E is independently selected from divalent (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), and (vii) hydrocarbyl-substituted heteroatom groups. Examples of suitable divalent groups E are $-CH_2-$, $-CH_2CH_2-$, $-CH_2CH_2CH_2-$, 1,2-phenylene, trans-1,2-cyclopentane, trans-1,2-cyclohexane, 2,3-butane, 1,1'-biphenyl, 1,1'-binaphthyl, and $-Si(Me)_2-$. It is preferred that E is an aliphatic or aromatic hydrocarbon group. More preferably the divalent group E is $-CH_2-$.

$D^1$ and $D^2$ can be the same or different donor groups, for example oxygen, sulfur, an amine, an imine or a phosphine. Preferably $D^1$ and $D^2$ are selected from oxygen, sulfur, an amine of formula $-N(R^{12})-$ or a phosphine of formula $-P(R^{13})-$ wherein $R^{12}$ and $R^{13}$ are hydrogen or (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), (vii) hydrocarbyl-substituted heteroatom groups and (viii) further imidazole-containing groups. Alternatively $R^{12}$ or $R^{13}$ may be removed, for example by deprotonation when they are hydrogen, to give a formally monoanionic fragment; or if both $R^{12}$ or $R^{13}$ are removed they provide a formally dianionic fragment. More preferably $D^2$ is an amine of formula $-N(R^{12})-$ as defined above. $R^{12}$ is preferably hydrogen, an aliphatic hydrocarbon, an aromatic hydrocarbon or a further imidazole containing group. Preferably $D^2$ is an imidazole-containing group.

M is preferably a metal selected from Groups 3 to 11 of the periodic table, preferably from Groups 3 to 7, more preferably selected from Sc, Ti, Zr, Hf, V, Nb, Ta, Cr, Mo, W, Mn and most preferably V, Cr, Ti, Zr and Hf The anionic group X can be, for example, a halide, preferably chloride or bromide; or a hydrocarbyl group, for example, methyl, benzyl or phenyl; a carboxylate, for example, acetate or an acetylacetonate; an oxide; an amide, for example diethyl amide; an alkoxide, for example, methoxide, ethoxide or phenoxide; or a hydroxyl. Alternatively, X can be a non-coordinating or weakly-coordinating anion, for example, tetrafluoroborate, a fluorinated aryl borate or a triflate. The anionic groups X maybe the same or different and may independently be monoanionic, dianionic or trianionic.

The neutral donor group L can be, for example, a solvate molecule, for example diethyl ether or THF; an amine, for example, diethyl amine, trimethylamine or pyridine; a phosphine, for example trimethyl phosphine or triphenyl phosphine; or water; or an olefin or a neutral, conjugated or nonconjugated diene, optionally substituted with one or more groups selected from hydrocarbyl or trimethylsilyl groups, said group having up to 40 carbon atoms and forming a pi-complex with M. When L is a diene ligand, it can be, for example s-trans-$\eta^4$-1,4-diphenyl-1,3-butadiene; s-trans-$\eta^4$-3-methyl-1,3-pentadiene; s-trans-$\eta^4$-1,4-dibenzyl-1,3-butadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-trans-$\eta^4$-1,4-diphenyl-1,3-butadiene; s-cis-$\eta^4$-3-methyl-1,3-pentadiene; s-cis-$\eta^4$-1,4-dibenzyl-1,3-butadiene; s-cis-$\eta^4$-2,4-hexadiene; s-cis-$\eta^4$-1,3-pentadiene; s-cis-$\eta^4$-1,4-ditolyl-1,3-butadiene; or s-cis-$\eta^4$-1,4-bis(trimethylsilyl)-1,3-butadiene, said s-cis isomers forming a .pi.-bound diene complex;

The value of y depends on the formal charge on each group Z and D, the charge on the anionic group X and the oxidation state of the metal M. For example, if M is chromium in oxidation state +3, Z is a neutral group and both D groups are neutral, then y is 3 if X is a monoanionic group (e.g. chloride); if M is chromium in oxidation state +3, the Z group is neutral, one D group is monoanionic and the other D is neutral, then y is 2 if all X groups are monoanionic groups (e.g. chloride).

The optional activator (2) for the catalyst of the present invention is suitably selected from organoaluminium compounds and organoboron compounds or mixtures thereof. Examples of organoaluminium compounds include trialkyaluminium compounds, for example, trimethylaluminium, triethylaluminium, tributylaluminium, tri-n-octylaluminium, ethylaluminium dichloride, diethylaluminium chloride, tris(pentafluorophenyl)aluminium and alumoxanes. Alumoxanes are well known in the art as typically the oligomeric compounds which can be prepared by the controlled addition of water to an alkylaluminium compound, for example trimethylaluminium. Such compounds can be linear, cyclic or mixtures thereof. Commercially available alumoxanes are generally believed to be mixtures of linear, cyclic and cage compounds. The cyclic alumoxanes can be represented by the formula $[R^{16}AlO]_s$ and the linear alumoxanes by the formula $R^{17}(R^{18}AlO)_s$ wherein s is a number from about 2 to 50, and wherein $R^{16}$, $R^{17}$, and $R^{18}$ represent hydrocarbyl groups, preferably $C_1$ to $C_6$ alkyl groups, for example methyl, ethyl or butyl groups.

Examples of suitable organoboron compounds are dimethylphenylammoniumtetra(phenyl)borate, trityltetra(phenyl)borate, triphenylboron, dimethylphenylammonium tetra(pentafluorophenyl)borate, sodium tetrakis[(bis-3,5-trifluoromethyl)phenyl]borate, $H^+(OEt_2)[(bis-3,5-trifluoromethyl)phenyl]borate$, trityltetra(pentafluorophenyl)borate and tris(pentafluorophenyl)boron. Mixtures of organoaluminium compounds and organoboron compounds may be used.

In the preparation of the catalysts of the present invention the quantity of activating compound selected from organoaluminium compounds and organoboron compounds to be employed is easily determined by simple testing, for example, by the preparation of small test samples which can be used to polymerise small quantities of the monomer(s) and thus to determine the activity of the produced catalyst. It is generally found that the quantity employed is sufficient to provide 0.1 to 20,000 atoms, preferably 1 to 2000 atoms of aluminium or boron per atom of M present in the compound of Formula A. Mixtures of different activating compounds may be used.

EP1238989 discloses the use of activators (Lewis acids) selected from
 (b-1) ionic-bonding compounds having a $CdCl_2$ type or a $CdI_2$ type of layered crystal structure;
 (b-2) clays, clay minerals, or ion-exchange layered compounds;
 (b-3) heteropoly-compounds; and
 (b-4) halogenated lanthanoid compounds.

The activator employed in the present invention may be of the type disclosed in EP1238989 if desired. Such Lewis acids are those compounds which capable of receiving at least one electron pair and is capable of forming an ion pair by reaction with the transition metal complex. The Lewis acid includes the afore-mentioned (b-1) ionic-bonding compounds having a layered crystal structure of a $CdCl_2$ type or $CdI_2$ type (b-2) clay clay minerals, or ion-exchange layered compounds, (b-3) heteropoly compounds, and (b-4) halogenated lanthanoid compounds. The Lewis acid further includes $SiO_2$, $Al_2O_3$, natural and synthetic zeolites which have Lewis acid points formed by heating or a like treatment, and complexes and mixtures thereof.

U.S. Pat. No. 6,399,535 discloses a coordinating catalyst system capable of polymerizing olefins comprising:
(I) as a pre-catalyst, at least one non-metallocene, non-constrained geometry, bidentate ligand containing transition metal compound or tridentate ligand containing transition metal compound capable of (A) being activated upon contact with the catalyst support-activator agglomerate of (B) or (B) being converted, upon contact with an organometallic compound, to an intermediate capable of being activated upon contact with the catalyst support-activator agglomerate of (II), wherein the transition metal is at least one member selected from Groups 3 to 10 of the Periodic table; in intimate contact with (II) catalyst support-activator agglomerate comprising a composite of (A) at least one inorganic oxide component selected from $SiO_2$, $Al_2O_3$, MgO, $AlPO_4$, $TiO_2$, $ZrO_2$, and $Cr_2O_3$ and (B) at least one ion containing layered material having interspaces between the layers and sufficient Lewis acidity, when present within the catalyst support-activator agglomerate, to activate the pre-catalyst when the pre-catalyst is in contact with the catalyst support-activator agglomerate, said layered material having a cationic component and an anionic component, wherein said cationic component is present within the interspaces of the layered material, said layered material being intimately associated with said inorganic oxide component within the agglomerate in an amount sufficient to improve the activity of the coordinating catalyst system for polymerizing ethylene monomer, expressed as Kg of polyethylene per gram of catalyst system per hour, relative to the activity of a corresponding catalyst system employing the same pre-catalyst but in the absence of either Component A or B of the catalyst support-activator agglomerate; wherein the amounts of the pre-catalyst and catalyst support-activator agglomerate which are in intimate contact are sufficient to provide a ratio of micromoles of pre-catalyst to grams of catalyst support-activator agglomerate of from about 5:1 to about 500:1. The layered material can be,. for example, a smectite clay. The catalyst system of the present invention can be employed with a catalyst support-activator agglomerate as described in U.S. Pat. No. 6,399,535 if desired.

In addition to the activator compound, it can be advantageous to employ catalytic quantities of certain halogenated compounds that are capable of promoting catalyst activity. Promoters of this type are especially useful in the case that the transition metal in the complex is vanadium. U.S. Pat. No. 5,191,042 discloses that certain vanadium-based catalysts activated with organoaluminium compounds can be promoted using a variety of halogenated organic compounds, for example, carbon tetrachloride, hexachloroethylene, benzylbromide, benzylchloride and 2,3- or 1,3-dichloropropylene. Other examples of halogenated organic compounds that can be used in this manner are ethyl trichloroacetate, chloroform ($CHCl_3$) and n-butylchloride. U.S. Pat. No. 5,191,042 also. refers to the disclosure of Cooper (T. A Cooper, Journ. Am. Chem. Soc., 4158 (1973), which defines in Table 1 an organic halide activity index based on the ability of the halide to oxidize certain vanadium compounds under standard conditions. For example, carbon tetrachloride is assigned a reactivity of 1 in tetrahydrofuran at 20° C., and other listed halogenated organic compounds have reactivities of from about 0.02 to greater than 200 relative to carbon tetrachloride. When it is desired to use a halogenated promotor, it is preferred to use those having a Cooper Index ranging from about 0.01 up to about 30. The use of such promoters, especially in combination with vanadium-based catalysts is generally well known in the art, and for details of use of the such promoters reference may be made to U.S. Pat. No. 5,191,042 and to other prior art in this field. In the present invention it is possible to employ any halogenated organic compound as a promoter, but the compounds mentioned above are preferred.

A preferred embodiment of the present invention provides a catalyst comprising (1) a transition metal compound having the following Formula B or C, and optionally (2) an activating quantity of a suitable activator,

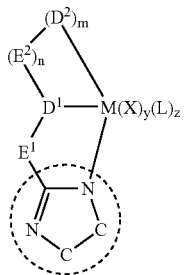

Formula B

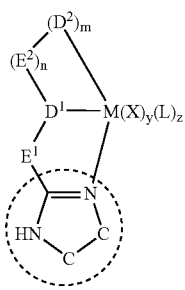

Formula C wherein the imidazole nucleus shown within the dotted circle is selected from the divalent groups represented by the Formulae Ia, IIa, IIIa, IVa, Va and VIa,

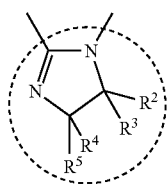

Ia

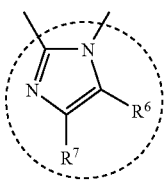

IIa

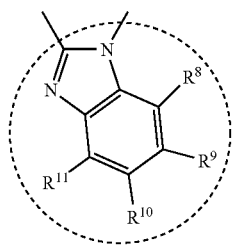

IIIa

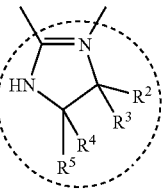

IVa

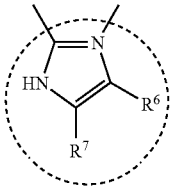

Va

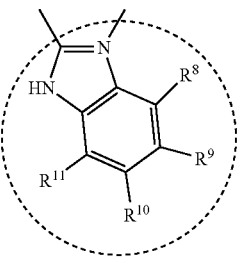

VIa wherein M is a metal from Group 3 to 11 of the Periodic Table or a lanthanide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon (v) heterocyclic groups and (vi) heterosubstituted derivatives of said groups (i) to (v); $D^1$ and $D^2$ are donor groups; X is an anionic group, L is a neutral donor group; n=m=zero or 1; y and z are independently zero or integers such that the number of X and L groups satisfy the valency and oxidation state of the metal M, wherein the groups $R^2$ to $R^{11}$ are independently hydrogen or a monovalent (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), and (vii) hydrocarbyl-substituted heteroatom groups.

M is preferably selected from Groups 3 to 7 of the periodic table.

Groups $R^2$ to $R^{11}$ are preferably selected from the groups defined above in relation to the Formula I, II, III, IV, V and VI groups.

In this preferred embodiment of the present invention, $D^1$ and $D^2$ can be the same or different donor groups, for example oxygen, sulfur, an amine, an imine or a phosphine. Preferably $D^1$ and $D^2$ are selected from oxygen, sulfur, an amine of formula —N($R^{12}$)— or a phosphine of formula —P($R^{13}$)— wherein $R^{12}$ and $R^{13}$ are hydrogen or (i) aliphatic hydrocarbon, (ii) alicyclic hydrocarbon, (iii) aromatic hydrocarbon, (iv) acyl substituted aromatic hydrocarbon (v) heterocyclic groups, (vi) heterosubstituted derivatives of said groups (i) to (v), (vii) hydrocarbyl-substituted heteroatom groups and (viii) further imidazole-containing groups.

Preferably $D^1$ is nitrogen for example —$NR^1$— or =N— or a nitrogen-containing group, for example —$N(R^1)$—$R^{20}$— wherein $R^1$ represents a monovalent group and $R^{20}$ represents a divalent group derived from, for example, aliphatic hydrocarbon groups such as methyl, ethyl, ethylenyl, butyl, hexyl, isopropyl and tert-butyl. Examples of suitable alicyclic hydrocarbon groups are adamantyl, norbornyl, cyclopentyl and cyclohexyl. Examples of suitable aromatic hydrocarbon groups are phenyl, biphenyl, naphthyl, phenanthryl and anthryl. Examples of suitable alkyl substituted aromatic hydrocarbon groups are benzyl, tolyl, mesityl, 2,6-diisopropylphenyl and 2,4,6-triisopropyl. Examples of suitable heterocyclic groups are 2-pyridinyl, 3-pyridinyl, 2-thiophenyl, 2-furanyl, 2-pyrrolyl, 2-quinolinyl. Suitable substituents for forming heterosubstituted derivatives of said groups $R^1$ to $R^{11}$ are, for example, chloro, bromo, fluoro, iodo, nitro, amino, cyano, ether, hydroxyl and silyl, methoxy, ethoxy, phenoxy (i.e. —$OC_6H_5$), tolyloxy (i.e. —$OC_6H_4(CH_3)$), xylyloxy, mesityloxy, dimethylamino, diethylamino, methylethylamino, thiomethyl, thiophenyl and trimethylsilyl. Examples of suitable heterosubstituted derivatives of said groups (i) to (v) are 2-chloroethyl, 2-bromocyclohexyl, 2-nitrophenyl, 4-ethoxyphenyl, 4-chloro-2-pyridinyl, 4-dimethylaminophenyl and 4-methylaminophenyl. Examples of suitable hydrocarbyl-substituted heteroatom groups are chloro, bromo, fluoro, iodo, nitro, amino, cyano, ether, hydroxyl and silyl, methoxy, ethoxy, phenoxy (i.e. —$OC_6H_5$), tolyloxy (i.e. —$OC_6H_4(CH_3)$), xylyloxy, mesityloxy, dimethylamino, diethylamino, methylethylamino, thiomethyl, thiophenyl and trimethylsilyl. Any of the substituents $R^1$ to $R^{11}$ may be linked to form cyclic structures. Substituents $R^2$ to $R^{11}$ may also suitably be inorganic groups such as fluoro, chloro, bromo, iodo, nitro, amino, cyano and hydroxyl Preferably $D^2$ is a imidazole group selected from the groups of Formula Ia, IIa and IIIa above.

As indicated above, the values of m and n in the present invention are such that m=n=zero or one. For the avoidance of doubt, this means that for a given complex, when m is zero, n is also zero. And when m is 1, n is also 1.

When m and n are zero in Formula A, the Formula reduces to Formula D, preferably to Formula E or Formula F

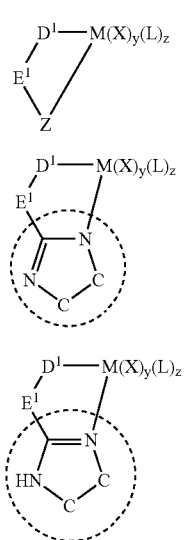

Formula D

Formula E

Formula F wherein D1, E1, Z, M, X, L, y and z are as defined above, and wherein the imidazole nucleus within the dotted circle is selected from the divalent groups represented by the Formulae Ia, IIa, IIIa, IVa, Va and VIa

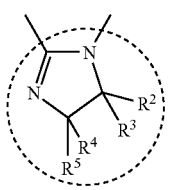

Ia

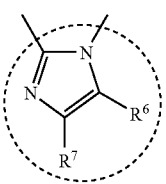

IIa

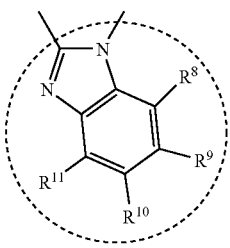

IIIa

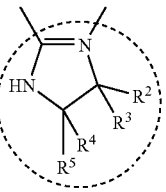

IVa

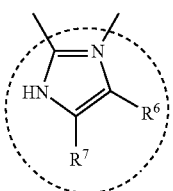

Va

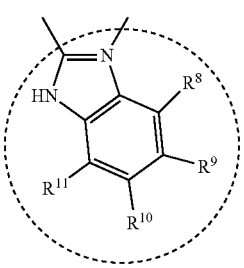

VIa

The following ligands represent some examples of those suitable for making the complexes of Formula C and D in accordance with the present invention.

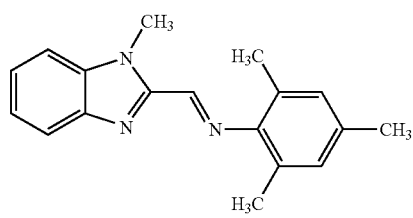
Formula 20
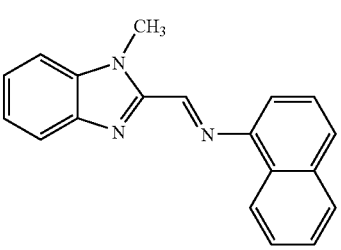
Formula 26
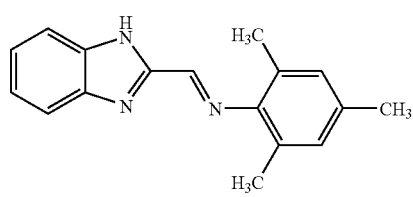
Formula 21
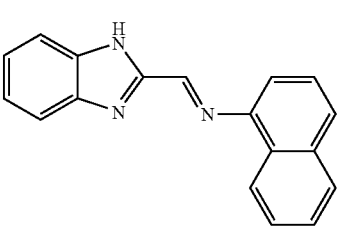
Formula 27
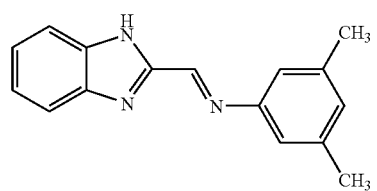
Formula 22
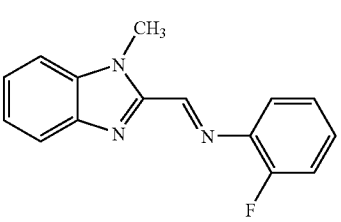
Formula 28
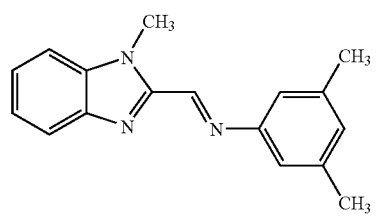
Formula 23
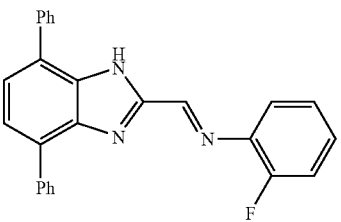
Formula 29
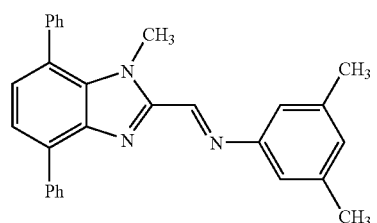
Formula 24
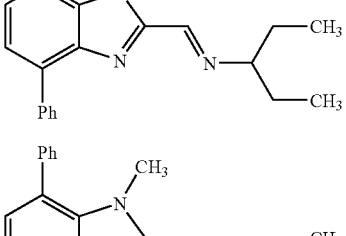
Formula 30
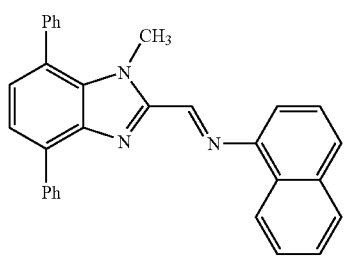
Formula 25
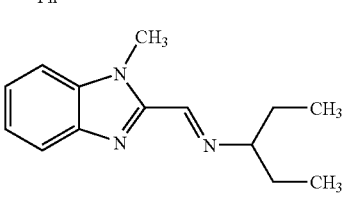
Formula 31
Formula 33

-continued
Formula 33
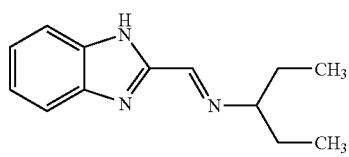
Formula 34
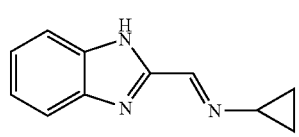
Formula 35
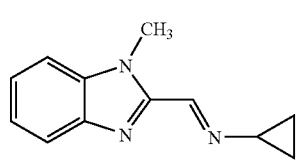
Formula 36
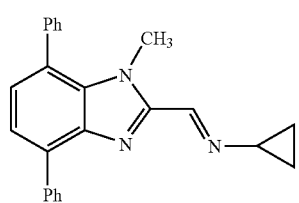
Formula 37
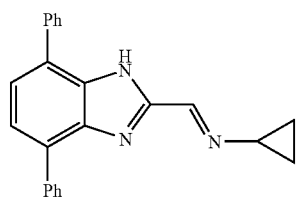
Formula 38
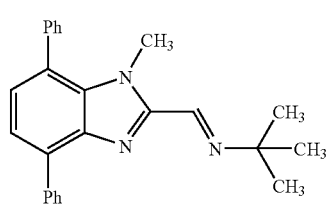
Formula 39
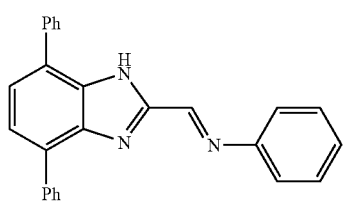
-continued
Formula 40
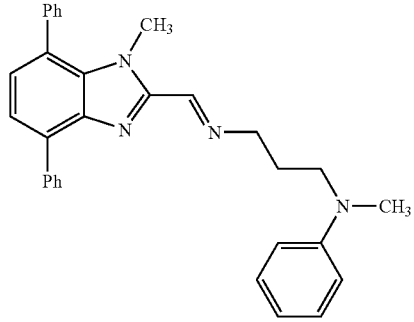
Formula 41
Formula 42
Formula 43
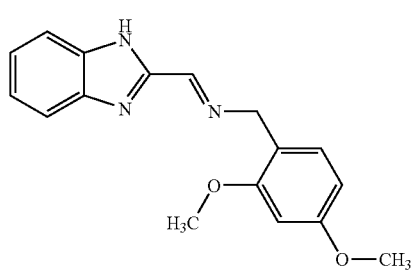
Formula 44

-continued
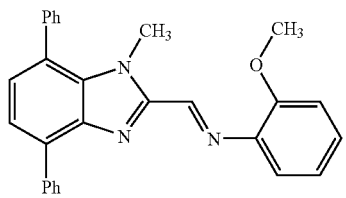
Formula 45
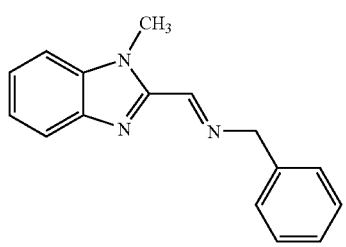
Formula 46
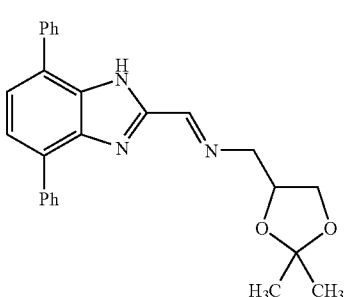
Formula 47
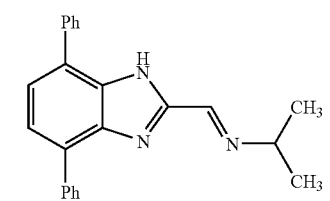
Formula 48
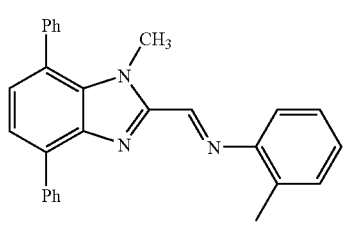
Formula 49
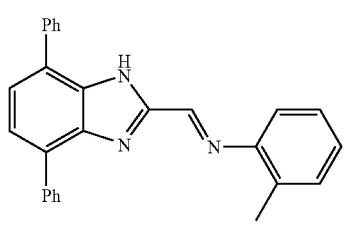
Formula 50
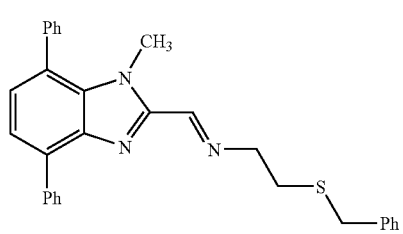
Formula 51
-continued
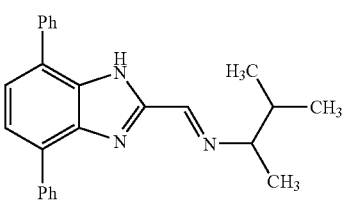
Formula 52
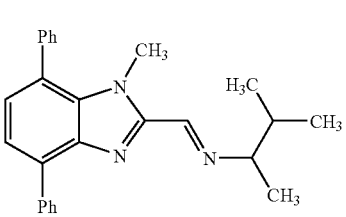
Formula 53
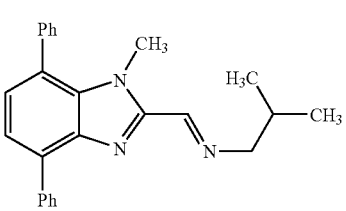
Formula 54
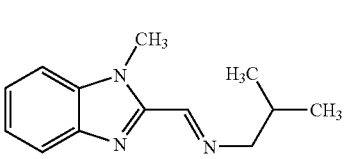
Formula 55
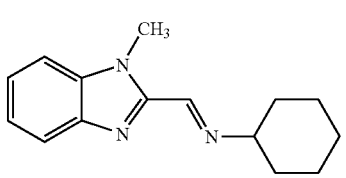
Formula 56
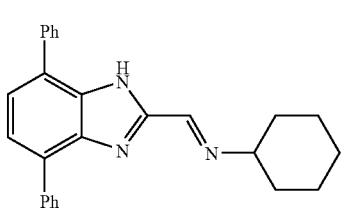
Formula 57
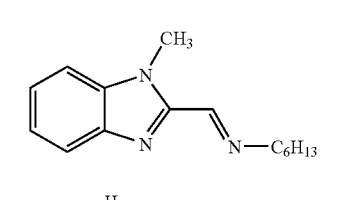
Formula 58
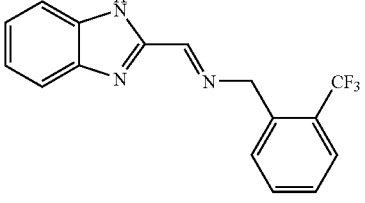
Formula 59

-continued
Formula 60
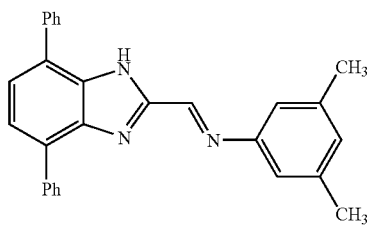
Formula 61
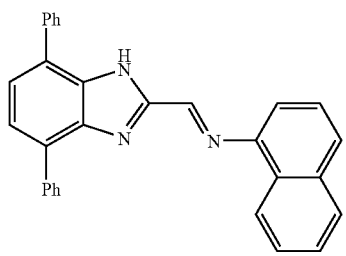
Formula 62
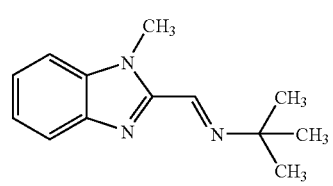
Formula 63
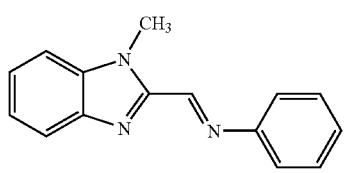
Formula 64
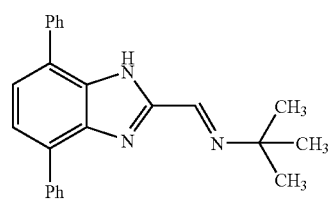
Formula 65
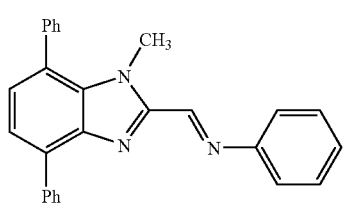
Formula 66
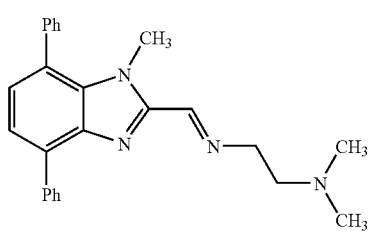
Formula 67
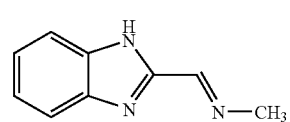
-continued
Formula 68
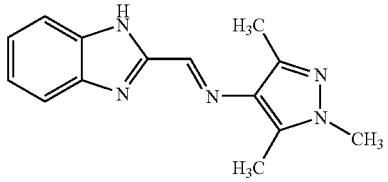
Formula 69
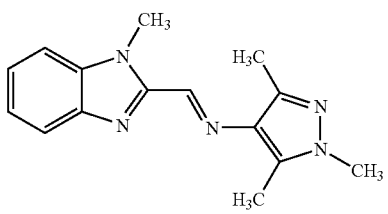
Formula 70
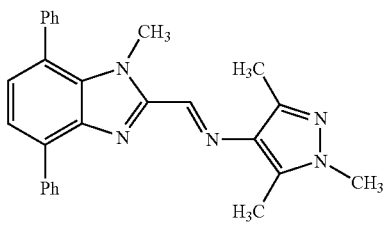
Formula 71
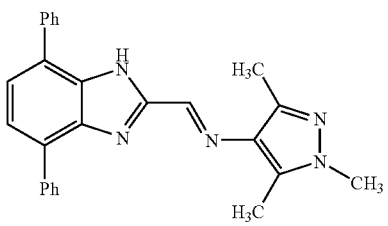
Formula 72
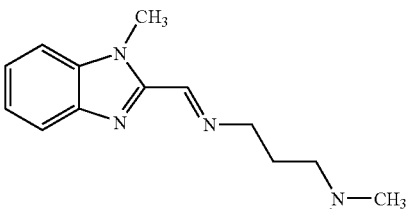
Formula 73

-continued
Formula 74
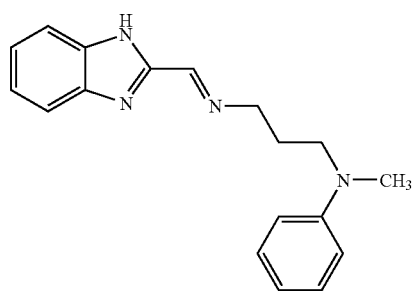
Formula 75
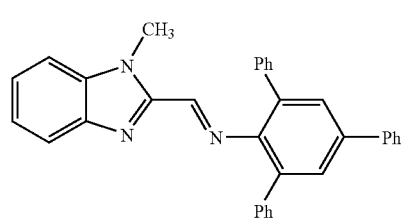
Formula 76
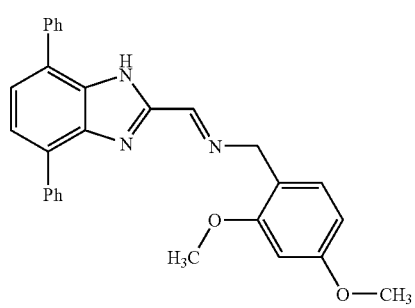
Formula 77
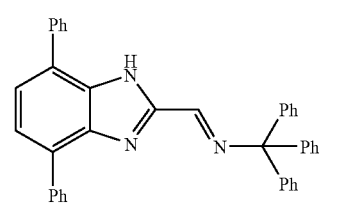
Formula 78
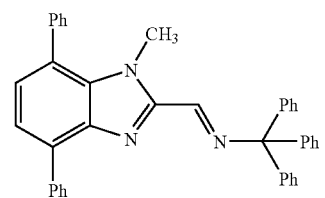
Formula 79
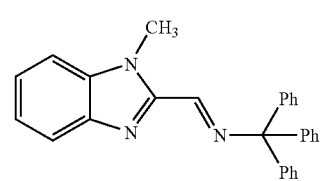
Formula 80
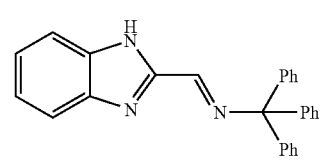
-continued
Formula 81
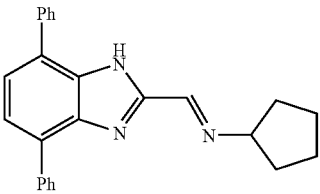
Formula 82
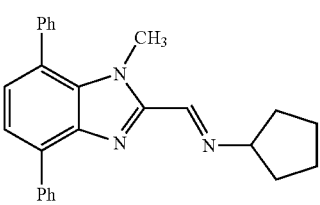
Formula 83
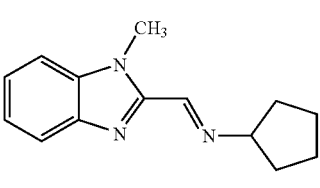
Formula 84
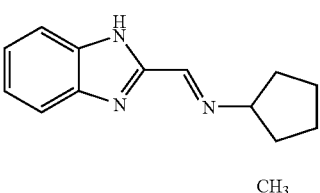
Formula 85
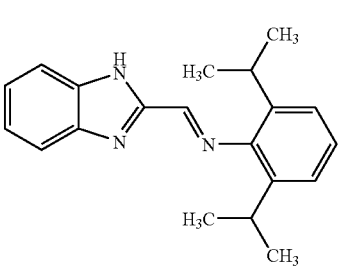
Formula 86
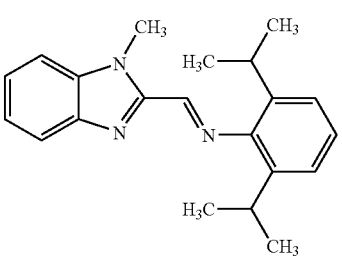
Formula 87
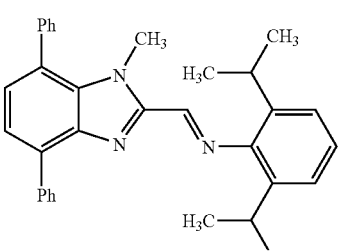

Formula 88
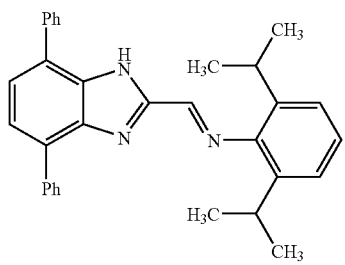
Formula 89
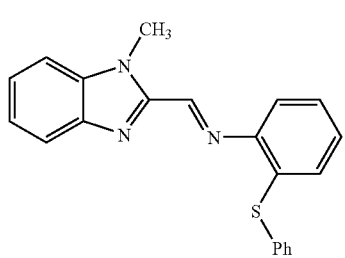
Formula 90
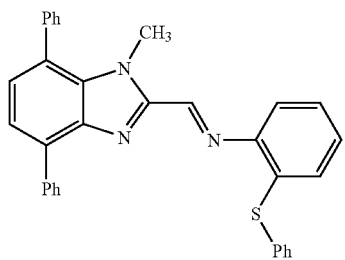
Formula 91
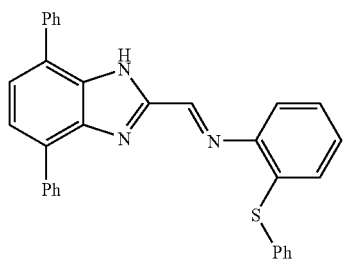
Formula 92
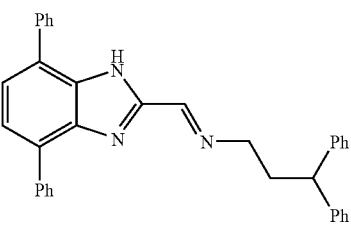
Formula 93
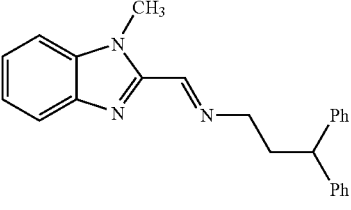
Formula 94
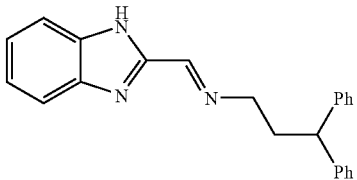
Formula 95
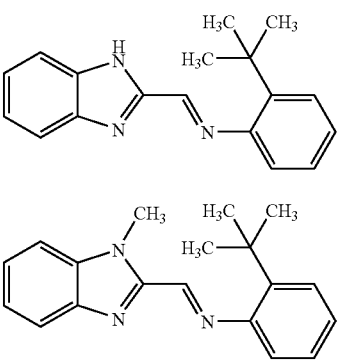
Formula 96
Formula 97
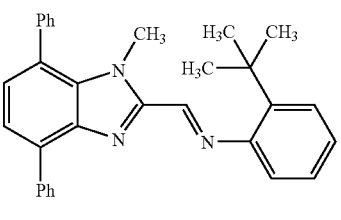
Formula 98
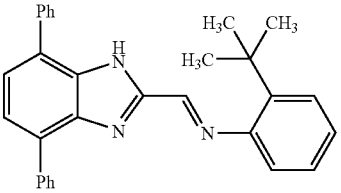
Formula 99
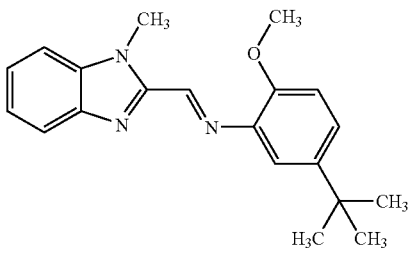
Formula 100
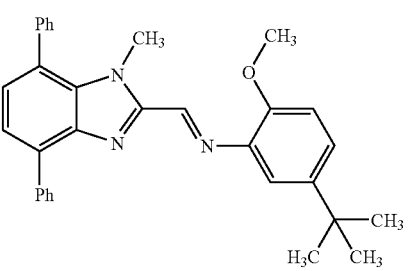

-continued
Formula 101
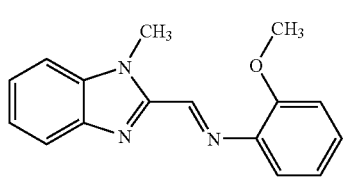
Formula 102
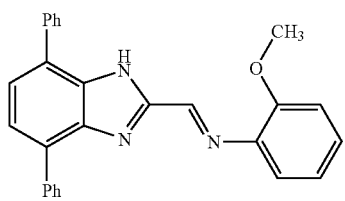
Formula 103
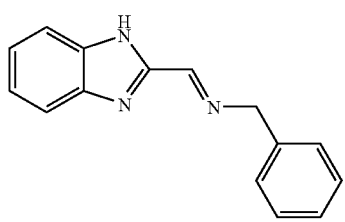
Formula 104
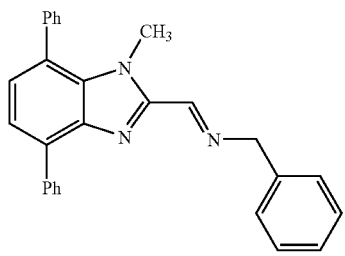
Formula 105
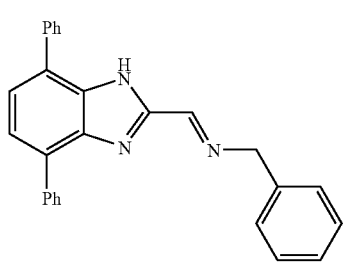
Formula 106
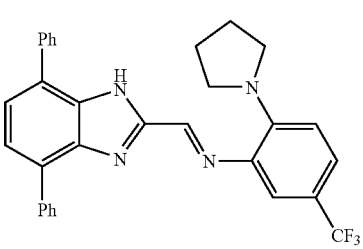
Formula 107
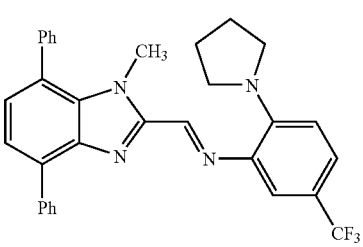
-continued
Formula 108
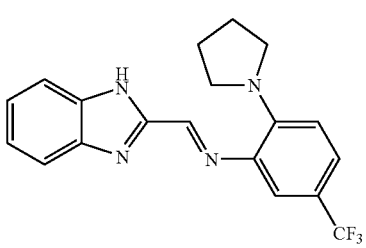
Formula 109
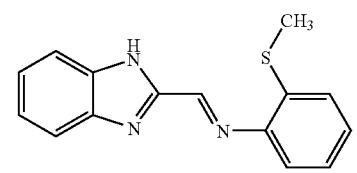
Formula 110
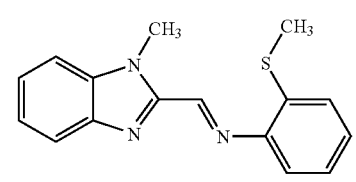
Formula 111
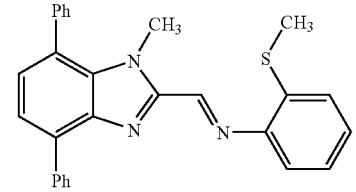
Formula 112
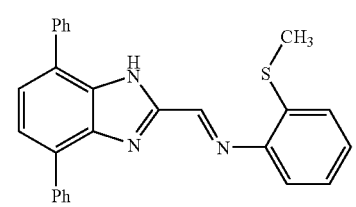
Formula 113
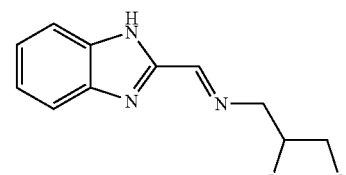
Formula 114
Formula 115
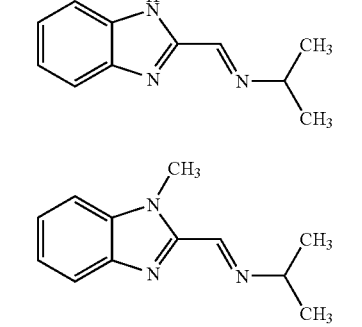

-continued
Formula 116
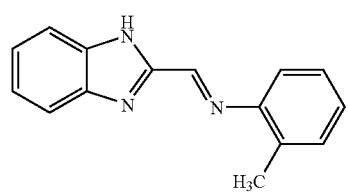
Formula 117
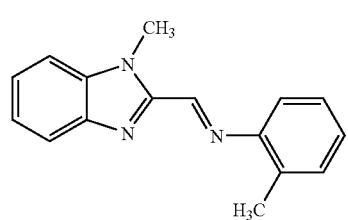
Formula 118
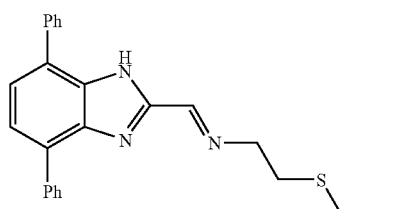
Formula 119
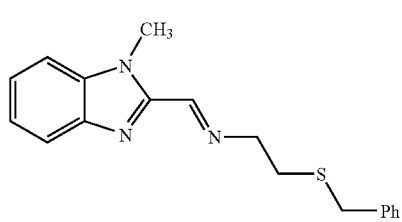
Formula 120
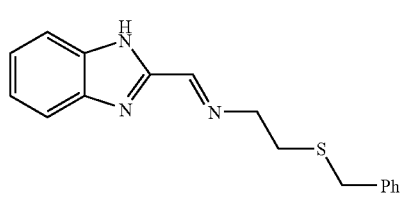
Formula 121
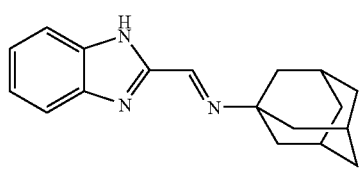
Formula 122
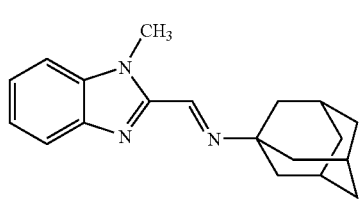
-continued
Formula 123
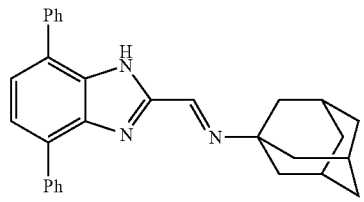
Formula 124
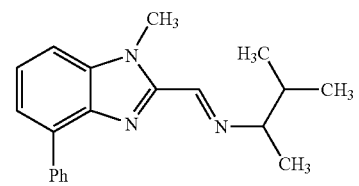
Formula 125
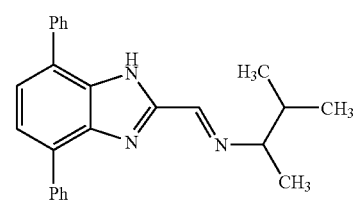
Formula 126
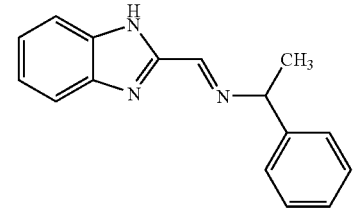
Formula 127
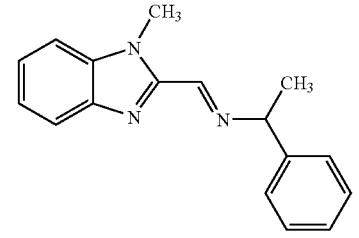
Formula 128
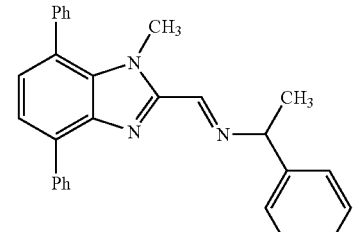
Formula 129
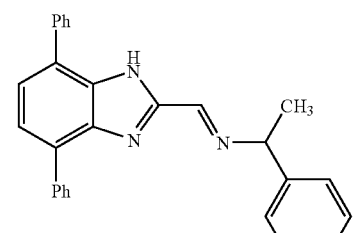

-continued
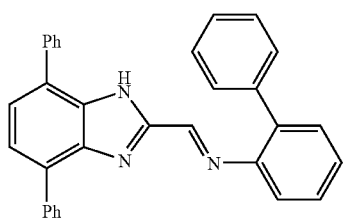
Formula 130
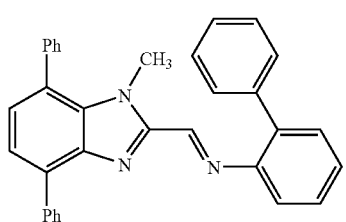
Formula 131
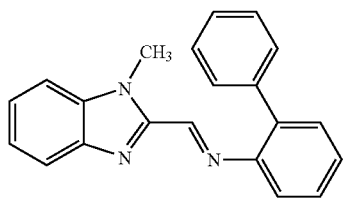
Formula 132
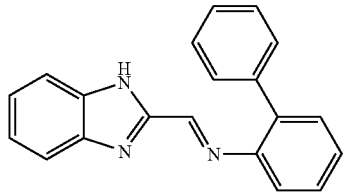
Formula 133
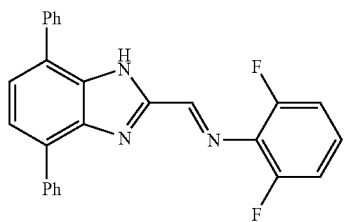
Formula 134
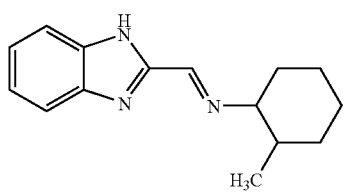
Formula 135
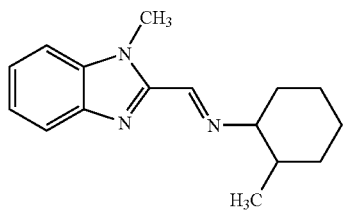
Formula 136
-continued
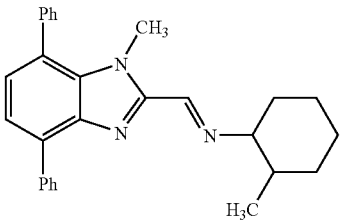
Formula 137
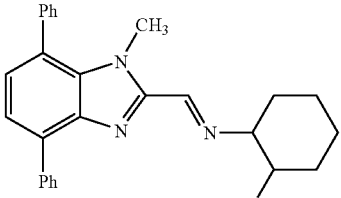
Formula 137
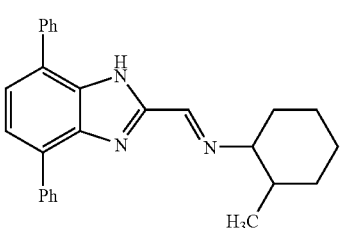
Formula 138
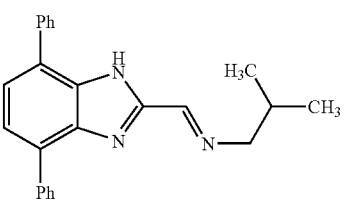
Formula 139
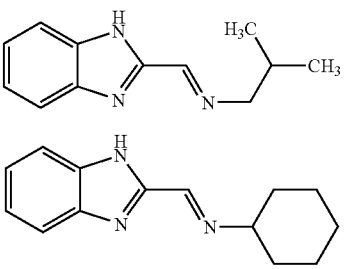
Formula 140
Formula 141
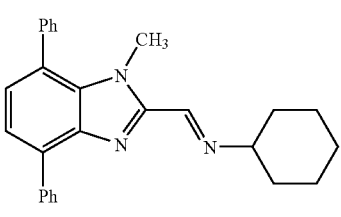
Formula 142
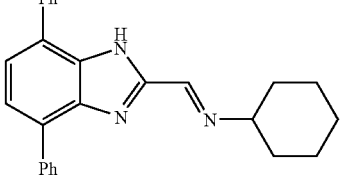
Formula 143

-continued

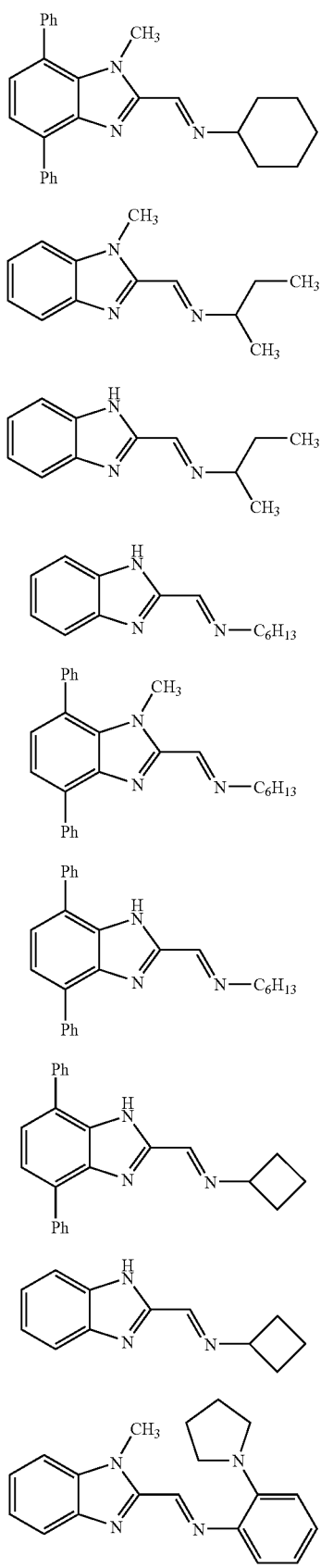

Formula 144

Formula 145

Formula 146

Formula 147

Formula 148

Formula 149

Formula 150

Formula 151

Formula 152

-continued

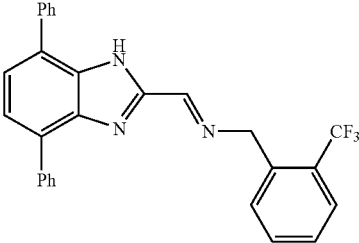

Formula 153

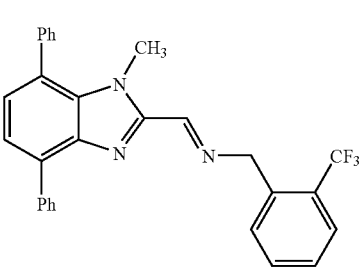

Formula 154

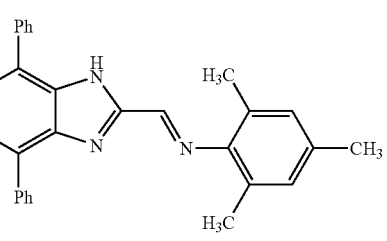

Formula 155

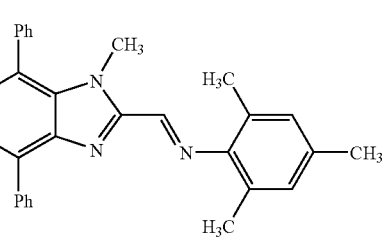

Formula 156

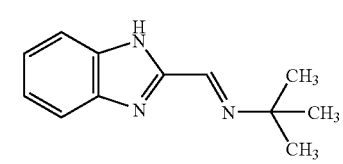

Formula 157

These ligands can be used to make complexes and catalysts in accordance with the present invention wherein the transition metal is preferably titanium, zirconium, hafnium, vanadium or chromium.

The following are examples of transition metal complexes that can be employed in the catalyst of the present invention:—

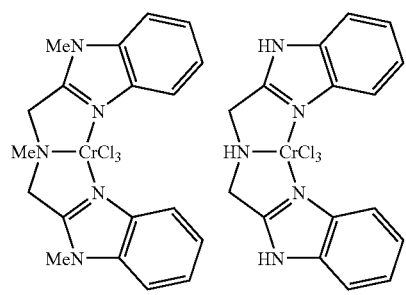
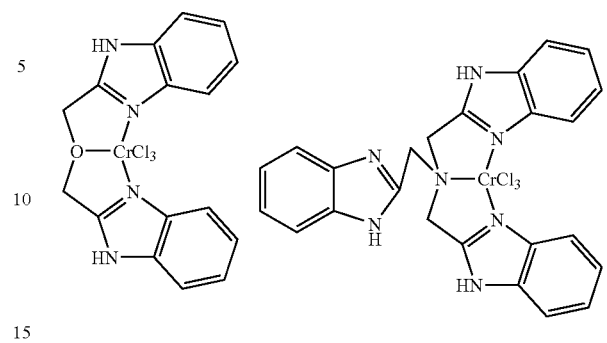
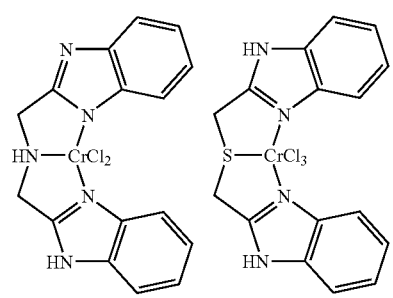
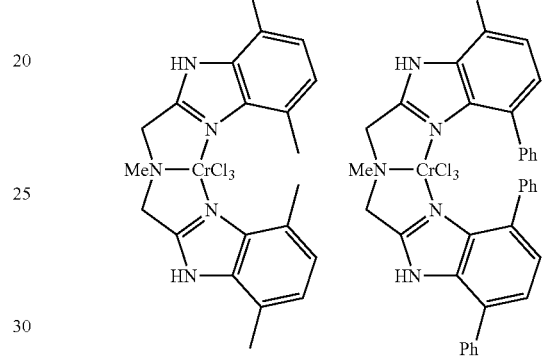
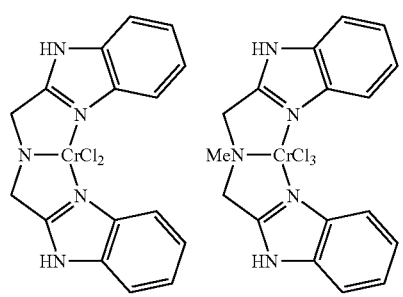
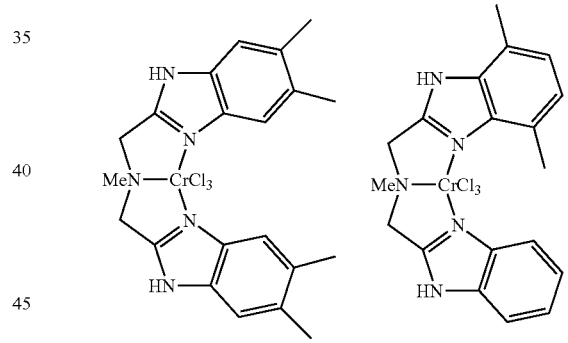
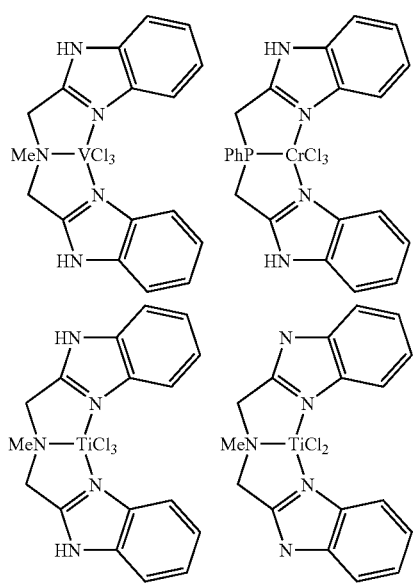
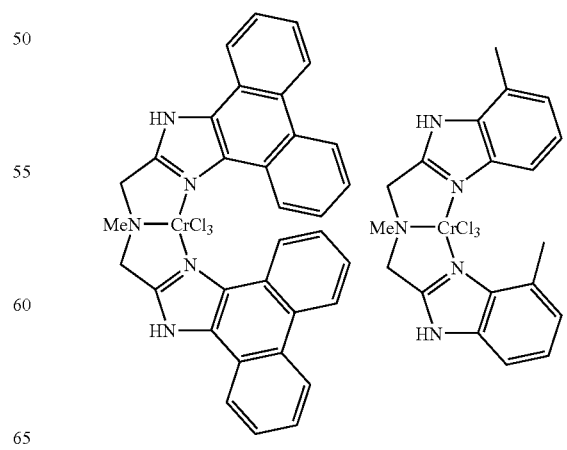

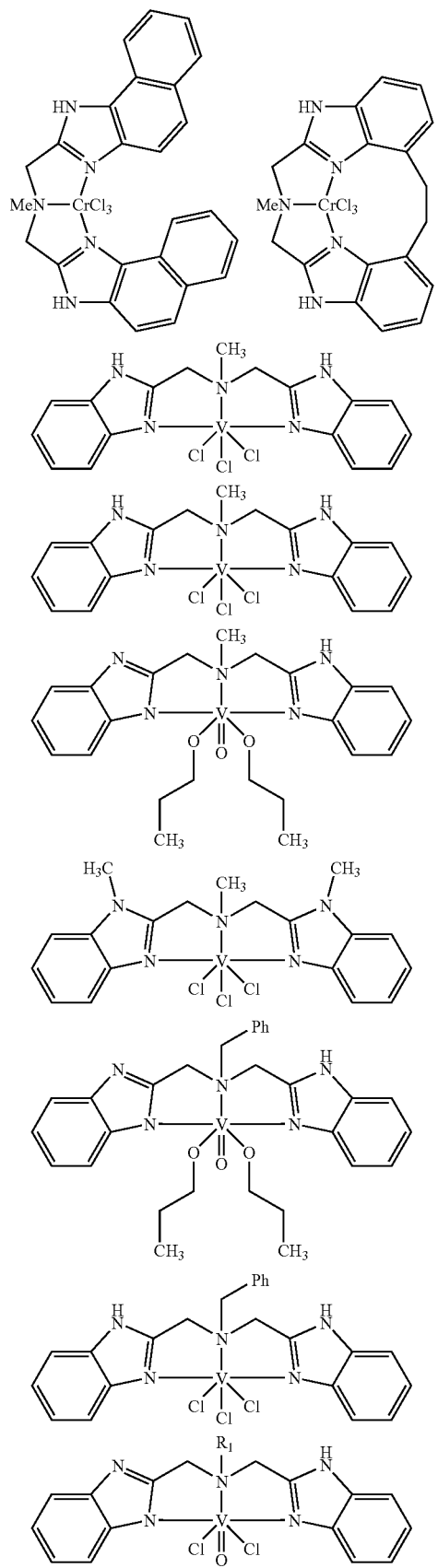
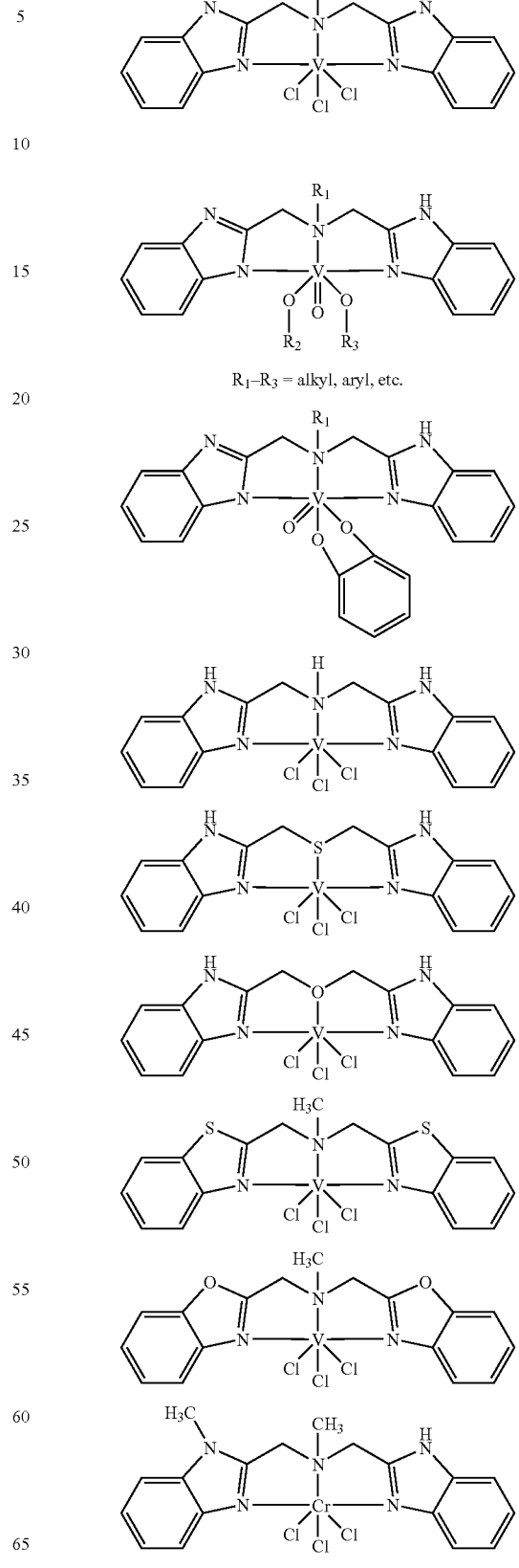

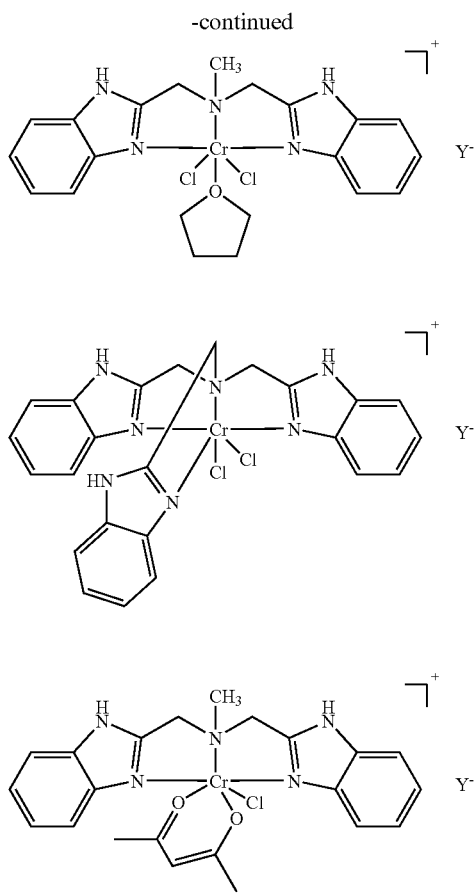

Y = Cl, SbF₆, BF4, B(C6F5)4, etc

The following Formulae illustrate the transition metal compounds according to the present invention wherein L is a diene:

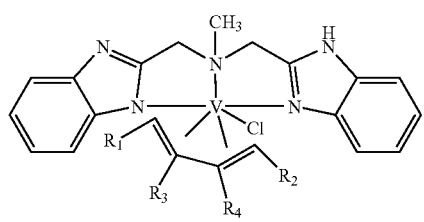

R1–R4 = alkyl, arly, etc.

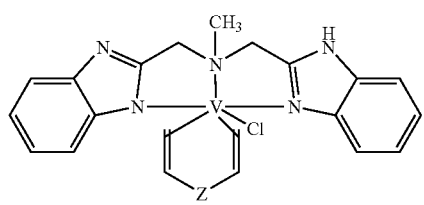

Z = divalent organic or inorganic radical as
—CH2—, —O—,

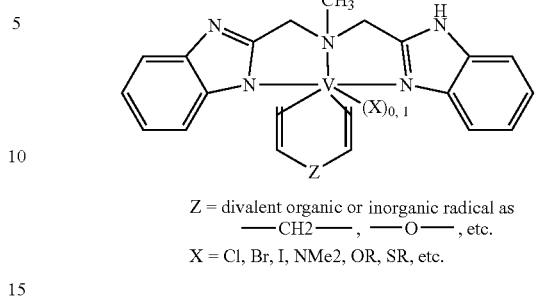

Z = divalent organic or inorganic radical as
—CH2—, —O—, etc.
X = Cl, Br, I, NMe2, OR, SR, etc.

The catalyst of the present invention can, if desired, be utilised on a support material. Suitable support materials are, for example, silica, alumina, or zirconia, magnesia, magnesium chloride or a polymer or prepolymer, for example polyethylene, polystyrene, or poly(aminostyrene).

The catalysts of the present invention can if desired comprise more than one of the defined transition metal compounds.

In addition to said one or more defined transition metal compounds, the catalysts of the present invention can also include one or more other catalysts for polymerising 1-olefins. Preferably such catalysts are other types of transition metal compounds or catalysts, for example, transition metal compounds of the type used in conventional Ziegler-Natta catalyst systems, metallocene-based catalysts, or heat activated supported chromium oxide catalysts (e.g. Phillips-type catalyst). The catalysts of the present invention may also used in conjunction with other catalysts producing only 1-olefins, either inside or outside the polymerisation reactor, and in this way make copolymers of ethylene or propylene and these 1-olefins. Suitable catalysts for producing 1-olefins may produce only 1-butene, only 1-hexene or a distribution (for example, a Schulz-Flory distribution) of 1-olefins.

If desired the catalysts can be formed in situ in the presence of the support material, or the support material can be pre-impregnated or premixed, simultaneously or sequentially, with one or more of the catalyst components. The catalysts of the present, invention can if desired be supported on a heterogeneous catalyst, for example, a magnesium halide supported Ziegler Natta catalyst, a Phillips type (chromium oxide) supported catalyst or a supported metallocene catalyst. Formation of the supported catalyst can be achieved for example by treating the transition metal compounds of the present invention with alumoxane in a suitable inert diluent, for example a volatile hydrocarbon, slurrying a particulate support material with the product and evaporating the volatile diluent. The produced supported catalyst is preferably in the form of a free-flowing powder. The quantity of support material employed can vary widely, for example from 100,000 to 1 grams per gram of metal present in the transition metal compound.

The present invention further provides a process for the polymerisation and copolymerisation of 1-olefins, cycloolefins or dienes, comprising contacting the monomer under polymerisation conditions with the polymerisation catalyst of the present invention.

Suitable monomers for use in making homopolymers using the polymerisation process of the present invention are, for example, ethylene, propylene, butene, hexene, styrene or conjugated or non-conjugated dienes. Preferred monomers are ethylene and propylene.

Suitable monomers for use in making copolymers using the polymerisation process of the present invention are ethylene, propylene, 1-butene, 1-hexene, 4-methylpentene-1, 1-octene, norbornene, substituted norbornenes, dienes, e.g. butadiene, ethylidene norbornene, methyl methacrylate, methyl acrylate, butyl acrylate, acrylonitrile, vinyl acetate, vinyl chloride, and styrene.

A particularly preferred process in accordance with the present invention is the copolymerisation of ethylene and or propylene with comonomers selected from 1-olefins, acrylic acid esters, vinyl esters and vinyl aromatic compounds. Examples of suitable comonomers are 1-butene, 1-hexene, 4-methylpentene-1, methyl methacrylate, methyl acrylate, butyl acrylate, acrylonitrile, vinyl acetate, and styrene.

Preferred polymerisation processes are the homopolymerisation of ethylene or the homopolymerisation of propylene or copolymerisation of ethylene with one or more of propylene, butene, hexene-1 and 4-methylpentene-1 or copolymerisation of propylene with one or more of ethylene or butene.

The polymerisation conditions can be, for example, bulk phase, solution phase, slurry phase or gas phase. If desired, the catalyst can be used to polymerise ethylene under high pressure/high temperature process conditions wherein the polymeric material forms as a melt in supercritical ethylene. Preferably the polymerisation is conducted under gas phase fluidised or stirred bed conditions.

Slurry phase polymerisation conditions or gas phase polymerisation conditions are particularly useful for the production of high-density grades of polyethylene. In these processes the polymerisation conditions can be batch, continuous or semi-continuous. In the slurry phase process and the gas phase process, the catalyst is generally fed to the polymerisation zone in the form of a particulate solid. This solid can be, for example, an undiluted solid catalyst system formed from the complex A and an activator, or can be the solid complex A alone. In the latter situation, the activator can be fed to the polymerisation zone, for example as a solution, separately from or together with the solid complex. Preferably the catalyst system or the transition metal complex component of the catalyst system employed in the slurry polymerisation and gas phase polymerisation is supported on a support material. Most preferably the catalyst system is supported on a support material prior to its introduction into the polymerisation zone. Suitable support materials are, for example, silica, alumina, zirconia, talc, kieselguhr, magnesia, magnesium chloride and polymers. Impregnation of the support material can be carried out by conventional techniques, for example, by forming a solution or suspension of the catalyst components in a suitable diluent or solvent, and slurrying the support material therewith. The support material thus impregnated with catalyst can then be separated from the diluent for example, by filtration or evaporation techniques.

In the slurry phase polymerisation process the solid particles of catalyst, or supported catalyst, are fed to a polymerisation zone either as dry powder or as a slurry in the polymerisation diluent. Preferably the particles are fed to a polymerisation zone as a suspension in the polymerisation diluent. The polymerisation zone can be, for example, an autoclave or similar reaction vessel, or a continuous loop reactor, e.g. of the type well know in the manufacture of polyethylene by the Phillips Process. When the polymerisation process of the present invention is carried out under slurry conditions the polymerisation is preferably carried out at a temperature above 0° C., most preferably above 15° C. The polymerisation temperature is preferably maintained below the temperature at which the polymer commences to soften or sinter in the presence of the polymerisation diluent. If the temperature is allowed to go above the latter temperature, fouling of the reactor can occur. Adjustment of the polymerisation within these defined temperature ranges can provide a useful means of controlling the average molecular weight of the produced polymer. A further useful means of controlling the molecular weight is to conduct the polymerisation in the presence of hydrogen gas which acts as chain transfer agent. Generally, the higher the concentration of hydrogen employed, the lower the average molecular weight of the produced polymer.

The use of hydrogen gas as a means of controlling the average molecular weight of the polymer or copolymer applies generally to the polymerisation process of the present invention. For example, hydrogen can be used to reduce the average molecular weight of polymers or copolymers prepared using gas phase, slurry phase or solution phase polymerisation conditions. The quantity of hydrogen gas to be employed to give the desired average molecular weight can be determined by simple "trial and error" polymerisation tests.

Methods for operating gas phase polymerisation processes are well known in the art. Such methods generally involve agitating (e.g. by stirring, vibrating or fluidising) a bed of catalyst, or a bed of the target polymer (i.e. polymer having the same or similar physical properties to that which it is desired to make in the polymerisation process) containing a catalyst, and feeding thereto a stream of monomer at least partially in the gaseous phase, under conditions such that at least part of the monomer polymerises in contact with the catalyst in the bed. The bed is generally cooled by the addition of cool gas (e.g. recycled gaseous monomer) and/or volatile liquid (e.g. a volatile inert hydrocarbon, or gaseous monomer which has been condensed to form a liquid). The polymer produced in, and isolated from, gas phase processes forms directly a solid in the polymerisation zone and is free from, or substantially free from liquid. As is well known to those skilled in the art, if any liquid is allowed to enter the polymerisation zone of a gas phase polymerisation process the quantity of liquid is small in relation to the quantity of polymer present in the polymerisation zone. This is in contrast to "solution phase" processes wherein the polymer is formed dissolved in a solvent, and "slurry phase" processes wherein the polymer forms as a suspension in a liquid diluent.

The gas phase process can be operated under batch, semi-batch, or so-called "continuous" conditions. It is preferred to operate under conditions such that monomer is continuously recycled to an agitated polymerisation zone containing polymerisation catalyst, make-up monomer being provided to replace polymerised monomer, and continuously or intermittently withdrawing produced polymer from the polymerisation zone at a rate comparable to the rate of formation of the polymer, fresh catalyst being added to the polymerisation zone to replace the catalyst withdrawn form the polymerisation zone with the produced polymer.

When using the catalysts of the present invention under gas phase polymerisation conditions, the catalyst, or one or more of the components employed to form the catalyst can, for example, be introduced into the polymerisation reaction zone in liquid form, for example, as a solution in an inert liquid diluent. Thus, for example, the transition metal component, or the activator component, or both of these components can be dissolved or slurried in a liquid diluent and fed to the polymerisation zone. Under these circumstances it is preferred the liquid containing the component(s) is sprayed as fine droplets into the polymerisation zone. The droplet diameter is preferably within the range 1 to 1000 microns. EP-A-0593083, the teaching of which is hereby incorporated into this specification, discloses a process for introducing a polymerisation catalyst into a gas phase polymerisation. The methods disclosed in EP-A-0593083 can be suitably employed in the polymerisation process of the present invention if desired.

The present invention also provides a process for the oligomerisation and cooligomerisation of 1-olefins, comprising contacting the monomeric olefin under oligomerisation conditions with the catalyst of the present invention.

Suitable monomers for use in making homooligomers using the oligomerisation process of the of the present invention are, for example, ethylene, propylene, butene, hexene, and styrene. The preferred monomer is ethylene.

Suitable monomers for use in making co-oligomers using the oligomerisation process of the present invention are ethylene, propylene, 1-butene, 1-hexene, 1-octene, 1-decene, 1-dodecene and further 1-olefins of the series C(n)H(2n) where n is an integer.

There exist a number of options for the oligomerisation reactor including batch, semi-batch, and continuous operation. The oligomerisation and co-oligomerisation reactions of the present invention can be performed under a range of process conditions that are readily apparent to those skilled in the art: as a homogeneous liquid phase reaction in the presence or absence of an inert hydrocarbon diluent such as toluene or heptanes; as a two-phase liquid/liquid reaction; as a slurry process where the catalyst is in a form that displays little or no solubility; as a bulk process in which essentially neat reactant and/or product olefins serve as the dominant medium; as a gas-phase process in which at least a portion of the reactant or product olefin(s) are transported to or from a supported form of the catalyst via the gaseous state. Evaporative cooling from one or more monomers or inert volatile liquids is but one method that can be employed to effect the removal of heat from the reaction. The (co-) oligomerisation reactions may be performed in the known types of gas-phase reactors, such as circulating bed, vertically or horizontally stirred-bed, fixed-bed, or fluidised-bed reactors, liquid-phase reactors, such as plug-flow, continuously stirred tank, or loop reactors, or combinations thereof. A wide range of methods for effecting product, reactant, and catalyst separation and/or purification are known to those skilled in the art and may be employed: distillation, filtration, liquid-liquid separation, slurry settling, extraction, etc. One or more of these methods may be performed separately from the (co-)oligomerisation reaction or it may be advantageous to integrate at least some with a (co-)oligomerisation reaction; a non-limiting example of this would be a process employing catalytic (or reactive) distillation. Also advantageous may be a process which includes more than one reactor, a catalyst kill system between reactors or after the final reactor, or an integrated reactor/separator/purifier. While all catalyst components, reactants, inerts, and products could be employed in the present invention on a once-through basis, it is often economically advantageous to recycle one or more of these materials; in the case of the catalyst system, this might require reconstituting one or more of the catalysts components to achieve the active catalyst system. It is within the scope of this invention that a (co)oligomerisation product might-also serve as a reactant (e.g. 1-hexene, produced via the oligomerisation of ethylene, might be converted to decene products via a subsequent co-oligomerisation reaction with two further ethylene units).

The catalyst systems of the present invention can present a variety of advantages over the prior art systems. In general the catalysts are easy to synthesise, have high activity and good catalyst life when employed under conventional industrial polymerisation conditions. Generally the catalysts exhibit single site behaviour which tends to favour the production of narrow molecular weight distribution polymers having uniform properties. Generally, the vanadium based catalysts of the present invention are capable of making very high molecular weight polymers.

A further aspect of the present invention provides a novel transition metal compound having the Formula A

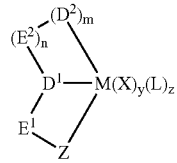

Formula A wherein Z comprises a five-membered heterocyclic group, the five membered heterocyclic group containing at least one carbon atom, at least one nitrogen atom and at least one other hetero atom selected from nitrogen, sulphur and oxygen, the remaining atoms in said ring being selected from nitrogen and carbon; M is a metal from Group 3 to 11 of the Periodic Table or a lanthanide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon (v) heterocyclic groups and (vi) heterosubstituted derivatives of said groups (i) to (v); $D^1$ and $D^2$ are donor atoms or groups; X is an anionic group, L is a neutral donor group; n=m=zero or 1; y and z are independently zero or integers such that the number of X and L groups satisfy the valency and oxidation state of the metal M.

M is preferably selected from Groups 3 to 7 of the periodic table.

The preferences set out above in relation to the transition metal complex component of the catalyst of the present invention apply equally to the novel transition metal compound per se of the present invention A preferred novel transition metal compound in accordance with the present has the Formula

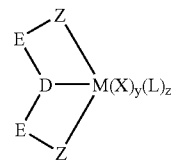

Z is specifically an imidazole-containing group of formula:

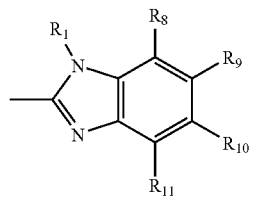

wherein $R_1$, $R_8$, $R_9$, $R_{10}$ and $R_{11}$ are independently hydrogen or a monovalent (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), and (vii) hydrocarbyl-substituted heteroatom groups. These defined groups preferably contain 1 to 30, more preferably 2 to 20, most preferably 2 to 12 carbon atoms. Examples of suitable aliphatic hydrocarbon groups are methyl, ethyl, ethylenyl, butyl, hexyl, isopropyl and tert-butyl. Examples of suitable alicyclic hydrocarbon groups are adamantyl, norbornyl, cyclopentyl and cyclohexyl. Examples of suitable aromatic hydrocarbon groups are phenyl, biphenyl, naphthyl, phenanthryl and anthryl. Examples of suitable alkyl substituted aromatic hydrocarbon groups are benzyl, tolyl, mesityl, 2,6-diisopropylphenyl and 2,4,6-triisopropyl. Examples of suitable heterocyclic groups are 2-pyridinyl, 3-pyridinyl, 2-thiophenyl, 2-furanyl, 2-pyrrolyl, 2-quinolinyl. Suitable substituents for forming heterosubstituted derivatives of said groups $R_1$ to $R_{11}$ are, for example, chloro, bromo, fluoro, iodo, nitro, amino, cyano, ether, hydroxyl and silyl, methoxy, ethoxy, phenoxy (i.e. —$OC_6H_5$), tolyloxy (i.e. —$OC_6H_4(CH_3)$), xylyloxy, mesityloxy, dimethylamino, diethylamino, methylethylamino, thiomethyl, thiophenyl and trimethylsilyl. Examples of suitable heterosubstituted derivatives of said groups (i) to (v) are 2-chloroethyl, 2-bromocyclohexyl, 2-nitrophenyl, 4-ethoxyphenyl, 4-chloro-2-pyridinyl, 4-dimethylaminophenyl and 4-methylaminophenyl. Examples of suitable hydrocarbyl-substituted heteroatom groups are chloro, bromo, fluoro, iodo, nitro, amino, cyano, ether, hydroxyl and silyl, methoxy, ethoxy, phenoxy (i.e. —$OC_6H_5$), tolyloxy (i.e. —$OC_6H_4(CH_3)$), xylyloxy, mesityloxy, dimethylamino, diethylamino, methylethylamino, thiomethyl, thiophenyl and trimethylsilyl. Any of the substituents $R_1$ to $R_{11}$ may be linked to form cyclic structures. Substituents $R_2$ to $R_{11}$ may also suitably be inorganic groups such as fluoro, chloro, bromo, iodo, nitro, amino, cyano and hydroxyl.

Further suitable imidazole-containing groups may be obtained by removal of substituent $R_1$, for example by deprotonation when $R_1$ is hydrogen, to give formally monoanionic imidazole-containing groups.

$R_1$ is preferably hydrogen, an aliphatic hydrocarbon group, an aromatic hydrocarbon group or is removed to give a formally monoanionic benzimidazole group. $R_8$ to $R_{11}$ are preferably hydrogen, an aliphatic hydrocarbon group or an aromatic hydrocarbon group.

M is preferably a metal selected from Groups 3 to 11 of the periodic table, more preferably selected from Sc, Ti, Zr, Hf, V, Nb, Ta, Cr, Mo, W, Mn and most preferably V and Cr.

E is independently selected from divalent (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), and (vii) hydrocarbyl-substituted heteroatom groups. Examples of suitable divalent group $R_5$ are —$CH_2$—, —$CH_2CH_2$—, —$CH_2CH_2CH_2$—, 1,2-phenylene, trans-1,2-cyclopentane, trans-1,2-cyclohexane, 2,3-butane, 1,1'-biphenyl, 1,1'-binaphthyl, and —$Si(Me)_2$—. It is preferred that E is an aliphatic or aromatic hydrocarbon group. More preferably E is —$CH_2$—.

D is a donor group, for example oxygen, sulfur, an amine, an imine or a phosphine. Preferably D is oxygen, sulfur, an amine of formula —$N(R_{12})$— or a phosphine of formula —$P(R_{13})$— wherein $R_{12}$ and $R_{13}$ are hydrogen or (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), (vii) hydrocarbyl-substituted heteroatom groups and (viii) further imidazole-containing groups. Alternatively $R_{12}$ or $R_{13}$ may be removed, for example by deprotonation when they are hydrogen, to give a formally monoanionic fragments. More preferably D is an amine of formula —$N(R_{12})$— as define above. $R_{12}$ is preferably hydrogen, an aliphatic hydrocarbon, an aromatic hydrocarbon or a further imidazole containing group.

X is an anionic group and can be, for example, a halide, preferably chloride or bromide; or a hydrocarbyl group, for example, methyl, benzyl or phenyl; a carboxylate, for example, acetate or acetylacetate, an oxide; an amide, for example diethyl amide; an alkoxide, for example, methoxide, ethoxide or phenoxide. Alternatively, X can be a non-coordinating or weakly-coordinating anion, for example, tetrafluoroborate, a fluorinated aryl borate or a triflate. The anionic groups X may be the same or different and may independently be monoanionic, dianionic or trianionic.

L is a neutral donor group and can be, for example, a solvate molecule, for example diethyl ether or THF; an amine, for example, diethyl amine, trimethylamine or pyridine; a phosphine, for example trimethyl phosphine or triphenyl phosphine; or an olefin, or a neutral, conjugated or nonconjugated diene, optionally substituted with one or more groups selected from hydrocarbyl or trimethylsilyl groups, said L having up to 40 carbon atoms and forming a .pi.-complex with M.

Values y and z are independently zero or integers such that the number of X and L groups satisfy the valency and oxidation state of the metal M. The value of y depends on the formal charge on each group Z and D, the charge on the anionic group X and the oxidation state of the metal M. For example, if M is chromium in oxidation state +3, Z is a neutral groups and both D groups are neutral, then y is 3 if X is a monoanionic group (e.g. chloride); if M is chromium in oxidation state +3, Z is a neutral group, one D group is monoanionic and the other D is neutral, then y is 2 if all X groups are monoanionic groups (e.g. chloride).

The invention is further illustrated with reference to the following Examples. In the Examples all manipulations of air/moisture-sensitive materials were performed on a conventional vacuum/inert atmosphere (nitrogen) line using standard Schlenk line techniques, or in an inert atmosphere glove box.

EXAMPLE 1

Preparation of N,N-bis(1H-benzimidazol-2-ylm-ethyl)-N-methylamine (L-1)

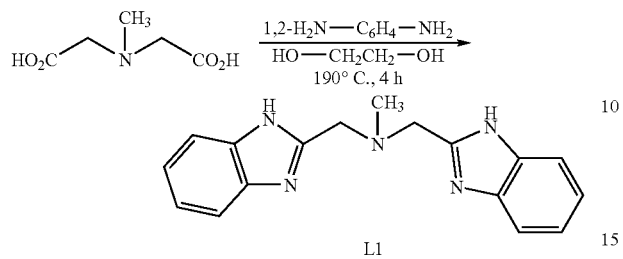

A mixture of 4.00 g (27.2 mmol) N-methyliminodiacetic acid and 5.99 g (54.4 mmol) o-phenylene diamine in 30 ml ethylene glycol was stirred at 190° C. for 4 hours. The water produced during was distilled off continuously. At the end of the reaction, the reaction mixture was allowed to cool down to room temperature and then poured in 150 ml water. The obtained slurry was triturated for 30 min, filtered, washed with water (3×30 ml) and dried at 60° C. under reduced pressure for 48 hours. Yield 6.88 g (87.0%). 1H NMR (250 MHz, DMSO-d6), δ 2.25 (s, 3H), 3.90 (s, 4H), 7.15 (m, 4H), 7.47–4.58 (m, 4H), 12.33 (br. s, 2E). Microanalysis, %: Calculated for C17H17N5: C, 70.10; H, 5.84; N, 24.05. Found: C, 70.22; H, 6.05; N, 23.76. +CI MS (m/z): [292]. (+CI-MS is Positive Chemical Ionisation Mass Spectroscopy).

EXAMPLE 2

Preparation of [N,N-bis(1H-benzimidazol-2-ylm-ethyl)-N-methylamine]trichlorochromium(III) (Cr-1)

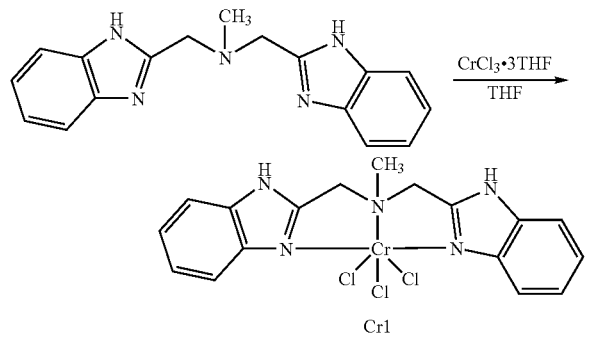

A slurry of 0.50 g (1.72 mmol) L-1 and 0.64 g (1.72 mmol) CrCl3(THF)3 in 10 mL THF was stirred at reflux for 5 hours. The obtained green solid was filtered, washed with THF (3×10 mL) and dried under reduced pressure. Yield 0.71 g (91.8%). Microanalysis %: Calc. for C17H17N5CrCl3: C, 45.38; H, 3.78; N, 15.57. Found C, 45.49; H, 3.71; N, 15.33. +FAB MS (m/z): M—Cl 413. $\mu_{eff}$=3.73 BM. (THF is tetrahydrofuran; +FAB MS is Positive Fast Atom Bombardment Mass Spectroscopy; $\mu_{eff}$ is magnetic moment.

EXAMPLES 3–11

(Table 1)

Ethylene Oligomerisation/Polymerisation Tests with Cr-1.

The ethylene oligomerisation/polymerisation tests were carried out using the following procedure.

Preparation of solution of activated catalyst. The required amount of catalyst precursor Cr-1 (0.5–5 mg) was suspended in 20–100 ml toluene followed by the addition of the co-catalyst (methylalumoxane—MAO, 0.01–8 mmol). Thus prepared solution can be used immediately or stored at 0° C. for a number of days.

Ethylene Oligomerisation/Polymerisation.

The ethylene oligomerisation/polymerisation reactions were usually carried out in a 400 ml "Fischer-Porter" glass reactor equipped with a gas inlet, a catalyst inlet, a mechanical stirrer and a digital thermometer. An aliquot of 1–5 ml of the catalyst solution described above was added to the reactor containing 200–300 ml solvent (usually toluene) and 0.1–5 mmol scavenger (usually trisobutyl aluminium—TIBAL or MAO). The reactor was then connected to the ethylene gas supply at the desired pressure and the temperature brought to the required value. The reaction was carried out for 10–120 min (usually 60 min). The reaction mixture was then quickly cooled down to room temperature (if necessary) and the reaction terminated by venting the ethylene off. GC (Gas Chromatography) samples were always withdrawn and analysed in order to determine the molecular-weight distribution of the C4–C40 olefins. The reactor content was then poured into a beaker containing 400 ml methanol and a few drops of 2M HCL. The precipitated polymer was filtered, washed with methanol and dried at 60° C. under vacuum.

TABLE Cr-1O

| | | | | | | | | | |
|---|---|---|---|---|---|---|---|---|---|
| | | | | Polymerisation in toluene | | | | | |
| Ex | Cat., μmol | MAO, mmol (#1) | Temp. Setpoint, ° C. (#2) | P C2H4 bar | Pol. time, min | ΔT, ° C. (Note3) | Soluble fraction g (#4) | Insol. fraction g (#5) | Activity, g/mmol.h.bar (#6) |
| 3 | 2.70 | 7.3 | 20 | 4 | 40 | +96 | 8.4 | 43.7 | 7240 |
| 4 | 0.50 | 2.8 | 20 | 4 | 60 | +90 | 15.9 | 68.1 | 42050 |
| 5 | 0.18 | 7.2 | 20 | 4 | 60 | +62 | 9.1 | 28.7 | 52500 |
| 6 | 0.07 | 3.5 | 20 | 4 | 80 | +35 | 8.2 | 17.5 | 68840 |

TABLE Cr-1O-continued

| | | Polymerisation in toluene | | | | | | |
|---|---|---|---|---|---|---|---|---|
| Ex | Cat., μmol | MAO, mmol (#1) | Temp. Setpoint, ° C. (#2) | P C₂H₄ bar | Pol. time, min | ΔT, ° C. (Note3) | Soluble fraction g (#4) | Insol. fraction g (#5) | Activity, g/mmol.h.bar (#6) |
| 7 | 0.03 | 6.6 | 50 | 4 | 60 | +4 | 2.8 | 10.3 | 109170 |
| 8 | 0.03 | 3.7 | 50 | 3 | 60 | +3 | 2.4 | 7.9 | 114400 |
| 9 | 0.03 | 3.7 | 50 | 2 | 60 | +1 | 1.8 | 5.9 | 128300 |
| 10 | 0.03 | 3.7 | 50 | 1 | 60 | 0→+1 | 0.6 | 2.5 | 116700 |
| 11 | 0.12 | 4.3 | 50 | 4 | 60 | +8 | 11.6 | 22.4 | 70830 |

Notes
(#1) MAO is methylalumoxane (co-catalyst)
(#2) Temperature set-point is the temperature at the start of the polymerisation reaction. The temperature in the reactor is uncontrolled and will change from this point due to the heat formation during the polymerisation reaction.
3. ΔT is the difference between the temperature in the reactor and the temperature in the cooling bath
(#4) This is the fraction of ethylene oligomers, soluble in toluene at room temperature.
(#5) The fraction of ethylene oligomers insoluble in toluene at room temperature
(#6) The activity is based on the sum of the soluble and insoluble fractions.

EXAMPLE 11

In Presence of 10 ml 1-hexene

Gas Chromatography traces for the soluble fractions from Examples 3, 7, 8, 9 and 11 are shown in FIGS. 1, 2, 3, 4 and 5 of the drawings.

The molecular weight distributions of the soluble fractions obtained by Cr1 can be described by a combination of two distribution curves—a Schulz-Flory type curve for the Cn homologues and an intermediate (Schulz-Flory—Poisson) type curve for the Cn+2 homologues.

The insoluble fraction consists of low molecular weight polyethylene. For example the insoluble fraction (polyethylene) described in Example 7 has Mn=1298, Mw=3537 and PDI=2.62.

EXAMPLE 12

Preparation of N,N-bis(1H-benzimidazol-2-ylm-ethyl)-N-benzylamine (L-2)

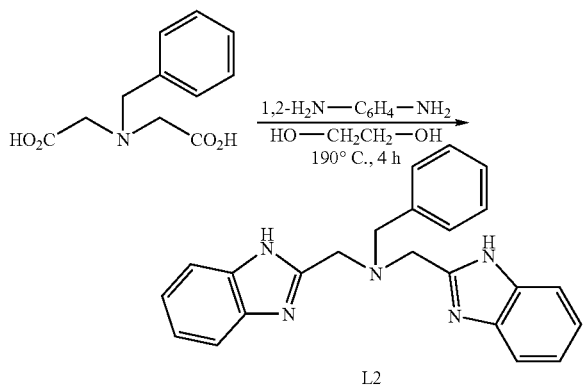

A mixture of 4.00 g (17.9 mmol) N-benzyliminodiacetic acid and 3.86 g (35.8 mmol) o-phenylene diamine in 30 ml ethylene glycol was stirred at 190° C. for 4 hours. The water produced during was distilled off continuously. At the end of the reaction, the reaction mixture was allowed to cool down to room temperature and then poured in 150 ml water. The obtained slurry was triturated for 30 min, filtered, washed with water (3×30 ml) and dried at 60° C. under reduced pressure for 48 hours. Yield 4.94 g (75.0%). 1H NMR (250 MHz, DMSO-d6), δ 3.72 (s, 2H), 3.92 (s, 4H), 7.13–7.57 (m, 13H), 12.37 (Br. s, 2H). +CI MS (m/z): [368]. (+CI-MS is Positive Chemical Ionisation Mass Spectroscopy).

EXAMPLE 13

Preparation of [N,N-bis(1H-benzimidazol-2-ylm-ethyl)-N-benzylamine]trichlorochromium(III) (Cr-2)

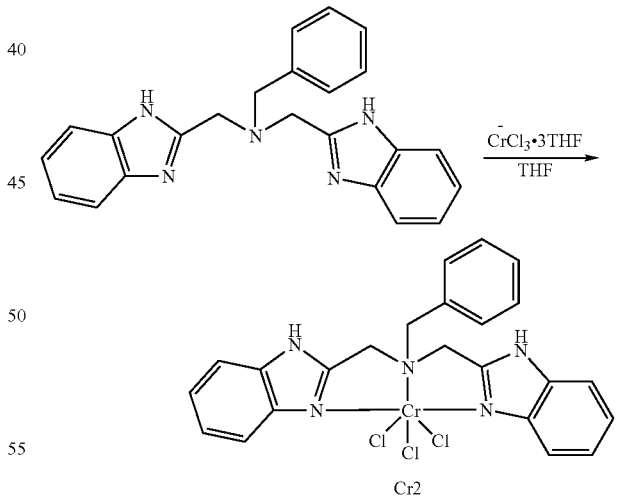

A slurry of 1.00 g (2.82 mmol) L2 and 1.06 g (2.82 mmol) CrCl3(THF)3 in 30 mL THF was stirred at reflux for 4 hours. The obtained green solid was filtered, washed with THF (3×15 mL) and dried under reduced pressure. Yield 1.20 g (82.9%). Microanalysis, %: Calc. for C23H21N5CrCl3: C, 52.54; H, 4.03; N, 13.32; Found C, 52.38; H, 3.97; N, 13.12. $\mu_{eff}$=3.63 BM. (THF is tetrahydrofuran; $\mu_{eff}$ is magnetic moment).

EXAMPLE 14

Ethylene Oligomerisation/Polymerisation Test with Catalyst Cr-2. Results are given in the Table.

| Ex | Cat., μmol | MAO, mmol | Temp. Setpoint, °C. | P C₂H₄ bar | Pol. time, min | ΔT, °C. | Soluble fraction g | Insoluble fraction g | Activity, g/mmol · h · bar |
|---|---|---|---|---|---|---|---|---|---|
| 14 | 10.0 | 10.0 | 26 | 4 | 60 | +60 | 6.1 | 42.0 | 1200 |

The GC trace for the soluble fraction from Example 14 is shown in FIG. 6 of the Drawings.

EXAMPLE 15

Preparation of N,N-bis(1H-benzimidazol-2-ylmethyl)amine (L-3)

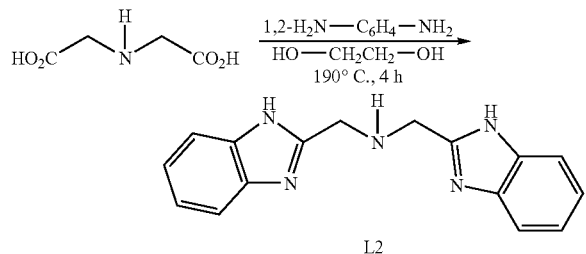

L2

A mixture of 3.62 g (27.2 mmol) N-iminodiacetic acid and 4.40 g (54.4 mmol) o-phenylene diamine in 30 ml ethylene glycol was stirred at 190° C. for 4 hours. The water produced during was distilled off continuously. At the end of the reaction, the reaction mixture was allowed to cool down to room temperature and then poured in 150 ml water. The obtained slurry was triturated for 30 min, filtered, washed with water (3×30 ml) and dried at 60° C. under reduced pressure for 48 hours. Yield 5.28 g (70.0%). ¹H NMR (250 MHz, DMSO-d₆), δ 3.40 (br.s, 1H), 4.00 (s, 4H), 7.14 (m, 4H), 7.51 (m, 4H), 12.41 (br. s, 2H).

Preparation of [N,N-bis(1H-benzimidazol-2-ylmethyl) amine]trichlorochromium(III) (Cr-3)

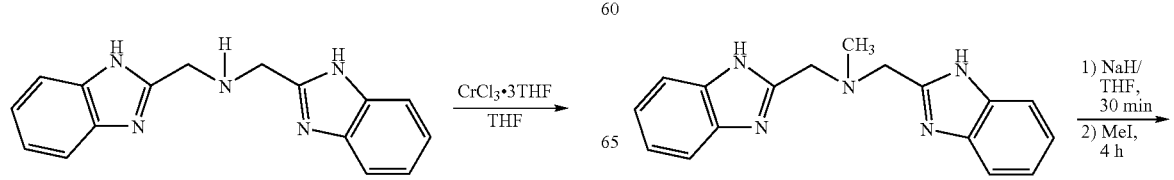

Cr3

A slurry of 0.50 g (1.81 mmol) L3 and 0.68 g (1.81 mmol) CrCl₃(THF)₃ in 10 mL THF was stirred at reflux for 4 hours. The obtained green solid was filtered, washed with THF (3×15 mL) and dried under reduced pressure. Yield 0.62 g (79.1%).

EXAMPLE 16

Ethylene Oligomerisation/Polymerisation Test with Cr-3

| Ex | Cat., μmol | MAO, mmol | Temp. Setpoint, °C. | P C₂H₄ bar | Pol. time, min | ΔT, deg. | Soluble fraction g | Insoluble fraction g | Activity, g/mmol · h · bar |
|---|---|---|---|---|---|---|---|---|---|
| 16 | 10.0 | 10.0 | 22 | 4 | 30 | +62 | 14.4 | 26.0 | 2020 |

The GC trace for the soluble fraction from Example 16 is shown in FIG. 7 of the Drawings.

Insoluble fraction: Mn=807, Mw=1316, PDI=1.63.

EXAMPLE 17

Preparation of N-methyl-N,N-bis[(1-methyl-1H-benzimidazol-2-yl)methyl]amine (L-4)

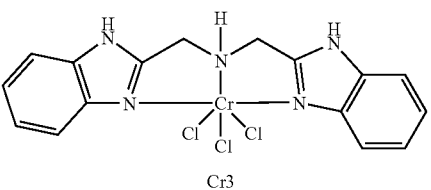

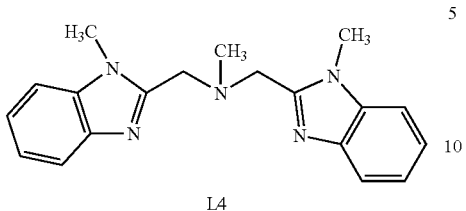

L4

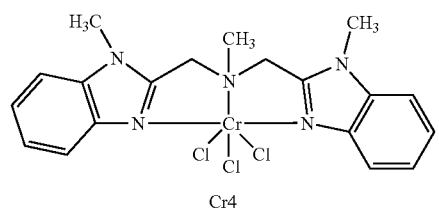

Cr4

A mixture of 1.00 g (3.4 mmol) N,N-bis(1H-benzimidazol-2-ylmethyl)-N-methylamine, 0.33 g (13.8 mmol) NaH and 30 ml THF were stirred at room temperature for 30 min. MeI (0.43 ml, 6.8 mmol) was then added and the reaction mixture stirred for another 4 hours. Addition of 120 ml water resulted in the formation of a off-white precipitate which was filtered, washed extensively with water and dried at 60° C. under vacuum. Yield 0.81 g (74.0%). $^1$H NMR (250 MHz, CDCl$_3$), δ 2.39 (s, 3H), 3.67 (s, 6H), 3.93 (s, 4H), 7.24 (m, 6H), 7.67 (m, 2H).

A slurry of 0.50 g (1.56 mmol) L3 and 0.59 g (1.56 mmol) CrCl$_3$(THF)$_3$ in 20 ml THF was stirred at reflux for 4 hours. The obtained green solid was filtered, washed with THF (3×10 mL) and dried under reduced pressure. Yield 0.64 g (85.8%). Microanalysis, %: Calc. for C$_{18}$H$_{19}$N$_5$CrCl$_3$,: C, 47.77; H, 4.43; N 14.66. Found C, 47.59; H, 4.40; N, 14.64.

EXAMPLE 19

Ethylene Oligomerisation/Polymerisation Test with Cr-4

| Ex | Cat., μmol | MAO, mmol | Temp. Setpoint, ° C. | P C$_2$H$_4$ bar | Pol. time, min | ΔT deg. | Soluble fraction g | Insoluble fraction g | Activity, g/mmol · h · bar |
|---|---|---|---|---|---|---|---|---|---|
| 19 | 19.0 | 10.0 | 28 | 4 | 60 | +30 | 12.0 | 12.5 | 322 |

The GC trace for the soluble fraction from Example 19 is shown in FIG. 8 of the Drawings.

Insoluble fraction: Mn=684, Mw=999, PDI=1.46.

EXAMPLE 20

N,N,N-tris(1H-benzimidazol-2-ylmethyl)amine (L5)

Prepared as described in L. K. Thompson et al, Can J. Chem., 55 (1977), 878. $^1$H NMR (250 MHz, DMSO-d$_6$), δ 4.01 (s, 6H), 7.12 (m, 6H), 7.49 (m, 6H), 12.44 (br. s, 3H).

Preparation of {[N,N,N-tris(1H-benzimidazol-2-ylmethyl)amine]dichlorochromium (III)}chloride (Cr-5)

EXAMPLE 18

Preparation of {N-methyl-N,N-bis[(1-methyl-1H-benzimidazol-2-yl)methyl]amine}trichloro-chromium(III) (Cr-4)

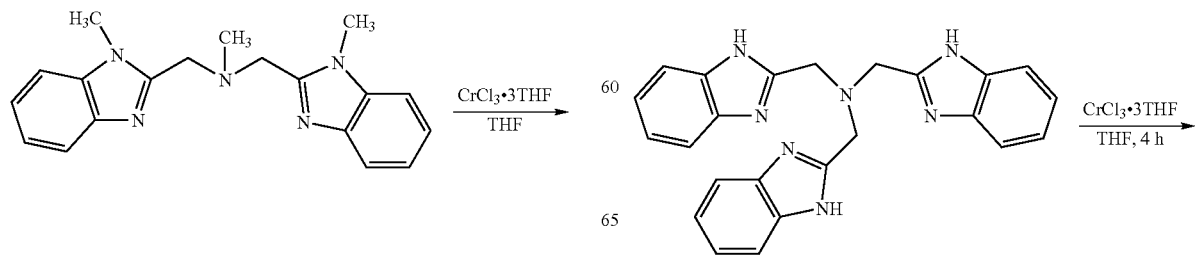

-continued

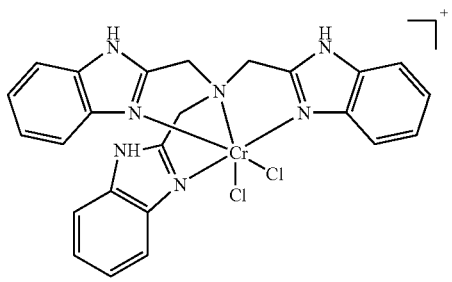

Prepared as described in A. E. Cencieros-Gomes, Polyhedron, 19 (2000), 1821. +FAB MS (m/z): 531.

Ethylene Oligomerisation/Polymerisation Test with Cr-5.
The Conditions are Shown in the Table.

| Ex | Cat., μmol | MAO, mmol | Temp. Setpoint, °C. | P $C_2H_4$ bar | Pol. time, min | ΔT, deg. | Soluble fraction g | Insoluble fraction g | Activity, g/mmol · h · bar |
|---|---|---|---|---|---|---|---|---|---|
| 19 | 20.0 | 10.0 | 20 | 4 | 70 | +16 | 4.5 | 12.5 | 182 |

The GC trace for the soluble fraction from Example 20 is shown in FIG. 9.

Insoluble fraction: Mn=800, Mw=1200, PDI=1.50

EXAMPLES 21–23

Ethylene Oligomerisation/Polymerisation Test with Cr-5
The conditions are shown in the following Table.

| Ex | Cat., μmol | Co-Cat., (mmol) (Note1) | Temp Setpoint, °C. | P $C_2H_4$ Bar | Pol. time, min | ΔT, deg. | Soluble fraction g | Insoluble fraction g | Activity, g/mmol · h · bar |
|---|---|---|---|---|---|---|---|---|---|
| 21 | 20.0 | PMAO (10) | 20 | 4 | 60 | +2 | 1.0 | 3.0 | 50 |
| 22 | 20.0 | MMAO (10) | 20 | 4 | 60 | +2 | 1.2 | 3 | 52 |
| 23 | 20.0 | MAO (10) | 20 | 1 | 60 | +1 | 0.7 | 1.5 | 36 |

Note 1.
PMAO (polymethylalumoxane) is obtained by removing the present trimethylaluminum in the commercial methylalumoxane by distillation under reduced pressure followed by washing with n-heptane. MMAO (modified methylalumoxane) contains triisobutalaluminium and is commercially supplied as solution in hexanes.

EXAMPLE 23

In Presence of Ethylene (1 bar) and Propylene (2 bar)

GC curves for the soluble fractions in Example 21 are shown in FIG. 10; for Example 22 in FIG. 11 and for Example 23 in FIG. 12.

EXAMPLE 24

[N,N-bis(1H-benzimidazol-2-ylmethyl)-N-methylamine]dichlorotetrahydrofurano-chromium (III) hexafluoroantimonate (Cr-6).

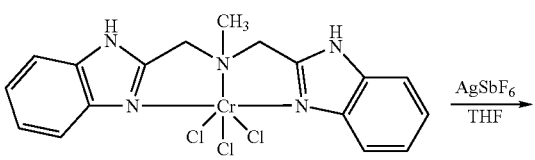

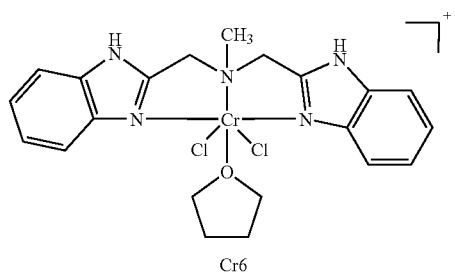

Cr6

A slurry of silver hexafluoroantimonate (0.62 g, 1.82 mmol) [N,N-bis(1H-benzimidazol-2-ylmethyl)-N-methylamine]trichlorochromium(III) (Cr1) (0.50 g, 1.11 mmol) in 50 ml THF was stirred at room temperature for 48 hours. The solution was filtered and the solvent removed under reduced pressure. Yield 0.33 g (53.0%). +FAB MS (m/z): [413]. −FAB MS (m/z): [237].

EXAMPLE 25

Ethylene Oligomerisation/Polymerisation Test with Cr-6

| Ex | Cat., µmol | MAO, mmol | Temp. Setpoint, °C. | P $C_2H_4$ bar | Pol. time, min | ΔT, deg. | Soluble fraction g | Insoluble fraction g | Activity, g/mmol · h · bar |
|---|---|---|---|---|---|---|---|---|---|
| 25 | 0.5 | 4.2 | 20 | 4 | 60 | — | 5.8 | 16.0 | 10900 |

EXAMPLE 26

Preparation of [N,N-bis(1H-benzimidazol-2-ylmethyl)-N-methylamine]-2,4-pentanedionatodichlorochromium (III) hexafluoroantimonate (Cr-7)

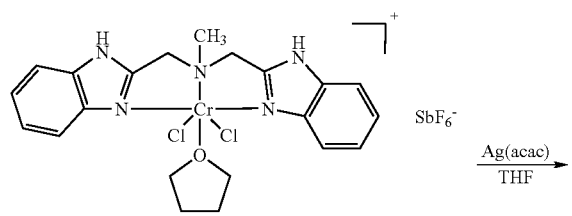

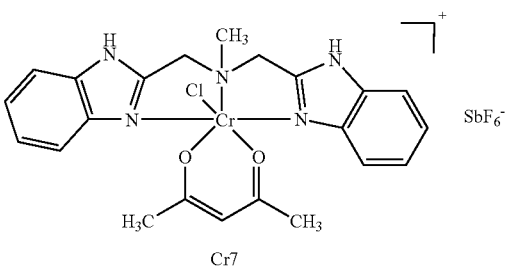

Cr7

Silver acetylacetonate (0.11 g, 0.55 mmol) and [N,N-bis(1H-benzimidazol-2-ylmethyl)-N-methylamine]dichlorotetrahydrofurano-chromium (III) hexafluoroantimonate (Cr6) (0.40 g, 0.55 mmol) were dissolved in THF and stirred at room temperature for 48 hours. After filtering, the solvent was removed, the residues re-dissolved in dichloromethane, filtered and layered with pentane to afford suitable crystals for X-ray diffraction. Yield 0.32 g (82.0%). Microanalysis, %: Calc. for $C_{22}H_{23}ClCrF_6N_5O_2Sb$: C, 37.0; H, 3.23; N, 9.83. Found C, 36.68; H, 3.36; N, 9.57. +FAB MS (m/z): [477]. −FAB MS (m/z): [235]. (−FAB MS is Negative Fast Atom Bombardment Mass Spectroscopy).

Figure 13:
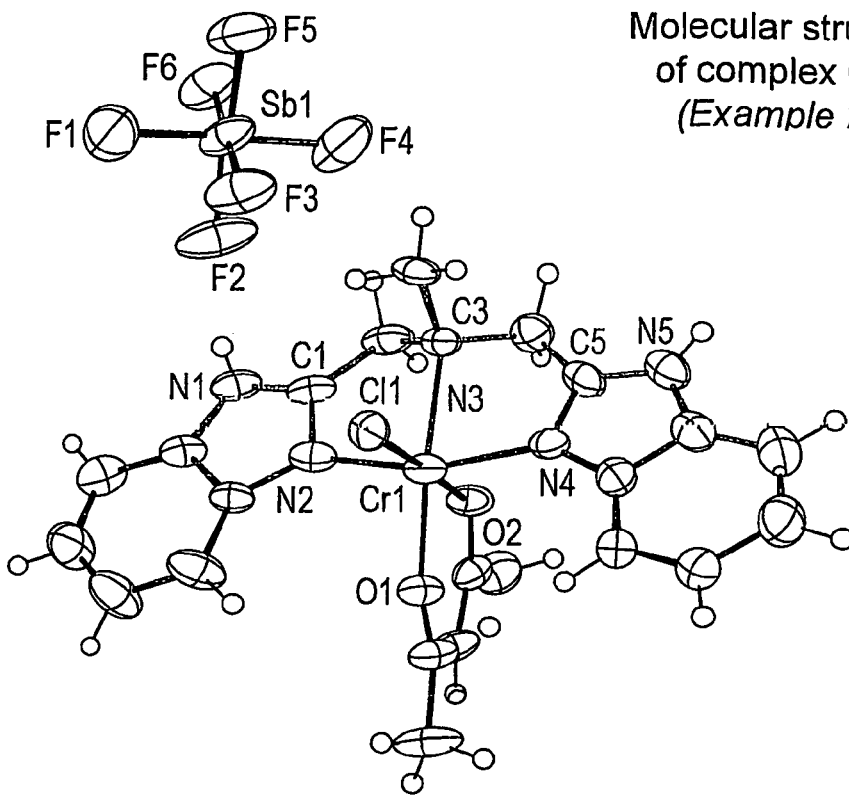

The molecular structure of complex Cr-7 is shown in FIG. 13 of the Drawings

Example 27

Ethylene Oligomerisation/Polymerisation Test with Catalyst Complex Cr-7

| Example | Cat., ηµmol | MAO, mmol | Temp. Setpoint, °C. | P $C_2H_4$ bar | Pol. time, min | ΔT, deg. | Soluble fraction g | Insoluble fraction g | Activity, g/mmol · h · bar |
|---|---|---|---|---|---|---|---|---|---|
| 25 | 0.5 | 4.2 | 20 | 4 | 60 | — | 4.8 | 22.0 | 13400 |

EXAMPLE 28

Preparation of 2-Amino-3,6-dibromophenylamine

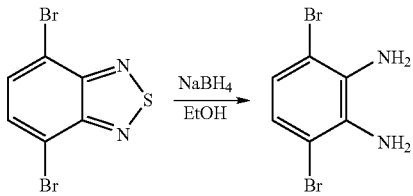

A mixture of 4,7-dibromo-2,1,3-benzothiadiazole (synthesized according to as described in K. Pilgram, J. Heterocycl. Chem., 7 (1970), 629) (16.0 g, 54.4 mmol) and NaBH$_4$ (38.1 g, 1.0 mol) in 500 ml ethanol was stirred at room temperature for 30 hours. The solvent was evaporated and the residue mixed with 500 ml water. The obtained mixture was extracted into diethyl ether (5×150 ml). The combined extracts were washed with brine (2×100 ml) and dried over anhydrous Na$_2$SO$_4$. Evaporation of the solvent and drying under reduced pressure afforded 11.5 g (79.5%) of the product.

EXAMPLE 29

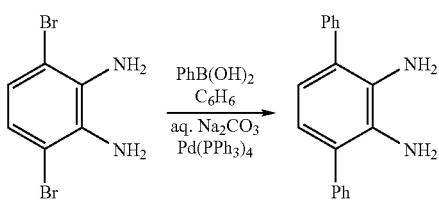

To a solution of 3.60 g (13.5 mmol) 2-amino-3,6-dibromophenylamine in 135 ml degassed benzene was added a solution 4.95 g (40.6 mmol) phenylboronic acid in 30 ml ethanol, followed by 54 ml 2M aqueous Na$_2$CO$_3$ and 1.89 g (1.62 mmol) solid Pd(PPh$_3$)$_4$. The dark-blue reaction mixture was refluxed for 24 hours and then allowed to cool down to room temperature. The aqueous layer was decanted and washed twice with 20 ml ethyl acetate. The combined organic layers were washed with water (2×50 ml), dried over anhydrous Na$_2$SO$_4$ and evaporated. The residue was purified by flash chromatography (SiO$_2$, 20% EtOAc/80% n-hexane). Yield—1.6 g (45.4%). $^1$H NMR (250 MHz, CDCl$_3$), δ, ppm: 3.63 (br. S, 4H), 6.81 (s, 2H), 7.39 (m, 2H), 7.50 (m, 8H).

EXAMPLE 30

Preparation of 1-(4,7-Diphenyl-1H-benzimidazol-2-yl)ethanol

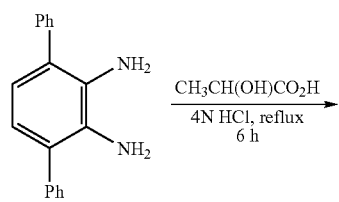

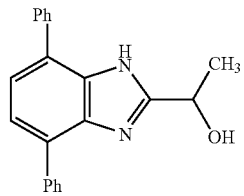

A mixture of 1.25 g (4.8 mmol) 1,1':4',1''-terphenyl-2',3'-diamine, 0.75 ml (8.6 mmol) 85% aq. lactic acid and 4.8 ml 4N HCl were stirred at reflux for 6 hours and then the volatile materials evaporated over 1 hour. The oily residue was heated to 140° C. and stirred for 15 min. After cooling to room temperature 10 ml water were added and the mixture triturated for 30 min. Addition of conc. NH$_4$OH to pH~7.5–8 followed by filtration, washing with water (4×10 ml) and drying under vacuum at 60° C. gave 1.25 g (82.8%) of the desired product. $^1$H NMR (250 MHz, CDCl$_3$), δ, ppm: 1.58 (d, J$_{HH}$=6.7 Hz, 3H), 3.64 (br.s, 1H), 5.07 (q, 1H), 7.37–7.76 (m, 12 H), 9.53 (br. s, 1H).

EXAMPLE 31

Preparation of 1-(4,7-Diphenyl-1H-benzimidazol-2-yl)ethanone

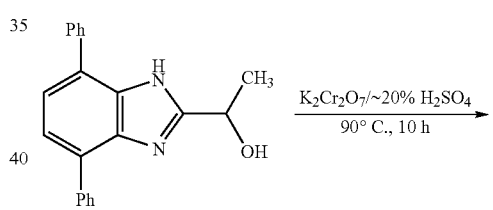

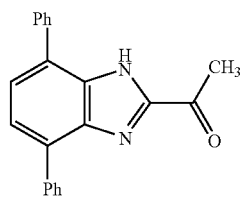

A solution of 1.38 g (4.7 mmol) potassium dichromate in 8.5 ml 40% H$_2$SO$_4$ was added dropwise to a stirred suspension of 1.10 g (3.5 mmol) 1-(4,7-diphenyl-1H-benzimidazol-2-yl)ethanol in 15 ml 5% H$_2$SO$_4$. The slurry was stirred at 90° C. for 10 hours, cooled to room temperature and treated with 7 ml conc. NH$_4$OH. The residue was filtered, washed with water (5×10 ml) and extracted with acetone (10×30 ml). The combined extracts were filtered trough a 0.5 cm layer of silica and the filtrate evaporated. The residue was re-crystallized from ethyl acetate-cyclohexane. Yield—

0.57 g (52.1%). $^1$H NMR (250 MHz, CDCl$_3$), δ, ppm: 2.83 (s, 3H), 7.44–7.64 (m, 10H); 8.14 (d, 7.6 Hz, 2H), 10.22 (br.s).

EXAMPLE 32

Preparation of N-[(1E)-1-(4,7-diphenyl-1H-benzimidazol-2-yl)ethylidene]-N-(2,6-isopropylphenyl)-amine

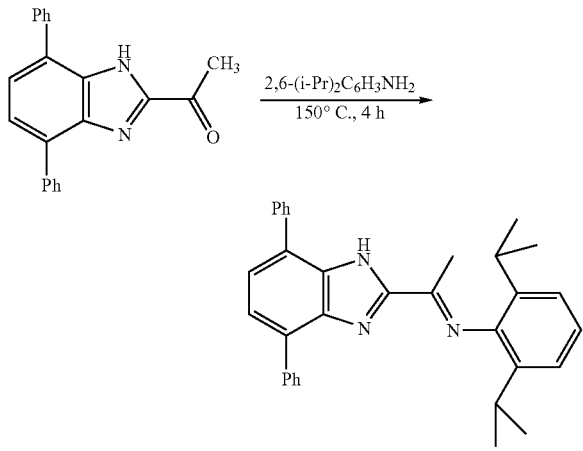

A mixture of 0.25 g (0.8 mmol) 1-(4,7-diphenyl-1H-benzimidazol-2-yl)ethanone, 0.6 ml diisopropyl aniline and a drop of glacial acetic acid was stirred at 150° C. for 4 hours. The unreacted aniline was removed at 150° C. under reduced pressure, the residual oil cooled to room temperature and triturated with 5 ml pentane at room temperature for 20 min. The mixture was then cooled to −20° C., triturated for another 5 min. and filtered while cold. The solid was washed with cold (−5° C.) pentane (2×2 ml) and dried under reduced pressure. Yield—0.28 g (74.2%). Microanalysis, %: Calc. for C$_{33}$H$_{33}$N$_3$: C, 84.08; H, 7.26; N, 8.65. Found C, 84.10; H, 7.14; N, 8.71. $^1$H NMR (250 MHz, CDCl$_3$), δ, ppm: 1.15 (dd, J$_{HH}$=3.1 Hz, J$_{HH}$=7.1 Hz, 12H), 2.36 (s, 3H), 2.76 (m, 2H), 7.17 (m, 3H), 7.53 (m, 8H), 7.72 (dd, J$_{HH}$=1.5 Hz, J$_{HH}$=6.9 Hz, 2H), 8.20 (dd, J$_{HH}$=1.2 Hz, J$_{HH}$=7.0 Hz, 2H), 10.42 (br.s 1H).

EXAMPLE 33

Preparation of N-(2,6-diisopropylphenyl)-N-[(1E)-1-(1-methyl-4,7-diphenyl-1H-benzimidazol-2-yl)ethylidene]amine (L-6)

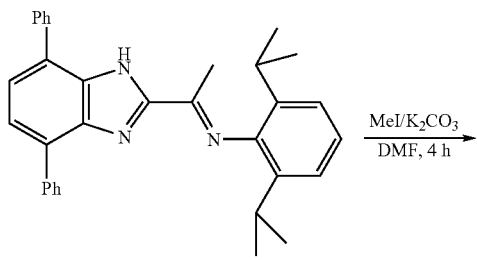

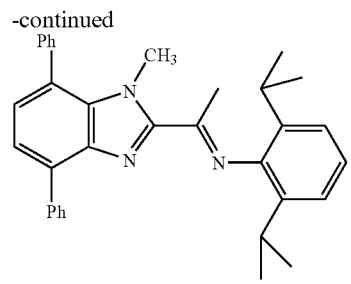

A mixture of 0.25 g (0.53 mmol) N-[(1E)-1-(4,7-diphenyl-1H-benzimidazol-2-yl)ethylidene]-N-(2,6-isopropylphenyl)-amine, 0.41 g (3.0 mmol) anhydrous K$_2$CO$_3$ and 0.08 g (0.56 mmol) MeI in 4 ml anhydrous DMF was stirred at room temperature for 10 hours. The reaction mixture was then poured into 50 ml water, stirred for 10 min and extracted with ethyl acetate (3×30 ml). The combined extracts were washed with water (3×15 ml) and dried over anhydrous Na$_2$SO$_4$. The solvent was evaporated to give an yellow oil which was triturated with 5 ml methanol at −78° C., filtered while cold, washed with cold (−78° C.) methanol (2×2 ml) and dried under reduced pressure. Yield 0.16 g (62.2%). $^1$H NMR (250 MHz, CDCl$_3$), δ, ppm: 1.14 (dd, J$_{HH}$=7.0 Hz, J$_{HH}$=15.0 Hz, 12H), 2.38 (s, 3H), 2.75 (m, 2H), 3.87 (s, 3H), 7.14 (m, 3H), 7.29 (d, 7.6 Hz, 1H), 7.53 (m, 9H), 7.72 (dd, J$_{HH}$=1.5 Hz, J$_{HH}$=6.9 Hz, 2H), 8.19 (dd, J$_{HH}$=1.2 Hz, J$_{HH}$=7.1 Hz, 2H).

EXAMPLE 34

Preparation of {N-(2,6-diisopropylphenyl)-N-[(1E)-1-(1-methyl-4,7-diphenyl-1H-benzimidazol-2-yl)ethylidene]amine}dibromonickel (II). (Ni-1)

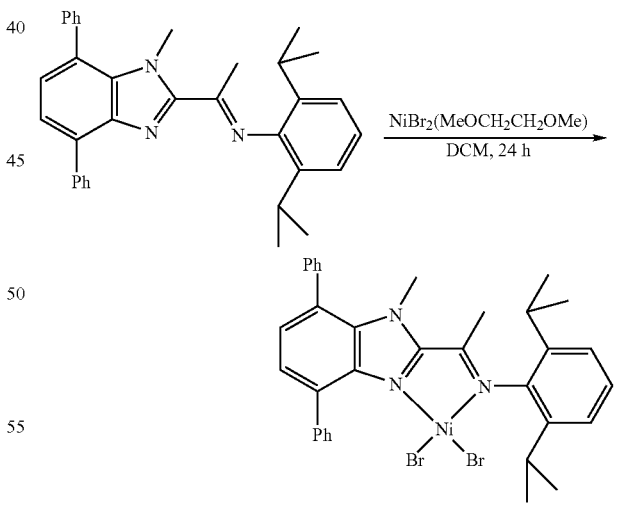

Figure 14:
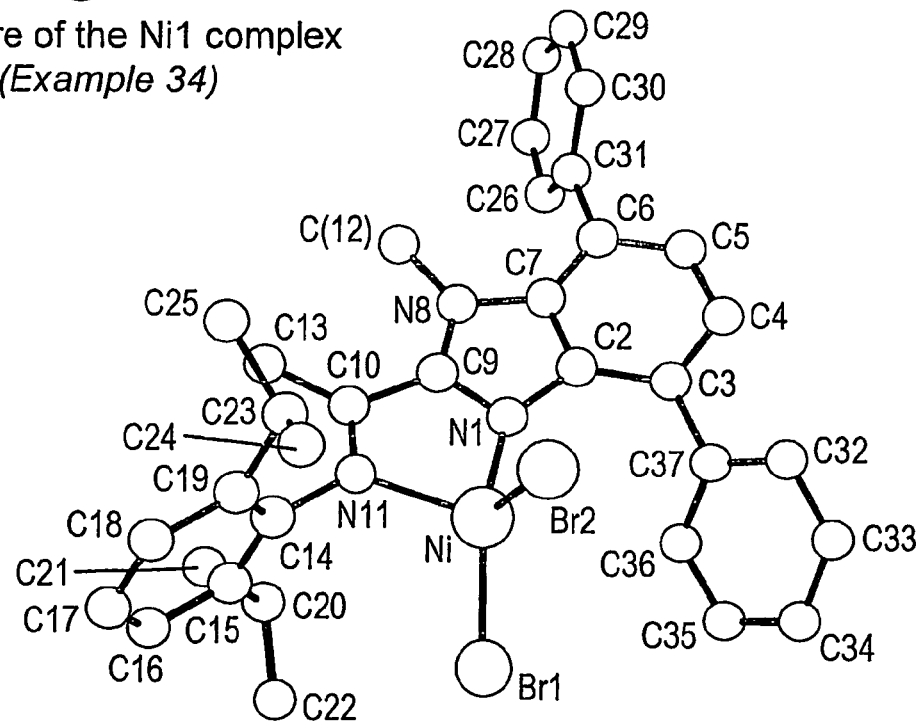

A slurry of 0.07g (0.14 mmol) N-(2,6-diisopropylphenyl)-N-[(1E)-1-(1-methyl-4,7-diphenyl-1H-benzimidazol-2-yl)ethylidene]amine and nickel dibromide dimethoxy ethane complex (0.04 g (0.14 mmol) in 5 ml dichloromethane (DCM) was stirred at room temperature for 24 hours. The solid was filtered, washed with DCM (3×5 ml) and dried under reduced pressure. Yield 0.09 g (88.7%). The crystal structure of Ni1 is shown in FIG. 14.

EXAMPLE 35

Ethylene Polymerisation Test with Ni-1

| Ex | Cat., µmol | MAO, mmol | Temp. Setpoint, °C. | P C$_2$H$_4$ bar | Pol. time, min | ΔT, deg. | Soluble fraction g | Insoluble fraction g | Activity, g/mmol · h · bar |
|---|---|---|---|---|---|---|---|---|---|
| 25 | 9.9 | 1 | 22 | 1 | 30 | — | — | 0.2 | 40 |

EXAMPLE 36

Preparation of 1-(1H-benzimidazol-2-yl)ethanone

As described in J. Kollonicsch, U.S. Pat. No. 3,320,273/ 16 May 1967.

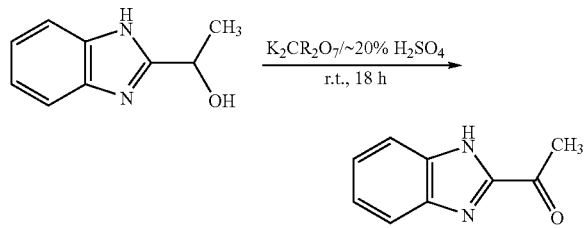

A solution of 16.2 g (0.1 mol) 1-(1H-benzimidazol-2-yl)ethanol (synthesised according to as described in A. Katrizky et al. Tetrahedron Assymetry, 8 (1997), 1491) in 200 ml 5% H$_2$SO$_4$ was treated with a solution of 39.6 g (75.5 mmol) potassium dichromate in 40% sulphuric acid. The reaction mixture was stirred at room temperature for 18 hours and neutralised with 190 ml conc. NH$_4$OH. The formed precipitate was filtered, washed with 700 ml water and extracted with 700 ml 96% ethanol. The solvent was evaporated to c.a. 50–80 ml, the formed suspension cooled to −40° C., stirred for 10 min and filtered while cold. The solid was washed with 2×10 ml cold ethanol and dried under reduced pressure. Yield—9.3 g (58.1%). $^1$H NMR (250 MHz, CDCl$_3$), δ, ppm: 2.84 (s, 3H), 7.38 (m, 2H), 7.56 (d, J$_{HH}$=7.3 Hz, 1H), 7.89 (d, J$_{HH}$=7.6 Hz, 1H), 11.08 (br.s 1H).

EXAMPLE 37

Preparation of N-[(1E)-1-(1H-benzimidazol-2-yl)ethylidene]-N-1,1':3',1"-terphenyl-2'-ylamine Similarly to the method described in M. Ali et. al., Z Naturforsch. B. Anorg. Chem. Org. Chem., 31 (1976), 254

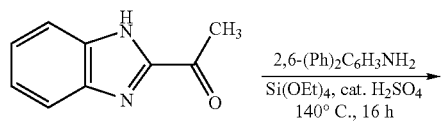

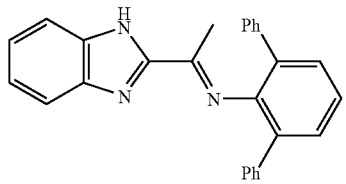

A mixture of 0.8 g (3.26 mmol) 1-(1H-benzimidazol-2-yl)ethanone, 0.52 g (3.26 mmol) 2,6-diphenylaniline, 0.45 g (3.75 mmol) tetraethylorthosilicate [(EtO)$_4$S] and 1 drop conc. sulfuric acid was stirred at 140° C. for 16 hours. The volatile materials were evaporated, the residue cooled to room temperature and 5–6 ml methanol were added. The precipitate was filtered, washed with 5 ml cold methanol and extracted into 20 ml dichloromethane. The extract was filtered and the filtrate evaporated to give 1.2 g (76.3%) of the desired product. Microanalysis, %: Calc. for C$_{27}$H$_{21}$N$_3$: C, 83.69; H, 5.46; N, 10.84. Found C, 83.79; H, 5.52; N, 10.68. $^1$H NMR (250 MHz, CDCl$_3$), δ, ppm: 1.97 (s, 3H), 2.74 (m, 2H), 7.22 (m, 8H), 7.36 (m, 8H), 7.75 (J$_{HH}$=7.3 Hz, 1H), 10.0 (br.s, 1H).

EXAMPLE 38

Preparation of N-[(1E)-1-(1-benzyl-1H-benzimidazol-2-yl)ethylidene]-N-1,1':3',1"-terphenyl-2'-ylamine (L-7)

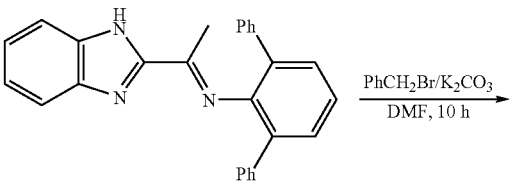

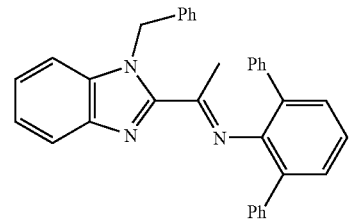

A mixture of 0.70 g (1.87 mmol) N-[(1E)-1-(1H-benzimidazol-2-yl)ethylidene]-N-1,1':3',1"-terphenyl-2'-ylamine, 1.42 g (10.3 mmol) anhydrous K$_2$CO$_3$ and 0.35 g (2.06 mmol) benzylbromide in 4 ml anhydrous DMF was stirred at room temperature for 10 hours. The reaction mixture was then poured into 80 ml water, stirred for 10 min and extracted with ethyl acetate (3×50 ml). The combined extracts were washed with water (3×25 ml) and dried over anhydrous $Na_2SO_4$. The solvent was evaporated to give an yellow oil which was triturated with 5 ml methanol at −78° C., filtered while cold washed with cold (−78° C.) methanol (2×2 ml) and dried under reduced pressure. Yield 0.56 g (66.2%). $^1H$ NMR (250 MHz, $CDCl_3$), δ, ppm: 2.07 (s, 3H), 5.51 (m, 2H), 6.90 (m, 2H), 7.22 (m, 19H), 7.78 (m, 1H).

EXAMPLE 39

Preparation of {N-[(1E)-1-(1-benzyl-1H-benzimidazol-2-yl)ethylidene]-N-1,1':3',1''-terphenyl-2'-ylamine}dibromonickel (II) (Ni-2)

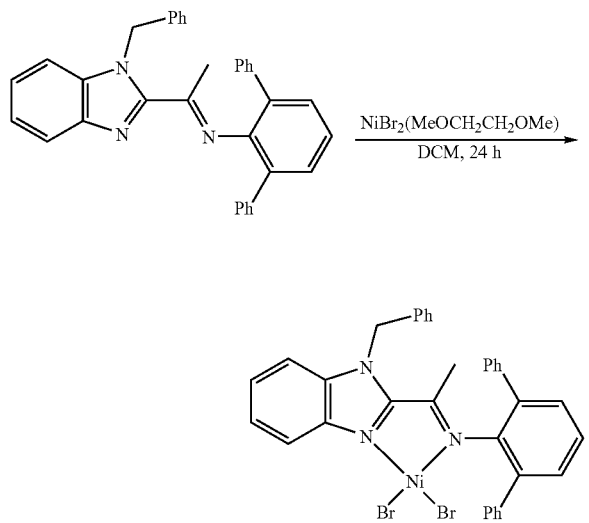

A slurry of 0.30 g (0.65 mmol) N-[(1E)-1-(1-benzyl-1H-benzimidazol-2-yl)ethylidene]-N-1,1':3',1''-terphenyl-2'-ylamine and nickel dibromide dimethoxy ethane complex (0.19 g, 0.65 mmol) in 20 ml dichloromethane (DCM) was stirred at room temperature for 24 hours. The solid was filtered, washed with DCM (3×10 ml) and dried under reduced pressure. Yield 0.40 g (90.2%).

EXAMPLES 40–42

Ethylene Oligomerisation Tests with Ni-2—See Table Below

EXAMPLES 40–42

Oligomer Analysis

| Example | Mn | Mw | PDI | Linear olefins, mol % | Internal olefins, mol % |
|---|---|---|---|---|---|
| 40 | 370 | 590 | 1.60 | 94.6 | 87.5 |
| 41 | 370 | 640 | 1.64 | 94.7 | 83.8 |
| 42 | 390 | 630 | 1.64 | 94.6 | 83.8 |

EXAMPLE 43

Preparation of 4,7-Diphenyl-1H-benzimidazole-2-carbaldehyde

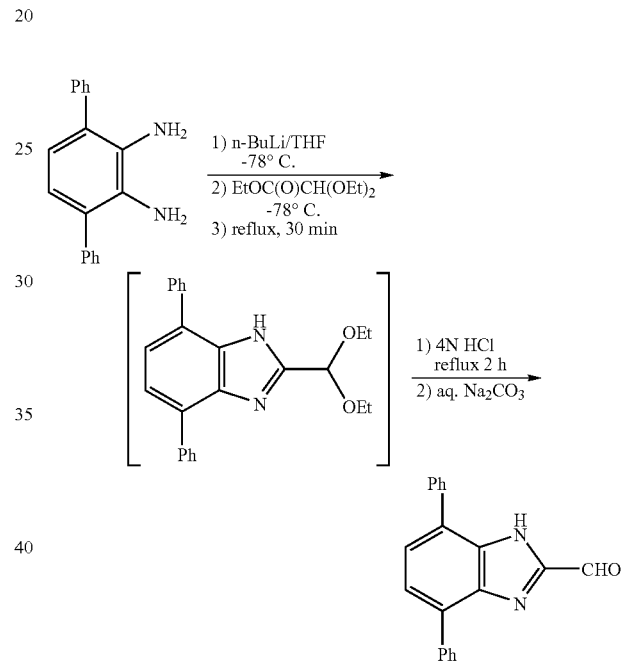

A solution of 11.1 ml (27.72 mmol) n-BuLi (2.5 M in hexanes) was added dropwise to a cooled to −78° C. solution of 3.4 g (13.2 mmol) 1,1':4',1''-terphenyl-2',3'-diamine in 110 ml THF. The reaction mixture was stirred at −78° C. for 1 hour and 2.4 ml (13.5 mmol) dry ethyl diethoxyacetate were added dropwise over 1 min. The solution was then stirred at 78° C. for 30 min, allowed to slowly warm up room temperature, stirred for another 30 min and the heated at reflux for 2 hours. Formation of white precipitate (LiOH) was observed during the reflux. After cooling to room

| Ex | Cat., µmol | MAO, mmol | Temp. Setpoint, ° C. | P $C_2H_4$ bar | Pol. time, min | ΔT, deg. | Soluble fraction g | Insoluble fraction g | Activity, g/mmol · h · bar |
|---|---|---|---|---|---|---|---|---|---|
| 40 | 10.0 | 1.0 | 23 | 4 | 60 | +19 | 11.9 | — | 298 |
| 41 | 10.0 | 1.0 | 24 | 5 | 60 | +23 | 15.2 | — | 304 |
| 42 | 10.0 | 1.0 | 23 | 2 | 60 | +11 | 6.0 | — | 300 |

EXAMPLE 44

Preparation of 1-Methyl-4,7-diphenyl-1H-benzimidazole-2-carbaldehyde

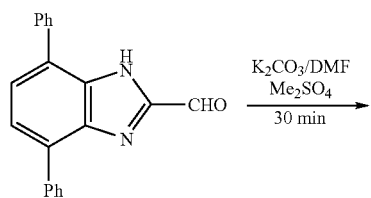

A mixture of 3.3 g (11.07 mmol) 4,7-diphenyl-1H-benzimidazole-2-carbaldehyde, 8.60 g (62.0 mmol) anhydrous $K_2CO_3$ and 1.1 ml (11.07 mmol) dimethyl sulfate in 30 ml anhydrous DMF was stirred at room temperature for 30 min. The reaction mixture was then poured into 300 ml water, stirred for 10 min and extracted with dichloromethane (3×100 ml). The combined extracts were washed with water (3×50 ml) and dried over anhydrous $Na_2SO_4$. The solvent was evaporated to give an yellow oil which was triturated with 20 ml methanol at 0° C., filtered while cold, washed with cold (0° C.) methanol (2×10 ml) and dried under reduced pressure. Yield 3.1 g (89.6%). $^1$H NMR (250 MHz, $CDCl_3$), δ, ppm: 3.74 (s, 3H), 7.47 (m, 10H) 8.04 (d, $J_{HH}$=7.8 Hz, 2H), 10.1 (s, 1H).

temperature and addition of 60 ml water the reaction mixture was carefully neutralized with the addition of 5N acetic acid. Diethyl ether (200 ml) was then added, the formed biphasic mixture was vigorously stirred and the organic layer separated. It was washed with water (3×100 ml) and dried over anhydrous sodium sulfate. Evaporation of the solvent afforded an yellow-brown oil which was dissolved in 15 ml THF and 60 ml 4N HCl were added. The mixture was stirred at reflux for 2 hours, cooled to room temperature and 120 ml icy water was added. The mixture was stirred vigorously for 10 min at ~0° C. and then filtered. The solid was suspended in 70 ml water and neutralized with 10% aqueous sodium carbonate. The solid was filtered again, washed with water and dried at room temperature under reduced pressure. Yield—2.85 g (72.4%). $^1$H NMR (250 MHz, $CDCl_3$), δ, ppm: 7.54 (m, 10H), 8.03 (br. s, 2H), 10.06 (s, 1H), 10.31 (br. s, 1H).

EXAMPLE 45

Preparation of N-(2,4-dimethoxybenzyl)-N-[(1E)-(1-methyl-4,7-diphenyl-1H-benzimidazol-2-yl)methylene]amine (L8)

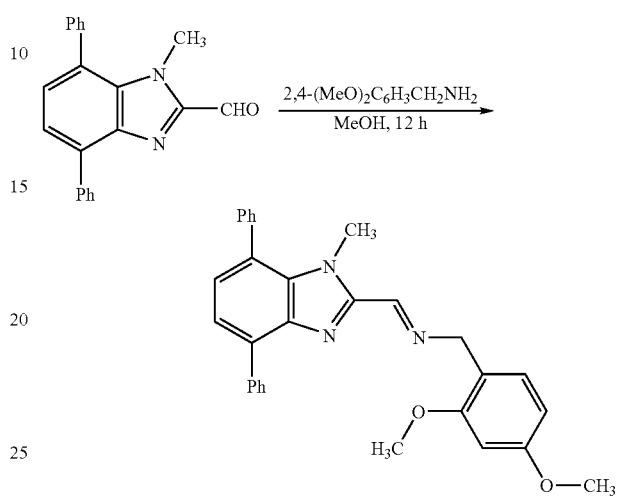

A mixture of 0.1 g (0.32 mmol) 1-methyl-4,7-diphenyl-1H-benzimidazole-2-carbaldehyde, 55 mg (0.32 mmol) 2,4-dimethoxybenzylamine and 1 drop glacial acetic acid in 8 ml methanol were stirred for 12 hour at room temperature. The reaction mixture was cooled to −20° C. and filtered while cold. The solid was washed with cold (−20° C.) methanol (2×1 ml) and dried at reduced pressure. Yield—0.12g (81.1%). %). $^1$H NMR (250 MHz, $CDCl_3$), δ, ppm: 3.76 (s, 3H), 3.80 (s, 6H), 4.81 (s, 2H), 6.46 (m, 2H), 7.14 (d, $J_{HH}$=8.8 Hz, 1H), 7.25 (d, $J_{HH}$=7.6 Hz, 1H), 7.46 (m, 9H), 8.02 (d, $J_{HH}$=7.0 Hz, 2H), 8.61 (s, 1H).

EXAMPLE 46

Preparation of {N-(2,4-dimethoxybenzyl)-N-[(1E)-(1-methyl-4,7-diphenyl-1H-benzimidazol-2-yl)methylene]amine}trichlorochromium (III) (Cr-8)

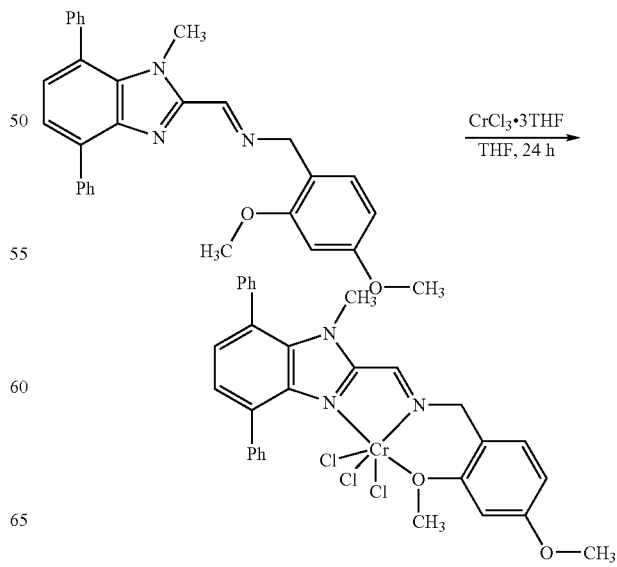

A solution of 47 mg (0.1 mmol) N-(2,4-dimethoxybenzyl)-N-[(1E)-(1-methyl-4,7-diphenyl-1H-benzimidazol-2-yl)methylene]amine and 36 mg (0.1 mmol) tris(tetrahydrofuran)chromium trichloride in 5 ml THF was stirred at room temperature for 24 hours. The volume of the reaction mixture was reduced to c.a. 1 ml and 10 ml n-pentane were added. The formed precipitate was filtered, washed with pentane (2×2 ml) and dried under reduced pressure. Yield—44 mg (72.0%).

EXAMPLE 47

Ethylene Polymerisation Test with Cr-8

| Ex | Cat., µmol | MAO, mmol | Temp. Setpoint, °C. | P C$_2$H$_4$ bar | Pol. time, min | ΔT, deg. | Polymer Yield, g | Activity, g/mmol · h · bar |
|---|---|---|---|---|---|---|---|---|
| 47 | 10.0 | 7.0 | 20 | 1 | 50 | — | 3.5 | 420 |

EXAMPLE 47

Polymer Properties

| Ex. | Mn | Mw | PDI |
|---|---|---|---|
| 47 | 1421 | 52600 | 37.0 |

EXAMPLE 48

Preparation of [N,N-bis(1H-benzimidazol-2-ylmethyl)-N-methylamine]trichlorovanadium(III) (V-1)

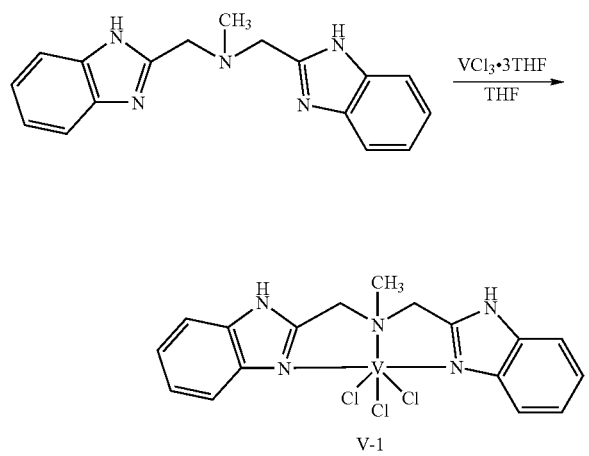

A slurry of 12.00 g (41.2 mmol) L-1 and 15.4 g (41.2 mmol) VCl$_3$(THF)$_3$ in 120 mL THF was stirred at reflux for 30 min. The reaction mixture was then allowed to cool down to room temperature and stirred for another 4 hours. The obtained yellow-green solid was filtered, washed with THF (4×70 mL) and dried under reduced pressure. Yield 17.8 g (96.2%). Microanalysis, %: Calc. for C$_{17}$H$_{17}$N$_5$VCl$_3$: C, 45.51; H, 3.82; N, 15.61. Found C, 45.39; H, 3.62; N, 15.41. FT-IR (KBr): 3244, 1596, 1210, 1049, 1003, 982, 944, 752, 701, 653, 621, 518, 475, 455, 432, 416. $\square_{eff.}$=2.89 BM.

EXAMPLES 48–61

Ethylene Homopolymerisation with V-1

The ethylene homopolymerisation tests were carried out using a procedure similar to that described in Example 3–11.

Solution of Activated Catalyst:

The required amount of catalyst precursor V-1 (0.5–5 mg) was suspended in 20–100 ml toluene followed by the addition of the co-catalyst (DEAC—diethyl aluminium chloride or DMAC—diethylaluminium chloride—0.1–10 mmol). Thus prepared solution can be used immediately or stored at 0° C. for a number of days.

Ethylene Polymerisation

The ethylene polymerisation reactions were carried out either in a 400 ml "Fischer-Porter" glass reactor (FPR) equipped with a gas inlet, a catalyst inlet, a mechanical stirrer and a digital thermometer or in a 1L stainless-steel reactor (SSR) equipped with an integral system for control of reaction temperature, ethylene pressure and ethylene flow. An aliquot of 1–5 ml of the catalyst solution described above was injected in the reactor containing 200–300 (FPR) or 400–800 (SSR) ml solvent (usually toluene, n-hexane, n-heptane or isobutane), 0.1–2 mmol scavenger (usually DMAC) and 10–60 µmol reactivator (usually ethyl trichloroacetate—ETA or another chlorinated compound as chloroform). The reactor was then connected to the ethylene gas supply at the desired pressure and the temperature brought quickly to the required value. The reaction was carried out for 10–120 min (usually 60 min). The reaction mixture was then cooled down to room temperature (if necessary) and the reaction terminated by venting the ethylene off. If toluene was used as a polymerisation medium, the reactor content was then poured into a beaker containing 400 ml methanol and a few drops of 2M HCl. The polymer was filtered, washed with methanol (if necessary) and dried at 60° C. under vacuum.

TABLE V-1H

Polymerisation in toluene; Fisher-Porter glass reactor
Table V-1H.

| Ex | Cat., μmol | Me$_2$AlCl mmol Note 1 | ECA mmol | C$_2$H$_4$ bar | H$_2$ L | T °C. Note 2 | Time min | PE g | Activity g mmol$^{-1}$ h$^{-1}$ bar$^{-1}$ |
|---|---|---|---|---|---|---|---|---|---|
| 48 | 2.00 | 0.5 | 0.01 | 4 | — | 50–60 | 25 | 10.0 | 3000 |
| 49 | 1.00 | 0.25 | 0.01 | 4.0 | — | 50–62 | 15 | 7.1 | 7100 |
| 50 | 0.1 | 0.25 | 0.01 | 4.7 | 0.3 | 52–60 | 60 | 13.3 | 20200 |
| 51 | 0.07 | 0.50 | 0.1 | 4.8 | 0.2 | 60–68 | 60 | 10.6 | 31550 |
| 52 | 0.07 | 0.50 | 0.1 | 4.8- | 0.3 | 60–65 | 45 | 8.4 | 33300 |
| 53 | 0.45 | 1.00 | 0.04 | 4.6 | 0.3 | 25–74 | 60 | 19 | 9180 |
| 54 | 0.45 | 1.00 | 0.04 | 3.7 | 0.3 | 25–75 | 60 | 17.6 | 10570 |
| 55 | 0.45 | 1.00 | 0.04 | 2.9 | 0.3 | 25–58 | 60 | 12.6 | 9655 |
| 56 | 0.45 | 1.00 | 0.04 | 2.1 | 0.3 | 25–51 | 60 | 10.0 | 10580 |
| 57 | 0.45 | 1.00 | 0.04 | 1.1 | 0.3 | 25–43 | 60 | 5.7 | 11515 |
| 58 | 0.18 | 0.7 | 0.02 | 4 | 0.2 | 30–40 | 60 | 13.4 | 18600 |
| 59 | 0.18 | 0.70 | 0.02 | 4 | 0.2 | 40–52 | 60 | 15 | 20833 |
| 60 | 0.18 | 0.70 | 0.02 | 4 | 0.2 | 50–62 | 40 | 9.6 | 20000 |
| 61 | 0.20 | 0.60 | 0.02 | 4 | 0.2 | 85 | 60 | 3.4 | 4250 |

Polymer properties

| Ex. | Mn | Mw | PDI |
|---|---|---|---|
| 48 | 157151 | 714400 | 4.55 |
| 49 | p.s. | p.s. | p.s. |
| 50 | 142900 | 379800 | 2.7 |
| 51 | 165600 | 411100 | 2.5 |
| 52 | 120700 | 297500 | 2.5 |
| 55 | 134222 | 338648 | 2.52 |
| 56 | 140119 | 338308 | 2.41 |
| 57 | 127175 | 595700 | 2.40 |
| 58 | 153077 | 624458 | 2.26 |
| 59 | 100404 | 494179 | 2.47 |
| 60 | 74901 | 381329 | 2.51 |
| 61 | 34197 | 167406 | 2.44 |

Note 1 Me$_2$AlCl = dimethylaluminium chloride - DMAC; Run 51: Et$_2$AlCl (diethylaluminiumchloride - DEAC) used as cocatalyst Runs 53–61: the amount of Me2AlCl shown includes the amount of the scavenger (0.5 mmol)
Note 2 - ECA = ethyl trichloroacetate - C$_2$H$_5$OC(O)CCl$_3$
Note 3 - Temperature left uncontrolled during the polymerisation reaction. The change is due to the heat formation during the polymerisation reaction.

EXAMPLES 62–69

Ethylene Copolymerisation with V-1

The ethylene copolymerisation tests were carried out using a procedure similar to that described in Example 48–61. The required amounts of comonomer were preloaded in the polymerisation reactor.

Table V-1C. Polymerisation in Toluene. Fisher-Porter Glass Reactor.

TABLE V-1C

| Ex | Cat., μmol | Me$_2$AlCl mmol | ECA mmol Note 1 | C$_2$H$_4$ bar | Co-M mmol Note 2 | H$_2$ L | T °C. Note 3 | Time min | Yield g | Activity g mmol$^{-1}$ h$^{-1}$ bar$^{-1}$ |
|---|---|---|---|---|---|---|---|---|---|---|
| 62 | 1.00 | 0.25 | 0.01 | 4.0 | C$_3$H$_6$ (90) | — | 50 | 15 | 5.3 | 5300 |
| 63 | 0.08 | 0.2 | 0.01 | 3.9 | C$_3$H$_6$ (57) | 0.2 | 60–62 | 60 | 5.2 | 16670 |
| 64 | 0.18 | 0.7 | 0.02 | 2.0 | C$_3$H$_6$ (96) | 0.5 | 50 | 60 | 3.2 | 8890 |
| 65 | 0.11 | 0.05 | 0.01 | 4.8 | 1-H (30) | 0.1 | 60–64 | 60 | 6.4 | 10582 |
| 66 | 0.40 | 1.6 | 0.05 | 5 | NB (52) | — | 50–75 | 10 | 9.0 | 27000 |
| 67 | 0.40 | 1.6 | 0.05 | 5 | NB (104) | — | 50–66 | 20 | 9.7 | 11640 |
| 68 | 0.40 | 1.6 | 0.05 | 3 | NB (120) | — | 50 | 90 | 8.9 | 4395 |

TABLE V-1C-continued

| 69 | 0.40 | 1.6 | 0.05 | 1 | NB (86) | — | 50 | 90 | 5.2 | 6930 |

Polymer properties

| Example | Mn | Mw | PDI | Co-M mol % |
|---|---|---|---|---|
| 62 | 303742 | 992944 | 3.3 | 2.4 |
| 63 | 79500 | 204500 | 2.6 | 1.4 |
| 64 | 22400 | 55000 | 2.5 | 4.5 |
| 65 | 95800 | 239600 | 2.5 | 0.4 |
| 66 | 258724 | 750300 | 2.9 | 10.1 |
| 67 | 300961 | 879940 | 2.9 | 15.5 |
| 68 | 266707 | 584906 | 2.2 | 23.5 |
| 69 | 135379 | 424320 | 3.1 | 27.4 |

Note 1
ETA = ethyl trichloroacetate- $C_2H_5OC(O)CCl_3$
Note 2
$C_3H_6$ = propene; 1-H = 1-hexene; NB = norbornene (2,2,1-bicyclohept-2-ene).
Note 3 - Temperature left uncontrolled during the polymerisation reaction. The change is due to the heat formation during the polymerisation reaction.

EXAMPLE 70

[N,N-bis(1H-benzimidazol-2-ylmethyl)-N-methylamine]dipropoxyoxovanadium(V) (V-2)

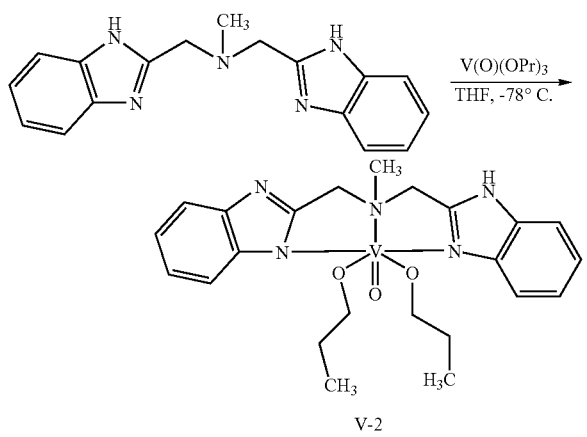

V-2

A cooled to −78° C. solution of 0.42 g (1.72 mmol) tripropoxyoxovanadium (V) in 10 ml THF was added to a cold (−78° C.) slurry of [N,N-bis(1H-benzimidazol-2-ylmethyl)-N-methylamine] in 20 ml THF. The mixture was allowed to warm up to room temperature and stirred for 30 min. The orange-red solution was filtered to remove any traces of insoluble materials (ligand) and the filtrate evaporated to c.a. 5 ml. Addition of 50 ml pentane resulted in the formation of an orange solid which was filtered, washed with 2×5 ml pentane and dried under reduced pressure. Yield—0.72g (88.0%). Microanalysis, %: Calculated for $C_{23}H_{30}N_5O_3V$: C, 58.10; H, 6.36; N, 14.73. Found: C, 57.93; H, 6.26; N, 14.77. $^1H$ NMR (250 MHz, $D^2$-DCM), δ: 0.85 (t, $J_{HH}$=14.7 Hz 6H), 1.62 (m, 4H), 2.85 (s, 3H), 3.08 (d, $J_{HH}$=15.9 Hz 2H), 4.02 (d, $J_{HH}$=16.2 Hz, 2H), 4.88 (dt, $J_{HH}$=13.4 Hz, $J_{HH}$=11.6 Hz, 2H), 5.34 (dt, $J_{HH}$=12.5 Hz, $J_{HH}$=11.3 Hz, 2H), 7.14 (m, 4H), 7.42 (m, 2H), 8.05 (m, 2H). $^{51}V$ NMR [131 MHz, V(O)Cl$_3$, $d^2$-DCM], δ, ppm: −560.2.

Figure 15:
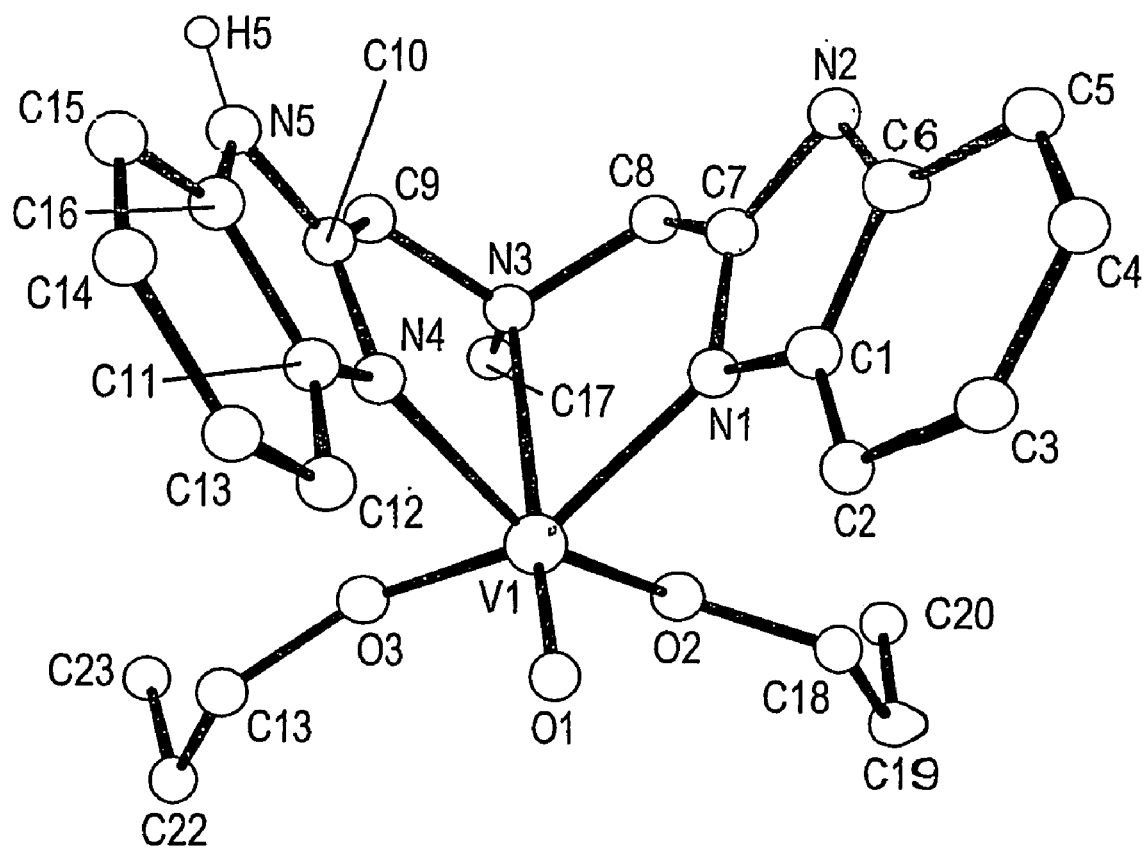

The crystal structure of V-2 is shown in FIG. 15.

EXAMPLES 71–77

Ethylene Homopolymerisation with V-2

The ethylene homopolymerisation tests were carried out using a procedure similar to that described in Example 48–61

Table V-2H-FP. Polymerisation in Toluene; Fisher-Porter Glass Reactor

TABLE V-2H-FP

| Ex | Cat., µmol Note 1 | Me$_2$AlCl mmol | ECA mmol Note 2 | C$_2$H$_4$ bar | H$_2$ bar | T ° C. Note 3 | Time min | PE g | Activity g mmol$^{-1}$ h$^{-1}$ bar$^{-1}$ |
|---|---|---|---|---|---|---|---|---|---|
| 71 | 0.43 | 1.0 | 0.04 | 4 | — | 50–74 | 15 | 7.8 | 18140 |
| 72 | 0.10 | 0.05 | 0.03 | 4 | 1 | 50–62 | 30 | 8.3 | 41500 |
| 73 | 0.10 | 0.05 | 0.03 | 4 | 1 | 50–67 | 30 | 9.5 | 47500 |
| 74 | 0.10 | 0.05 | 0.03 | 4 | 1 | 50–62 | 30 | 8.6 | 43000 |

Note 1 Example 72, activated catalyst solution aged for 2 hours; Example 73, activated catalyst solution aged for 7 hours; Example 74, activated catalyst solution aged for 27 hours.
Note 2 ECA = ethyl trichloroacetate - $C_2H_5OC(O)CCl_3$
Note 3 Temperature left uncontrolled during the polymerisation reaction. The change is due to the heat formation during the polymerisation reaction.

TABLE V-2H-FP-continued

| | Polymer properties | | |
|---|---|---|---|
| Example | Mn | Mw | PDI |
| 71 | 313121 | 984909 | 3.15 |

TABLE V-2H-SS

| | | | Polymerisation in heptane; Stainless steel reactor | | | | | |
|---|---|---|---|---|---|---|---|---|
| Ex | Cat., μmol | Me$_2$AlCl mmol Note 1 | ECA mmol Note 2 | C$_2$H$_4$ Bar | H$_2$ bar | T, °C. | Time min | PE g | Activity g mmol$^{-1}$ h$^{-1}$ bar$^{-1}$ |
| 75 | 0.20 | 0.50 | 0.04 | 4 | 0.2 | 50 | 60 | 12.0 | 12857 |
| 76 | 0.10 | 1.00 | 0.04 | 4 | 0.2 | 70 | 60 | 6.0 | 15000 |
| 77 | 0.10 | 1.00 | 0.04 | 4 | 0.3 | 60 | 60 | 14.5 | 36250 |

Note 1 Me$_2$AlCl = dimethylaluminium chloride - DMAC; the amount of Me$_2$AlCl shown includes the amount of the scavenger (0.5 mmol)
Note 2 ECA = ethyl trichloroacetate - C$_2$H$_5$OC(O)CCl$_3$

| | Polymer properties | | | | | | |
|---|---|---|---|---|---|---|---|
| Example | Mn | Mw | PDI | Ex | Mn | Mw | PDI |
| 76 | 139684 | 338303 | 2.42 | 77 | 224724 | 536642 | 2.39 |

FIGS. 16 and 17, respectively, show ethylene uptake as a function of time for Examples 77 and 78.

EXAMPLES 78–81

Ethylene Copolymerisation with V-2

The ethylene copolymerisation tests were carried out using a procedure similar to that described in Example 48–61. The required amounts of comonomer were preloaded in the polymerisation reactor.

TABLE V-2C-FP

| | | | | | | | | | Polymerisation in toluene. Fisher-Porter glass reactor. | | | | |
|---|---|---|---|---|---|---|---|---|---|---|---|---|---|---|
| | | Me$_2$Al Cl | ECA | | Co-M | | | | | Activity | Polymer properties | | | |
| Ex | Cat., μmol | mmol | mmol Note 1 | C$_2$H$_4$ bar | mmol Note 2 | H$_2$ bar | T °C. | Time min | Yield g | g mmol$^{-1}$ h$^{-1}$bar$^{-1}$ | Mn | Mw | PDI | Co-M mol % |
| 78 | 0.1 | 0.7 | 0.03 | 4.0 | NB (7.0) | — | 50–65 | 15 | 6.0 | 60000 | 351321 | 983700 | 2.8 | 1.2 |
| 79 | 0.40 | 0.8 | 0.04 | 0.5 | NB (60) | — | 50 | 60 | 4.5 | 22500 | 57128 | 143678 | 2.5 | 32.5 |
| 80 | 0.09 | 0.8 | 0.04 | 4.0 | 1,9DD (27) | — | 50–59 | 60 | 10.3 | 28610 | | | | |
| 81 | 0.40 | 1.0 | 0.04 | 3.0 | EDE (27) | — | 50–59 | 30 | 6.5 | 10830 | 263040 | 631300 | 2.4 | 3.5 |

Note 1
ETA = ethyl trichloroacetate- C$_2$H$_5$OC(O)CCl$_3$
Note 2
NB = norbornene (2,2,1-bicyclohept-2-ene); 1,9DD = 1,9-decadiene; EDE = 8-ethyltetracyclo-[4.4.0.1$^{2,5}$.1$^{7,10}$]-3-dodecene

EXAMPLE 86

Preparation of N-(2,4-dimethoxybenzyl)-N-[(1E)-(4,7-diphenyl-1H-benzimidazol-2-5 yl)methylene]-amine (L-9)

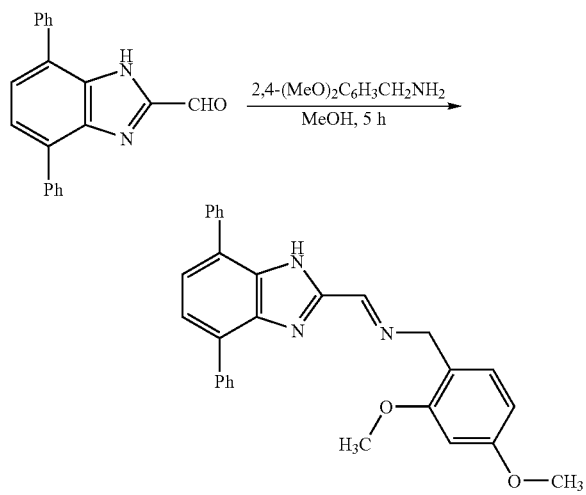

A mixture of 0.11 g (0.37 mmol) 4,7-diphenyl-1H-benzimidazole-2-carbaldehyde and 56 mg 2,4-dimethoxybenzylamine in 3 ml methanol was stirred at room temperature for 5 hours. The yellow precipitate was filtered, washed with cold (−20° C.) methanol (3×1 ml) and dried under reduced pressure. Yield—0.1 g (60.1%).

EXAMPLE 87

Preparation of {N-(2,4-dimethoxybenzyl)-N-[(1E)-(4,7-diphenyl-1H-benzimidazol-2-yl)methylene]-amine}trichlorovanadium (III) (V-3)

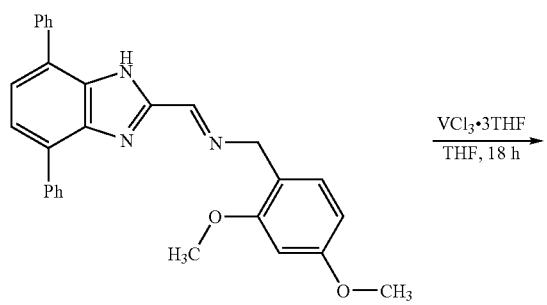

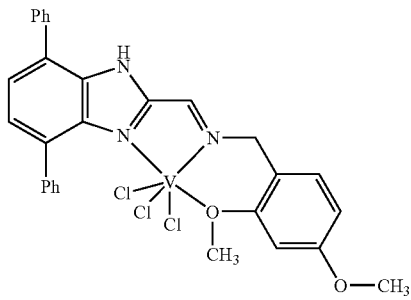

A solution of 81 mg (0.2 mmol) N-(2,4-dimethoxybenzyl)-N-[(1E)-(4,7-diphenyl-1H-benzimidazol-2-yl)methylene]amine and 64 mg (0.2 mmol) tris(tetrahydrofuran)vanadium trichloride in 5–6 ml THF was heated at reflux for 10 min, allowed to cool down and stirred at room temperature for 18 hours. The resulted slurry was mixed with 50 ml pentane and the formed precipitate filtered, washed with pentane (2×2 ml) and dried under reduced pressure. Yield—75 mg (68.9%).

EXAMPLES 88–90

Ethylene Homo- and Copolymerisation with V-3

The ethylene copolymerisation tests were carried out using a procedure similar to that described in Example 48–61. The required amounts of comonomers were pre-loaded in the polymerisation reactor.

TABLE V-3HC-FP

Polymerisation in toluene. Fisher-Porter glass reactor.

| Ex | Cat., µmol | Me$_2$AlCl mmol | ECA mmol Note 1 | C$_2$H$_4$ bar | Co-M (mmol) Note 2 | H$_2$ bar | T ° C. | Time min | Yield G | Activity g mmol$^{-1}$ h$^{-1}$ bar$^{-1}$ |
|---|---|---|---|---|---|---|---|---|---|---|
| 88 | 0.72 | 1.0 | 0.04 | 4 | — | — | 20–62 | 15 | 7.2 | 10000 |
| 89 | 0.43 | 1.0 | 0.04 | 3 | 1-H (81) | — | 50–65 | 30 | 5.7 | 8740 |

TABLE V-3HC-FP-continued

| 90 | 0.56 | 1.0 | 0.04 | 3 | NB (36) | — | 50–70 | 10 | 8.0 | 28600 |

Note 1 ETA = ethyl trichloroacetate- $C_2H_5OC(O)CCl_3$
Note 2 NB = norbornene (2,2,1-bicyclohept-2-ene); 1-H = 1-hexene Polymer properties

| Example | Mn | Mw | PDI | NB mol % | 1-H mol % |
|---|---|---|---|---|---|
| 88 | 655100 | 1722600 | 2.63 | — | — |
| 89 | 123200 | 299300 | 2.43 | — | 1.1 |
| 90 | 135991 | 737242 | 5.42 | 12 | — |

EXAMPLE 91

Preparation of N-[(1E)-1H-benzimidazol-2-ylmethylene]-N-[2-(trifluoromethyl)benzyl]amine (L-10)

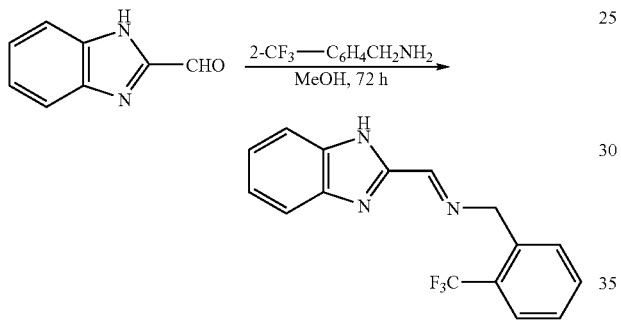

A mixture of 1.1 g (7.5 mmol) 1H-benzimidazole-2-carbaldehyde (Fluorochem), 1.3 g (7.5 mmol) 2-trifluoromethylbenzylamine and 1 drop glacial acetic acid in 10 ml methanol was stirred at room temperature for 72 hours. The resulted yellow solution was evaporated to c.a. 2–3 ml, cooled to −40° C. and the formed solid filtered. It was washed with methanol/water mixture (1/2) and dried under reduced pressure. Yield—1.96 g (86.4%). $^1$H NMR (250 MHz, $D^2$-DCM), δ: 5.03 (s, 2H), 7.28–7.69 (m, 8H), 8.46 (s, 1H).

EXAMPLE 92

Preparation of {N-[(1E)-1H-benzimidazol-2-ylmethylene]-N-[2-(trifluoromethyl)benzyl]amine}tetrahydrofuranotrichlorovanadium (III) (V-4)

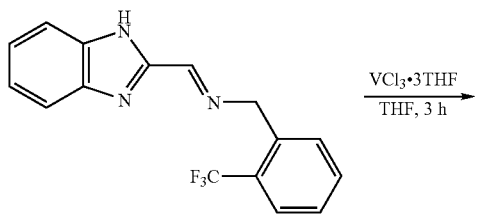

-continued

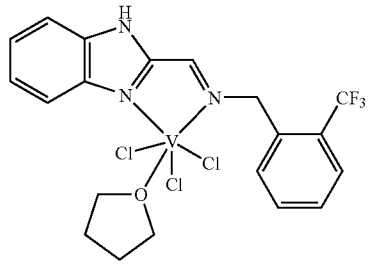

A mixture of 0.40 (1.3 mmol) g N-[(1E)-1H-benzimidazol-2-ylmethylene]-N-[2-(trifluoromethyl)-benzyl]amine and 0.52 g (1.3 mmol) tris(tetrahydro-furan)vanadium trichloride in 40 ml THF was stirred at room temperature for 3 hours. The volume of the reaction mixture was then reduced to c.a. 10 ml and 70 ml pentane were added. The formed precipitate was filtered, washed with 3×5 ml pentane and dried under reduced pressure. Yield—0.62 g (89.6%).

EXAMPLES 93–94

Ethylene Homo- and Copolymerisation with V-4

The ethylene copolymerisation tests were carried out using a procedure similar to that described in Example 48–61. The required amounts of comonomers were pre-loaded in the polymerisation reactor.

TABLE V-4HCT-FP

Polymerisation in toluene. Fisher-Porter glass reactor.

| Ex | Cat., µmol | Me$_2$AlCl mmol | ECA mmol Note 1 | C$_2$H$_4$ bar | Co-M (mmol) Note 2 | H$_2$ bar | T °C. | Time min | Yield G | Activity g mmol$^{-1}$ h$^{-1}$ bar$^{-1}$ |
|---|---|---|---|---|---|---|---|---|---|---|
| 93 | 0.37 | 1.0 | 0.04 | 4 | — | — | 20–72 | 30 | 8.0 | 10800 |
| 94 | 0.32 | 1.0 | 0.05 | 3 | NB (36) NB 1-H | — | 50–70 | 15 | 9.3 | 38750 |

Note 1 ETA = ethyl trichloroacetate- C$_2$H$_5$OC(O)CCl$_3$
Note 2 NB = norbornene (2,2,1-bicyclohept-2-ene).

Polymer Properties

| Example | Mn | Mw | PDI | NB mol % | 1-H mol % |
|---|---|---|---|---|---|
| 93 | Insoluble | insoluble | — | — | — |
| 94 | — | — | — | 14.0 | — |

EXAMPLE 96

Preparation of {N,N-bis(1H-benzimidazol-2-ylmethyl)-N-benzylamine}trichlorovanadium (III) (V-5)

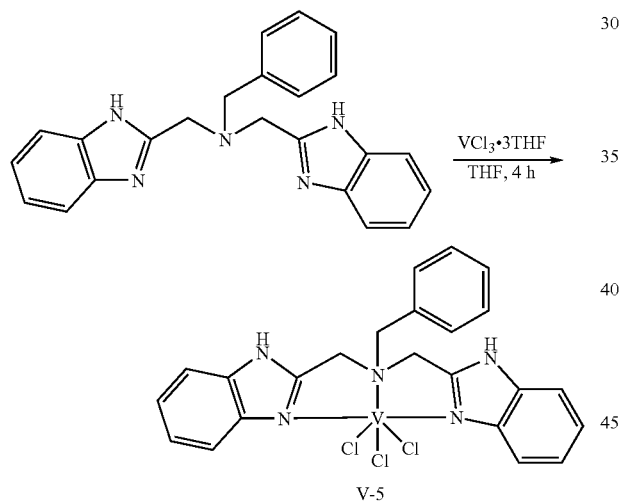

V-5

Analogously to Example 48, [N,N-bis(1H-benzimidazol-2-ylmethyl)-N-benzylamine]-trichlorovanadium(III) (V-1) from 1.0 g (2.7 mmol) N,N-bis(1H-benzimidazol-2-ylmethy)-N-benzylamine, 1.0 g (2.8 mmol) tris(tetrahydrofuran) vanadium trichloride and 40 ml THF. Yield 1.40 g (97.5%). Microanalysis, %. C$_{23}$H$_{21}$N$_5$Cl3V: C, 52.64; H, 4.0.3, N, 13.35; Found: C, 52.50; H, 4.14; N, 13.15. $\mu_{eff}$=2.89 BM.

EXAMPLE 97

Ethylene Homopolymerisation with V-5

The ethylene polymerisation tests were carried out using a procedure similar to that described in Example 48–61.

TABLE V-5H-FP

Polymerisation in toluene. Fisher-Porter glass reactor.

| Ex | Cat., µmol | Me$_2$AlCl mmol | ECA mmol Note 1 | C$_2$H$_4$ bar | H$_2$ L | T °C. | Time min | Yield g | Activity g mmol$^{-1}$ h$^{-1}$ bar$^{-1}$ |
|---|---|---|---|---|---|---|---|---|---|
| 97 | 0.09 | 0.6 | 0.08 | 4.8 | 0.2 | 60–66 | 30 | 5.1 | 23610 |

Note 1 ETA = ethyl trichloroacetate- C$_2$H$_5$OC(O)CCl$_3$

Polymer properties

| Example | Mn | Mw | PDI |
|---|---|---|---|
| 97 | 71547 | 172940 | 2.4 |

EXAMPLE 98

Preparation of {N-methyl-N,N-bis[(1-methyl-1H-benzimidazol-2-yl)methyl]amine}trichloro-vanadium(III) (V-6)

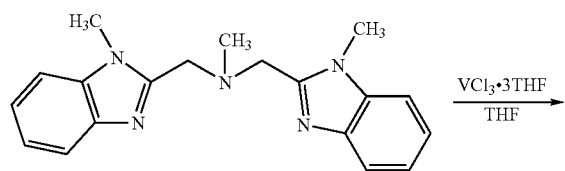

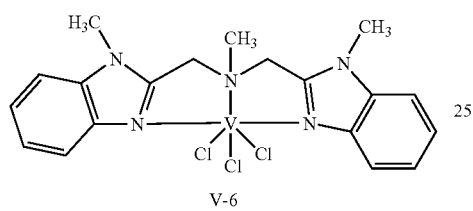

V-6

Analogously to Example 18 {N-methyl-N,N-bis[(1-methyl-1H-benzimidazol-2-yl)methyl]-amine}trichlorochromium (III) from 0.3 g (0.94 mmol) N-methyl-N,N-bis[(1-methyl-1H-benzimidazol-2-yl)methyl]amine, 0.35 g (0.94 mmol) tris(tetrahydrofuran)vanadium trichloride and 20 ml THF. Yield 0.30 g (67.0%). Microanalysis, %. $C_{19}H_{21}N_5Cl_3V$: C, 47.87; H, 4.44; N, 14.69. Found: C, 47.62; H, 4.46; N, 14.56

EXAMPLE 99

Ethylene Homopolymerisation with V-6

The ethylene polymerisation tests were carried out using a procedure similar to that described in Example 48–61.

EXAMPLE 100

Preparation of [N,N-bis(1H-benzimidazol-2-ylmethyl)-N-benzylamine]dipropoxyoxovanadium(V) (V-7)

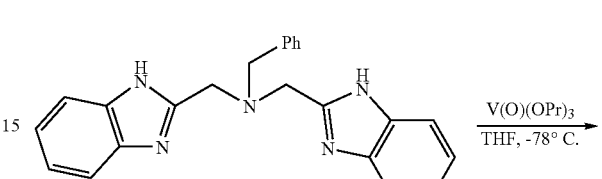

V-7

A cooled to −78° C. solution of 1.65 g (6.8 mmol) tripropoxyoxovanadium (V) in 10 ml THF was added to a cold (−78° C.) slurry of [N,N-bis(1H-benzimidazol-2-ylmethyl)-N-benzylamine] (2.50 g, 6.8 mmol) in 30 ml THF. The mixture was allowed to warm up to room temperature and stirred for 30 min. The filtrate was evaporated to c.a. 10 ml. The formed orange precipitate was filtered, washed with 2×10 ml pentane and dried under reduced pressure. Yield— 1.1 g (29.2.0%). $^1$H NMR (250 MHz, D$^2$-DCM), δ: 0.91 (t, $J_{HH}$=14.9 Hz, 6H), 1.69 (m, 4H), 2.93 (d, $J_{HH}$=15.5 Hz, 2H), 4.25 (d, $J_{HH}$=15.6 Hz, 2H), 4.52 (s, 2H), 4.98 (m, 2H), 5.41 (m, 2H), 7.01 (m, 11H), 7.94 (d, $J_{HH}$=7.9 Hz, 2H), 8.05.

TABLE V-6H-FP

Polymerisation in toluene. Fisher-Porter glass reactor.

| Example | Cat., μmol | Me$_2$AlCl mmol | ECA mmol Note 1 | C$_2$H$_4$ bar | H$_2$ L | T °C. | Time min | Yield g | Activity g mmol$^{-1}$ h$^{-1}$ bar$^{-1}$ |
|---|---|---|---|---|---|---|---|---|---|
| 99 | 0.07 | 0.4 | 0.08 | 4.8 | 0.2 | 60–63 | 55 | 2.3 | 7467 |

Note 1 ETA = ethyl trichloroacetate- $C_2H_5OC(O)CCl_3$

Polymer properties

| Example | Mn | Mw | PDI |
|---|---|---|---|
| 99 | 144595 | 441768 | 3.1 |

EXAMPLE 101

Ethylene Homopolymerisation with V-7
The ethylene polymerisation tests were carried out using a procedure similar to that described in Example 48–61

TABLE V-7H-SS

| | | | Polymerisation in heptane. Stainless steel reactor. | | | | | |
|---|---|---|---|---|---|---|---|---|
| Ex | Cat., μmol | Me$_2$AlCl mmol | ECA mmol Note 1 | C$_2$H$_4$ bar | H$_2$ bar | T °C. | Time min | Yield g | Activity g mmol$^{-1}$ h$^{-1}$ bar$^{-1}$ |
| 101 | 0.14 | 0.5 | 0.04 | 4.0 | 0.2 | 60 | 60 | 8.9 | 15892 |

Note 1 ETA = ethyl trichloroacetate-C$_2$H$_5$OC(O)CCl$_3$

EXAMPLE 102

Preparation of Supported on Silica Catalyst V-2. (V-2-SiO2)

To a slurry of 15 g silica 948, calcined at 250° C. for 5 h) in 150 ml toluene was added a solution 15 mg [N,N-bis(1H-benzimidazol-2-ylmethyl)-N-methylamine]dipropoxyoxo-vanadium(V) (Example 70) dissolved in 100 ml toluene. The slurry was stirred at room temperature for 30 min, filtered, washed with pentane (3×100 ml) and dried at 40° C. under vacuum. Thus prepared the solid catalyst contains 2.1 μmol V/SiO$_2$.

EXAMPLE 103

Ethylene Homopolymerisation with V-2-SiO2
The ethylene polymerisation tests were carried out using a procedure similar to that described in Example 48–61. The solid catalyst was preactivated and transferred in the reactor via cannula.

TABLE V-2-SiO2H-FP

| | | | Polymerisation in toluene. Fisher-Porter glass reactor. | | | | | |
|---|---|---|---|---|---|---|---|---|
| Ex | Cat., μmol | Me$_2$AlCl Mmol | ECA mmol Note 1 | C$_2$H$_4$ bar | H$_2$L | T °C. | Time min | Yield g | Activity g mmol$^{-1}$ h$^{-1}$ bar$^{-1}$ |
| 103 | 1.1 | 2.0 | 0.07 | 4 | — | 60–75 | 15 | 5.0 | 4545 |

Note 1 ETA = ethyl trichloroacetate-C$_2$H$_5$OC(O)CCl$_3$

EXAMPLE 104

Preparation of N,N,N-tris[1-hexyl-1H-benzimidazol-2-yl)methyl]amine

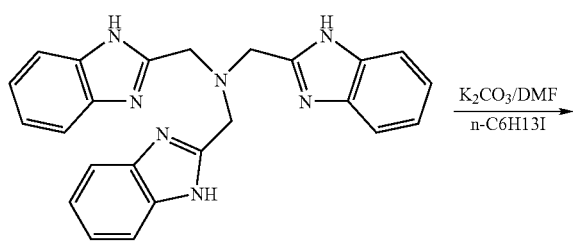

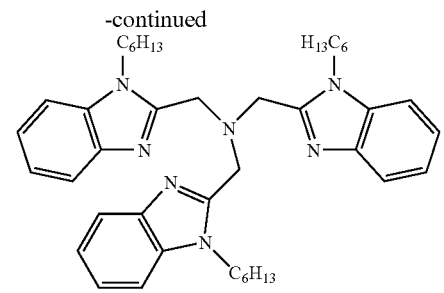

A mixture of 2 g (4.9 mmol) N,N,N-tris(1H-benzimidazol-2-ylmethyl)amine, 10 g anhydrous K$_2$CO$_3$, 20 ml DMF and 3.1 g (14.7 mmol) n-hexyliodide was stirred at room temperature for 48 hours. A volume of 200 ml water was added and the resulting mixture was intensively stirred for 30 min. The formed precipitate was filtered, washed with excess of water and dried at 60° C. under reduced pressure. Recrystallisation from n-heptane gave 2 g (62%) of the product. 1H NMR (250 MHz, CDCl$_3$), δ, ppm: 0.44 (m, 6H), 0.73 (t, 9H), 0.82 (m, 6H), 0.97 (m, 6H), 1.14 (m, 6H), 3.42 (t, 6H), 4.22 (s, 6H), 7.22 (m, 9H), 7.74 (m, 3H).

EXAMPLE 105

{N,N,N-tris[1-hexyl-1H-benzimidazol-2-yl)methyl] amine} dichlorochromium (III) chloride (Cr-9)

Similarly to {[N,N,N-tris(1H-benzimidazol-2-ylmethyl) amine]dichlorochromium (III)}-chloride from CrCl$_3$.3THF and N,N,N-tris[1-hexyl-1H-benzimidazol-2-yl)methyl] amine}. Yield—54%.

EXAMPLE 106

Ethylene Oligomerisation/Polymerisation Test with Cr-9

| Ex | Cat., µmol | MAO, mmol | Temp. Setpoint, ° C. | P C₂H₄ bar | Pol. time, min | ΔT, deg. | Soluble fraction g | Insoluble fraction g | Activity, g/mmol · h · bar |
|---|---|---|---|---|---|---|---|---|---|
| 106 | 20 | 1.0 | 22 | 4 | 60 | — | — | 3.4 | 43 |

| | Polymer properties | | |
|---|---|---|---|
| Example | Mn | Mw | PDI |
| 99 | 15000 | 197000 | 13 |

EXAMPLE 107

Preparation of N,N-bis[(1-methyl-1H-benzimidazol-2-yl)methyl)amine

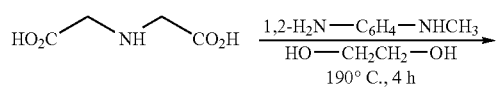

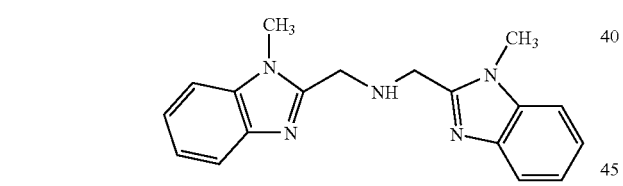

A mixture of 2.7 g (20.3 mmol) methyliminodiacetic acid and 5.0 g (40.6 mmol) N-methyl-o-phenylene diamine in 20–30 ml ethylenediol was stirred at 190° C. for 4 hours. After cooling to room temperature, the reaction mixture was mixed with 100–120 ml water and stirred for 15 minutes. The solid was filtered, washed with water (3×20 ml) and dried at 60° C. under reduced pressure. Yield—3.5 g (56%). The compound can be recrystalised from a methanol/water mixture.

EXAMPLE 108

{N,N-bis[(1-methyl-1H-benzimidazol-2-yl)methyl]amine}trichlorochromium (III) (Cr-10)

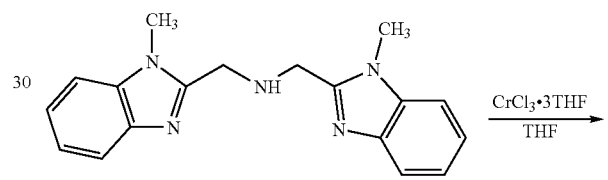

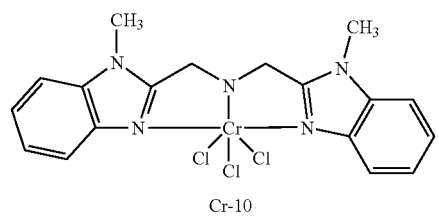

Similarly to [N,N-bis(1H-benzimidazol-2-ylmethyl)-N-methylamine]trichlorochromium(III) (Cr-1) from 0.5 g (1.64 mmol) N,N-bis[(1-methyl-]H-benzimidazol-2-yl)methyl]amine, 0.61 g (1.64 mmol) CrCl₃.3THF and 20 ml THF. Yield—0.39 g (51%).

EXAMPLE 109

Attempted Ethylene Oligomerisation/Polymerisation Test with Cr-10

| Ex | Cat., µmol | MAO, mmol | Temp. Setpoint, ° C. | P C₂H₄ bar | Pol. time, min | ΔT, deg. | Soluble fraction g | Insoluble fraction g | Activity, g/mmol · h · bar |
|---|---|---|---|---|---|---|---|---|---|
| 109 | 10 | 1.0 | 20 | 4 | 60 | — | inactive | inactive | inactive |

EXAMPLE 110

[N,N-bis(1H-benzimidazol-2-ylmethyl)-N-benzylamine]dichloromanganese (Mn-1)

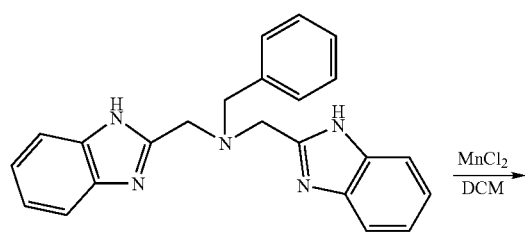

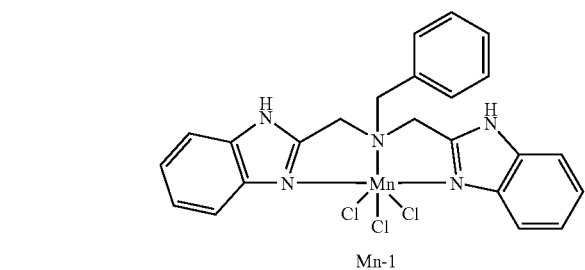

Mn-1

A mixture of 0.50 g (1.41 mmol) N,N-bis(1H-benzimidazol-2-ylmethyl)-N-benzylamine and 0.18 g (1.41 mmol) MnCl$_2$ was stirred in 10 ml refluxing DCM for 10 min. The reaction mixture was then cooled to room temperature and stirred for another 4 hours. The pale pink precipitate was filtered, washed with 2×5 ml DCM and dried under reduced pressure. Yield 0.48 g (69%).

EXAMPLE 111–112

Attempted Ethylene Oligomerisation/Polymerisation Test with Mn-1

EXAMPLE 113

2-{[(1H-benzimidazol-2-ylmethyl)thio]methyl}-1H-benzimidazole

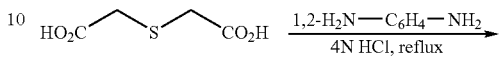

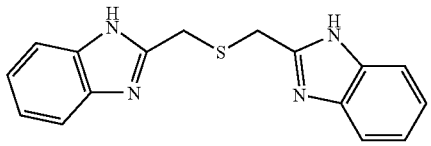

A solution of 4.1 g (27.3 mmol) thiodiacetic acid and 4.9 g (27.3 mmol) o-phenylene diamine in 40 ml 4N HCl was stirred at reflux for 4 hours. The reaction mixture was cooled to room temperature an neutralised with conc. NH$_4$OH. The formed precipitate was filtered, washed with water (3×40 ml) and dried under vacuum. Yield—2.4g (25.2%).

EXAMPLE 114

{2-{[(1H-benzimidazol-2-ylmethyl)thio]methyl}-1H-benzimidazole}trichlorochromium (III) (Cr-11)

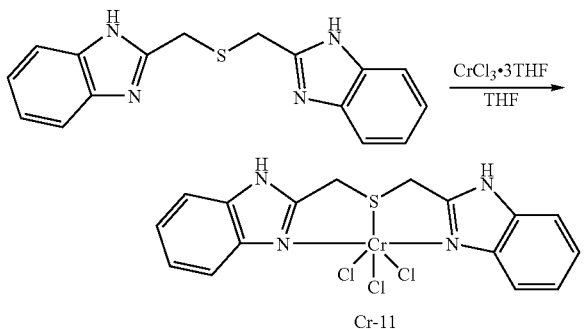

Similarly to [N,N-bis(1H-benzimidazol-2-ylmethyl)-N-methylamine]trichlorochromium(III) (Cr-1) from 0.25 g (0.85 mmol) 2-{[(1H-benzimidazol-2-ylmethyl)thio]methyl}-1H-benzimidazole, 0.32 g (0.85 mmol) CrCl$_3$.3THF and 30 ml THF. Yield—0.20 g (52.6%).

| Ex | Cat., µmol | Co-Cat., (mmol) Note 1 | Temp. Setpoint, °C. | P C$_2$H$_4$ bar | Pol. time, min | ΔT, deg. | Soluble fraction g | Insoluble fraction g | Activity, g/mmol · h · bar |
|---|---|---|---|---|---|---|---|---|---|
| 111 | 20 | TIBAL 1.0 | 60 | 4 | 60 | — | inactive | inactive | inactive |
| 112 | 20 | MAO (1.0) | 20 | 20 | 60 | — | inactive | inactive | inactive |

Note 1 TIBAL = triisobutyl aluminium

EXAMPLE 115

Attempted Ethylene Oligomerisation/Polymerisation Test with Cr-10

| Example | Cat., µmol | MAO, mmol | Temp. Setpoint, ° C. | P C₂H₄ bar | Pol. time, min | ◻T, deg. | Soluble fraction g | Insoluble fraction g | Activity, g/mmol · h · bar |
|---|---|---|---|---|---|---|---|---|---|
| 115 | 10 | 1.0 | 20 | 4 | 60 | — | inactive | inactive | inactive |

EXAMPLE 116

{2-{[(1H-benzimidazol-2-ylmethyl)thio]methyl}-1H-benzimidazole}trichlorotitanium (III) (Ti-1)

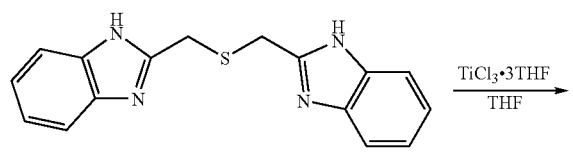
→ TiCl₃·3THF / THF →
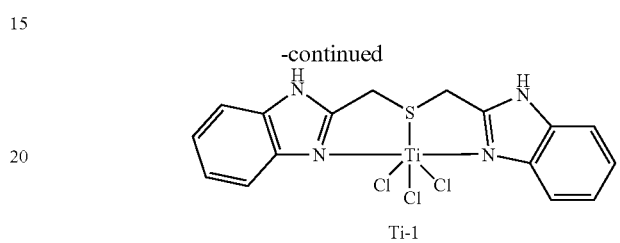

Ti-1

Similarly to [N,N-bis(1H-benzimidazol-2-ylmethyl)-N-methylamine]trichlorochromium(III) (Cr-1) from 0.50 g (1.70 mmol) 2-{[(1H-benzimidazol-2-ylmethyl)thio]methyl}-1H-benzimidazole, 0.62 g (1.70 mmol) TiCl₃·3THF and 40 ml THF. Yield—0.41 g (54.8%).

EXAMPLE 117

Ethylene Polymerisation Test with Ti-1

| Example | Cat., µmol | MAO, mmol | Temp. Setpoint, ° C. | P C₂H₄ bar | Pol. time, min | ◻T, deg. | Soluble fraction g | Insoluble fraction g | Activity, g/mmol · h · bar |
|---|---|---|---|---|---|---|---|---|---|
| 117 | 20 | 1.0 | 60 | 1 | 60 | — | — | 1.3 | 65 |

COMPARATIVE EXAMPLE 1

Ethylene Homopolymerisation with Tripropoxyoxovanadium (V)—(PrO)₃V=O

The ethylene polymerisation test was carried out using a procedure similar to that described in Example 48–61.

TABLE V-C1H-FP

Polymerisation in toluene. Fisher-Porter glass reactor.

| Example | Cat., µmol | Me₂AlCl mmol | ECA mmol Note 1 | C₂H₄ bar | H₂ L | T ° C. | Time min | Yield g | Activity g mmol⁻¹ h⁻¹ bar⁻¹ |
|---|---|---|---|---|---|---|---|---|---|
| 1C | 20.0 | 1.0 | 0.04 | 4 | — | 50 | 60 | — | inactive |

Note 1 ETA = ethyl trichloroacetate-C₂H₅OC(O)CCl₃

COMPARATIVE EXAMPLE 2

Ethylene Homopolymerisation with Vanadium Trichloride—$VCl_3$

The ethylene polymerisation test was carried out using a procedure similar to that described in Example 48–61.

TABLE V-C2H-FP

| | | | Polymerisation in toluene. Fisher-Porter glass reactor. | | | | | |
|---|---|---|---|---|---|---|---|---|
| Example | Cat., μmol | Me$_2$AlCl mmol | ECA mmol Note 1 | C$_2$H$_4$ bar | H$_2$ L | T °C. | Time min | Yield g | Activity g mmol$^{-1}$ h$^{-1}$ bar$^{-1}$ |
| 2C | 7.5 | 1.0 | 0.04 | 4 | — | 50 | 15 | 0.6 | 80 |

Note 1 ETA = ethyl trichloroacetate-$C_2H_5OC(O)CCl_3$

COMPARATIVE EXAMPLE 3

Ethylene Homopolymerisation with bis(cyclopentadiene) vanadiumdichloride (IV) ($Cp_2VCl_2$)

The ethylene polymerisation test was carried out using a procedure similar to that described in Example 48–61.

TABLE V-C3H-FP

| | | | Polymerisation in toluene. Fisher-Porter glass reactor. | | | | | |
|---|---|---|---|---|---|---|---|---|
| Example | Cat., μmol | Me$_2$AlCl mmol | ECA mmol Note 1 | C$_2$H$_4$ bar | H$_2$ L | T °C. | Time min | Yield g | Activity g mmol$^{-1}$ h$^{-1}$ bar$^{-1}$ |
| 3C | 0.5 | 1.0 | 0.05 | 4 | — | 50–52 | 60 | 4.1 | 2050 |

Note 1 ETA = ethyl trichloroacetate-$C_2H_5OC(O)CCl_3$

COMPARATIVE EXAMPLE 4

Ethylene Homopolymerisation with the Following Complex

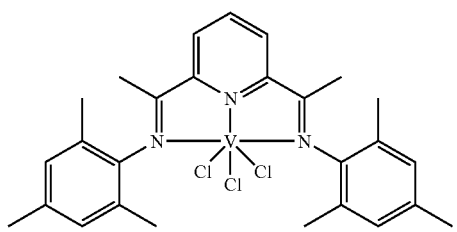

The ethylene polymerisation test was carried out using a procedure similar to that described in Example 48–61.

TABLE V-C1H-FP

| | | | | Polymerisation in toluene. Fisher-Porter glass reactor. | | | |
|---|---|---|---|---|---|---|---|
| Example | Cat., μmol | MAO mmol | C$_2$H$_4$ bar | H$_2$ L | T °C. | Time min | Yield G | Activity g mmol$^{-1}$ h$^{-1}$ bar$^{-1}$ |
| 4C | 0.5 | 2.0 | 1 | — | 50 | 15 | 0.68 | 2772 |

The invention claimed is:

1. A polymerisation catalyst comprising (1) a transition metal compound having the following Formula A, and optionally (2) an activating quantity of a suitable activator,

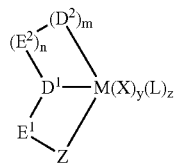

Formula A wherein Z comprises a five-membered heterocyclic group, the five membered heterocyclic group containing at least one carbon atom, at least one nitrogen atom and at least one other hetero atom selected from the group consisting of nitrogen, sulphur and oxygen, the remaining atoms in said ring being selected from the group consisting of nitrogen and carbon; M is a metal from Group 3 to 7 of the Periodic Table or a lanthanide metal; $E^1$ and $E^2$ are divalent groups independently selected from the group consisting of (i) aliphatic hydrocarbon, (ii) alicyclic hydrocarbon, (iii) aromatic hydrocarbon, (iv) alkyl substituted aromatic hydrocarbon (v) heterocyclic groups and (vi) heterosubstituted derivatives of said groups (i) to (v); $D^1$ and $D^2$ are donor atoms or groups; the divalent groups $E^1$ and $E^2$ are not linked other than through the donor atom or group $D^1$; X is an anionic group, L is a neutral donor group; n=m=zero or 1; y and z are independently zero or integers such that the number of X and L groups satisfy the valency and oxidation state of the metal M.

2. A polymerisation catalyst as claimed in claim 1 wherein the five membered heterocyclic group contains at least 3 carbon atoms in its ring.

3. A polymerisation catalyst as claimed in claim 1 comprising
   (1) a transition metal compound having the following Formula A, and optionally
   (2) an activating quantity of a suitable activator,

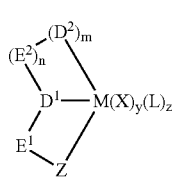

Formula A wherein Z is specifically an imidazole-containing group; M is a metal from Group 3 to 7 of the Periodic Table or a lanthanide metal; $E^1$ and $E^2$ are divalent groups independently selected from the group consisting of (i) aliphatic hydrocarbon, (ii) alicyclic hydrocarbon, (iii) aromatic hydrocarbon, (iv) alkyl substituted aromatic hydrocarbon, (v) heterocyclic groups and (vi) heterosubstituted derivatives of said groups (i) to (v); $D^1$ and $D^2$ are donor groups; the divalent groups $E^1$ and $E^2$ are not linked other than through the donor atom or group $D^1$; X is an anionic group, L is a neutral donor group; n=m=zero or 1; y and z are independently zero or integers such that the number of X and L groups satisfy the valency and oxidation state of the metal M.

4. A polymerisation catalyst as claimed in claim 1 wherein $D^1$ and/or $D^2$ are an imidazole-containing group.

5. A polymerisation catalyst as claimed in claim 3 wherein $D^2$ and Z are identical imidazole containing groups.

6. A polymerisation catalyst as claimed in claim 3 wherein the imidazole-containing group Z is selected from the group consisting of Formula I, II and III

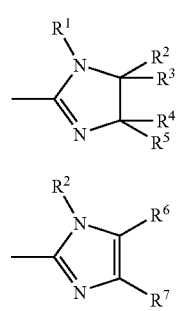

Formula I

Formula II

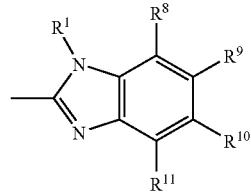

Formula III $R^1$ to $R^{11}$ are independently hydrogen or a monovalent (i) aliphatic hydrocarbon, (ii) alicyclic hydrocarbon, (iii) aromatic hydrocarbon, (iv) alkyl substituted aromatic hydrocarbon, (v) heterocyclic groups, (vi) heterosubstituted derivatives of said groups (i) to (v), or (vii) hydrocarbyl-substituted heteroatom groups.

7. A polymerisation catalyst as claimed in claim 1 wherein the transition metal compound has the following Formula B or C

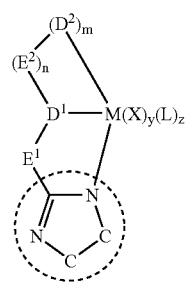

Formula B

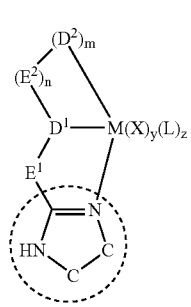

Formula C wherein the imidazole nucleus shown within the dotted circle is selected from the group consisting of divalent groups represented by the Formulae Ia, IIa, IIIa, IVa, Va and VIa,

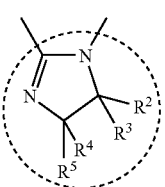

Ia

-continued

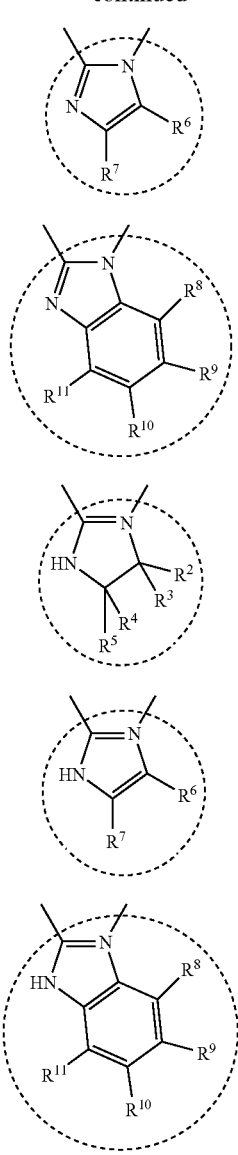

wherein M is a metal from Group 3 to 7 of the Periodic Table or a lanthanide metal; $E^1$ and $E^2$ are divalent groups independently selected from the group consisting of (i) aliphatic hydrocarbon, (ii) alicyclic hydrocarbon, (iii) aromatic hydrocarbon, (iv) alkyl substituted aromatic hydrocarbon, (v) heterocyclic groups and (vi) heterosubstituted derivatives of said groups (i) to (v); $D^1$ and $D^2$ are donor groups; the divalent groups $E^1$ and $E^2$ are not linked other than through the donor atom or group $D^1$; X is an anionic group, L is a neutral donor group; n=m=zero or 1; y and z are independently zero or integers such that the number of X and L groups satisfy the valency and oxidation state of the metal M, wherein the groups $R^2$ to $R^{11}$ are independently hydrogen or a monovalent (i) aliphatic hydrocarbon, (ii) alicyclic hydrocarbon, (iii) aromatic hydrocarbon, (iv) alkyl substituted aromatic hydrocarbon, (v) heterocyclic groups, (vi) heterosubstituted derivatives of said groups (i) to (v), or (vii) hydrocarbyl-substituted heteroatom groups.

8. A polymerisation catalyst as claimed in claim 1 wherein $E^1$ and $E^2$ are independently selected from the group consisting of —$CH_2$—, —$CH_2CH_2$—, —$CH_2$ $CH_2CH_2$—, 1,2-phenylene, trans-1,2-cyclopentane, trans-1,2-cyclohexane, 2,3-butane, 1,1'-biphenyl, 1,1'-binaphthyl, and —$Si(Me)_2$—.

9. A polymerisation catalyst as claimed in claim 1 wherein $D^1$ and $D^2$ are selected from the group consisting of oxygen, sulfur, an amine of formula —$N(R^{12})$— and a phosphine of formula —$P(R^{13})$— wherein $R^{12}$ and $R^{13}$ are hydrogen or (i) aliphatic hydrocarbon, (ii) alicyclic hydrocarbon, (iii) aromatic hydrocarbon, (iv) alkyl substituted aromatic hydrocarbon, (v) heterocyclic groups, (vi) heterosubstituted derivatives of said groups (i) to (v), (vii) hydrocarbyl-substituted heteroatom groups or (viii) an imidazole-containing group.

10. A polymerisation catalyst as claimed in claim 1 wherein M is selected from the group consisting of Sc, Ti, Zr, Hf, V, Nb, Ta, Cr, Mo and W.

11. A polymerisation catalyst as claimed in claim 1 wherein the anionic group X is selected from the group consisting of a halide, a hydrocarbyl group, a carboxylate, an oxide; an amide; an alkoxide; an acetylacetonate; and a hydroxyl.

12. A polymerisation catalyst as claimed in claim 1 wherein X is a non-coordinating or weakly-coordinating anion.

13. A polymerisation catalyst as claimed in claim 1 wherein the neutral donor group L is selected from the group consisting of an ether, an amine, a phosphine, an olefin, water, a neutral diene, a conjugated diene and a nonconjugated diene.

14. A polymerisation catalyst as claimed in claim 1 wherein the optional activator (2) is selected from the group consisting of organoaluminium compounds, organoboron compounds, and mixtures thereof.

15. A polymerisation catalyst as claimed in claim 14 wherein the optional activator (2) is selected from the group consisting of trimethylaluminium, triethylaluminium, tributylaluminium, tri-octylaluminium, ethylaluminium dichloride, diethylaluminium chloride, tris(pentafluorophenyl)aluminium, alumoxanes, dimethylphenylammoniumtetra(phenyl)borate, trityltetra(phenyl)borate, triphenylboron, dimethylphenylammonium tetra(pentafluorophenyl)borate, sodium tetrakis[(bis-3,5-trifluoromethyl)phenyl]borate, $H^+(OEt_2)$[(bis-3,5-trifluoromethyl)phenyl]borate, trityltetra(pentafluorophenyl)borate and tris(pentafluorophenyl)boron.

16. A polymerisation catalyst as claimed in claim 1 wherein the optional activator is provided by a Lewis acid selected from the group consisting of
   (a) ionic-bonding compounds having a $CdCl_2$ type or a $CdI_2$ type of layered crystal structure;
   (b) clays, clay minerals, or ion-exchange layered compounds;
   (c) heteropoly-compounds; and
   (d) halogenated lanthanoid compounds.

17. A polymerisation catalyst as claimed in claim 1 wherein the optional activator is provided by a catalyst support-activator agglomerate comprising a composite of (A) at least one inorganic oxide component selected from the group consisting of $SiO_2$, $Al_2O_3$, MgO, $AlPO_4$, $TiO_2$, $ZrO_2$, and $Cr_2O_3$ and (B) at least one ion containing layered material comprising a smectite.

18. A polymerisation catalyst as claimed in claim 1 wherein there is present a promoter comprising a halogenated organic compound.

19. A polymerisation catalyst as claimed in claim 18 wherein the promoter is selected from the group consisting of carbon tetrachloride, hexachloroethylene, benzylbromide, benzylchloride, ethyl trichloroacetate and 2,3- or 1,3-dichloropropylene, chloroform ($CHCl_3$) and n-butylchloride.

20. A polymerisation catalyst as claimed in claim 19 wherein the transition metal is vanadium.

21. A polymerisation catalyst as claimed in claim 1 wherein m and n are zero in Formula A so that the transition metal compound is of Formula D

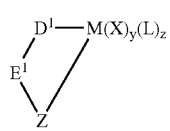

Formula D

22. A polymerisation catalyst as claimed in claim 1 wherein m and n are zero in Formula A so that the transition metal compound is of Formula E or Formula F

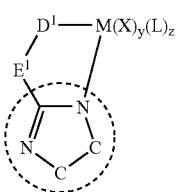

Formula E

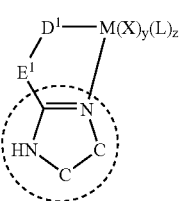

Formula F and wherein the imidazole nucleus within the dotted circle is selected from the the group consisting of divalent groups represented by the Formulae Ia, IIa, IIIa, IVa, Va and VIa as follows:

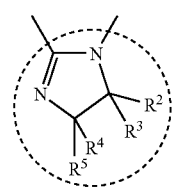

Ia

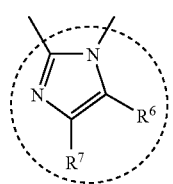

IIa

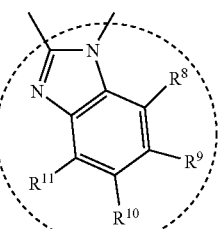

IIIa

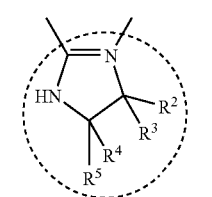

IVa

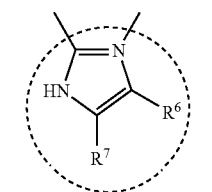

Va

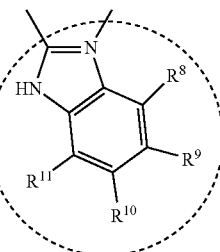

VIa

23. A polymerisation catalyst as claimed in claim 1 wherein in addition to the defined catalyst there is present one or more other catalysts for polymerising 1-olefins.

24. A polymerisation catalyst as claimed in claim 1 wherein in addition to the defined catalyst there is present one or more other transition metal catalysts selected from the group consisting of Ziegler-Natta catalyst systems, metallocene-based catalysts, and heat activated supported chromium oxide catalysts.

25. A supported catalyst comprising the polymerisation catalyst defined in claim 1 and a support material.

26. A process for the polymerisation and copolymerisation of 1-olefins, cycloolefins or dienes, comprising contacting the monomeric olefin under polymerisation conditions with the polymerisation catalyst claimed in claim 1.

27. A process as claimed in claim 26 wherein the process is for the homopolymerisation of 1-olefins and wherein the monomer is selected from the group consisting of ethylene, propylene, butene, hexene, and styrene.

28. A process as claimed in claim 26 wherein the process is for the copolymerisation of 1-olefins and wherein the monomer is selected from the group consisting of ethylene, propylene, 1-butene, 1-hexene, 4-methylpentene-1, octane, methyl methacrylate, methyl acrylate, butyl acrylate, acrylonitrile, vinyl acetate, vinyl chloride, and styrene.

29. A process as claimed in claim 26 comprising the copolymerisation of ethylene and or propylene with comonomers selected from the group consisting of 1-butene, 1-hexene, 4-methylpentene-1, methyl methacrylate, methyl acrylate, butyl acrylate, acrylonitrile, vinyl acetate, styrene, diene, cyclic olefin, norbornene and substituted norbornene.

30. A process as claimed in claim 26 wherein the catalyst is supported on a support material selected from the group consisting of silica, alumina, zirconia, talc, kieselguhr, magnesia, magnesium chloride and polymers.

31. A process as claimed in claim 26 wherein the process is carried out under gas phase, slurry phase or solution phase polymerisation conditions.

32. A process as claimed in claim 26 wherein the process is carried in the presence of hydrogen gas to modify the average molecular weight of the produced polymer.

33. A process for oligomerisation and cooligomerisation of 1-olefins, comprising contacting the monomeric olefin under oligomerisation conditions with the catalyst claimed in claim 1.

34. A polymerisation catalyst comprising (1) a transition metal compound having the following Formula A1,

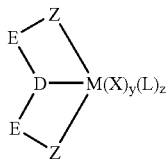

Formula A1 and optionally (2) an activating quantity of a suitable activator, wherein Z is specifically an imidazole-containing group; M is a metal from Group 3 to 7 of the Periodic Table or a lanthanide metal; B is a divalent group independently selected from the group consisting of (i) aliphatic hydrocarbon, (ii) alicyclic hydrocarbon, (iii) aromatic hydrocarbon, (iv) alkyl substituted aromatic hydrocarbon, (v) heterocyclic groups and (vi) heterosubstituted derivatives of said groups (i) to (v); D is a donor group; the divalent groups E are not linked other than through the donor group D; X is an anionic group, L is a neutral donor group; y and z are independently zero or integers such that the number of X and L groups satisfy the valency and oxidation state of the metal M.

* * * * *